US010894918B2

(12) United States Patent
Klasen-Memmer et al.

(10) Patent No.: US 10,894,918 B2
(45) **Date of Patent: *Jan. 19, 2021**

(54) LIQUID CRYSTAL MEDIUM CONTAINING POLYMERISABLE COMPOUNDS

(71) Applicant: Merck Patent GmbH, Darmstadt (DE)

(72) Inventors: Melanie Klasen-Memmer, Heuchelheim (DE); Nils Greinert, Seeheim-Jugenheim (DE); Matthias Bremer, Darmstadt (DE); Konstantin Schneider, Rossdorf-Gundernhausen (DE); Christian Schoenefeld, Babenhausen (DE); Thomas Bauer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 71 days.

This patent is subject to a terminal disclaimer.

(21) Appl. No.: 15/739,190

(22) PCT Filed: May 31, 2016

(86) PCT No.: PCT/EP2016/000887

§ 371 (c)(1),
(2) Date: Dec. 22, 2017

(87) PCT Pub. No.: WO2016/206771

PCT Pub. Date: Dec. 29, 2016

(65) Prior Publication Data

US 2018/0371319 A1 Dec. 27, 2018

(30) Foreign Application Priority Data

Jun. 26, 2015 (EP) .................................... 15001905

(51) Int. Cl.
*G02F 1/13* (2006.01)
*C09K 19/32* (2006.01)
(Continued)

(52) U.S. Cl.
CPC .......... *C09K 19/321* (2013.01); *C09K 19/061* (2013.01); *C09K 19/20* (2013.01);
(Continued)

(58) Field of Classification Search
CPC ................................ G02F 1/13; G02F 1/1334
See application file for complete search history.

(56) References Cited

U.S. PATENT DOCUMENTS 5,496,497 A * 3/1996 Takiguchi .......... C09K 19/3852 252/299.01
9,139,777 B2 9/2015 Zhong
(Continued)

FOREIGN PATENT DOCUMENTS

EP 1887069 A1 * 2/2008 ........... C09K 19/321
EP 1887069 A1 2/2008
(Continued)

OTHER PUBLICATIONS

International Search Report PCT/EP2016/000887 dated Aug. 4, 2016.
(Continued)

*Primary Examiner* — Chanceity N Robinson
(74) *Attorney, Agent, or Firm* — Millen White Zelano & Branigan, PC; Brion P. Heaney

(57) ABSTRACT

The present invention relates to a liquid crystal (LC) medium comprising polymerisable compounds, to a process for its preparation, to its use for optical, electro-optical and electronic purposes, in particular in LC displays, and to LC displays comprising it.

39 Claims, 1 Drawing Sheet

(51) Int. Cl.

| | |
|---|---|
| ***C09K 19/06*** | (2006.01) |
| ***C09K 19/20*** | (2006.01) |
| *C09K 19/04* | (2006.01) |
| *C09K 19/12* | (2006.01) |
| *C09K 19/30* | (2006.01) |

(52) U.S. Cl.

CPC ........ *C09K 19/32* (2013.01); *C09K 2019/044* (2013.01); *C09K 2019/0444* (2013.01); *C09K 2019/0448* (2013.01); *C09K 2019/0455* (2013.01); *C09K 2019/122* (2013.01); *C09K 2019/123* (2013.01); *C09K 2019/124* (2013.01); *C09K 2019/301* (2013.01); *C09K 2019/3009* (2013.01); *C09K 2019/3016* (2013.01); *C09K 2019/3027* (2013.01); *C09K 2019/3036* (2013.01)

(56) References Cited

U.S. PATENT DOCUMENTS

| | | | | |
|---|---|---|---|---|
| 9,719,017 | B2 * | 8/2017 | Kurisawa | C08F 220/10 |
| 2007/0134444 | A1 * | 6/2007 | Harding | C09K 19/2007 428/1.21 |
| 2013/0222755 | A1 | 8/2013 | Furusato | |
| 2015/0129801 | A1 * | 5/2015 | Fujita | C09K 19/3066 252/299.61 |
| 2015/0299570 | A1 | 10/2015 | Kurisawa et al. | |
| 2016/0251575 | A1 | 9/2016 | Fujita | |

FOREIGN PATENT DOCUMENTS

| | | | | |
|---|---|---|---|---|
| JP | 7175051 | A | 7/1995 | |
| WO | 13161669 | A1 | 10/2013 | |
| WO | 2014065514 | A1 | 5/2014 | |
| WO | 2014123056 | A1 | 8/2014 | |
| WO | WO-2014123056 | A1 * | 8/2014 | C08F 220/10 |
| WO | 2015027531 | A1 | 3/2015 | |
| WO | 2015060056 | A1 | 4/2015 | |

OTHER PUBLICATIONS

Notice for reasons for Rejection in corresponding JP2017-567173 dated Jan. 7, 2020 (pp. 1-7).

* cited by examiner

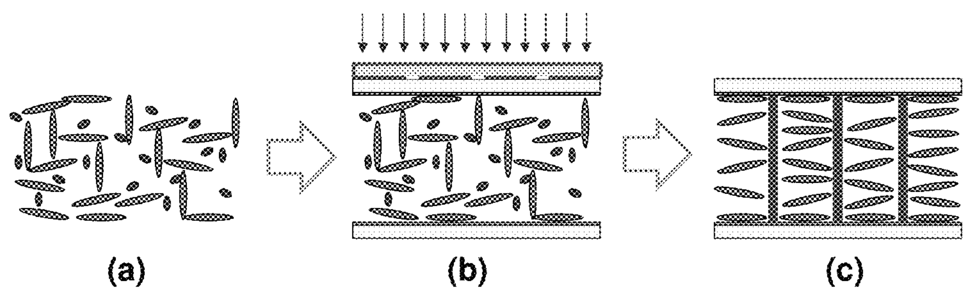
(a)
(b)
(c)

LIQUID CRYSTAL MEDIUM CONTAINING POLYMERISABLE COMPOUNDS

The present invention relates to a liquid crystal (LC) medium comprising polymerisable compounds, to a process for its preparation, to its use for optical, electro-optical and electronic purposes, in particular in flexible LC displays, and to LC displays comprising it.

BACKGROUND OF THE INVENTION

Recently liquid crystal (LC) mixtures have been developed for the realization of flexible substrate based LC displays. These LC mixtures contain reactive polymer precursors that allow the formation of polymer walls in the display, which help to maintain the gap distance of the LC layer. This technology thus enables manufacturing of free form and robust displays by using LC materials.

Free form LC displays can either have a permanent shape other than a rigid flat panel displays, or can even be flexible. The simplest form of the first type are curved TVs that have been developed in the recent past and offer the viewer an enhanced viewing experience. Thereby it is possible to provide displays that are not only shaped in one, but two dimensions, and could be used for example as car dashboards or advertising screens.

Flexible displays, another type of free form displays, have also been developed, and have been proposed for example for use in mobile phones or smart watches utilizing the advantages of flexibility. Further potential applications are foldable or rollable mobile phones, as well as extra-large screens for presentations or home entertainment, which require due to their size to be rollable or foldable for being transported or stowed. Advantageously such devices are based on plastic substrates, instead of rigid glass substrates as used in conventional, unflexible LC displays.

Another display concept, ‘unbreakable’ displays, are also based on plastic substrates and refers to a display design featuring particular robustness, durability, and resistance against mechanical impact. One problem that should be solved is that mobile devices have an elevated risk of being dropped accidentally or becoming otherwise damaged during their normal use. In view of the high value of these devices, a solution to this problem would be highly desirable.

There is thus a great demand for free form or unbreakable LC displays.

One of the main technical challenges of LC displays with flexible substrates is that the LC layer thickness is critical for proper device operation. A proper combination of defined LC layer thickness and LC material properties ensures that the pixels can be switched between a black state and light transmitting state. In case of a varying layer thickness, unwanted interference with the gap distance between the substrates can result in visible optical defects. It should therefore be ensured that the LC layer thickness is not influenced by the bending or the lack of rigidity of flexible plastic substrates.

In conventional LC displays with rigid glass substrates, usually spacer particles are added to the LC layer in order to define and maintain a constant layer thickness. A possible solution for free form displays is to adapt this concept by incorporating supporting structures, like for example polymer walls, that can both resist compression and bind the two substrates together. A suitable manufacturing process is to prefabricate the polymer wall structures, spread the LC mixture on the substrate, and subsequently close the panel with the top substrate. Potential problems with this approach are for example that spreading of the LC mixture is obstructed by the support structures, and that bonding to the top substrate might not be sufficient.

An alternative solution is to create the polymer wall structures by means of a photolithographic process after the display has been assembled. This is schematically illustrated in FIG. 1 showing a polymer wall formation process. FIG. 1 (*a*) shows an LC mixture consisting of LC host molecules (rods), polymerisable monomer (dots), and photo-initiator (not shown). As shown in FIG. 1 (*b*) the LC mixture is filled into the display, or the LC mixture is spread on a first substrate and a second substrate applied on top, and UV radiation (indicated by the arrows) is applied through a photomask. Polymerization induced phase separation takes place, as a result of which polymer walls are formed in irradiated regions according to the mask pattern as shown in FIG. 1 (*c*), while the LC phase of the LC host molecules (rods) in the pixel area is restored.

The principle of creating polymer walls by this method for LC display applications is a known technique that has been described in the literature and has been suggested for use in a variety of display modes.

For example, U.S. Pat. No. 6,130,738 and EP2818534 A1 disclose an LC display that comprises polymer walls formed from one or two polymerisable monomers that are contained in the LC host mixture.

However, the currently used LC mixtures and monomers for use in flexible LC displays with polymer wall formation do still have several drawbacks and leave room for further improvement.

For example, it was observed that the polymerisable compounds and LC media used in prior art do often show insufficient phase separation between the polymer walls and the LC molecules of the LC host mixture. This leads on the one hand to the undesired inclusion of LC molecules in the polymer walls, and on the other hand to increased amounts of polymer molecules dissolved or dispersed in the LC host mixture, both of which can negatively influence the display performance.

Thus, LC molecules trapped in the polymer wall can lead to reduced transparency and contrast of the display, a deterioration of the electrooptical response due to formation of domains with different switching speed, and decreased adhesion of the polymer walls to the substrates. On the other hand, undesired amounts of polymer molecules in the LC host mixture can negatively affect the LC mixture properties.

Moreover, it was observed that the thickness of the polymer walls is often not constant but varying, which can lead to non-uniform pixel size. Besides the polymer walls do often still not show sufficient stability against mechanical pressure on the one hand and sufficient elasticity on the other hand. Also, the polymer walls are often too thick, which reduces transparency and contrast of the display.

It is therefore desirable to have available improved LC mixtures and monomers for use in flexible LC displays which can overcome the drawbacks of materials used in prior art as described above.

The present invention is based on the object of providing novel suitable materials, in particular LC host mixtures comprising polymerisable monomers, for use in flexible LC displays with polymer walls, which do not have the disadvantages indicated above or do so only to a reduced extent.

In particular, the invention is based on the object of providing LC media comprising polymerisable monomers, which enable the formation of polymer walls in a time- and cost-effective manner, and which are suitable for mass production. The formed polymer walls should show clear phase separation from the LC host mixture, without or with a reduced amount of defects or LC molecules trapped in the polymer wall, and without or with a reduced amount of polymer molecules dissolved in the LC host mixture. Also, the polymer walls should show constant thickness, high elasticity, high stability against mechanical pressure, and good adhesion to the substrates.

Another object of the invention is to provide improved LC host mixtures for flexible displays which should show high specific resistance values, high VHR values, high reliability, low threshold voltages, short response times, high birefringence, show good UV absorption especially at longer wavelengths, allow quick and complete polymerisation of the monomers contained therein, and reduce or prevent the occurrence of image sticking in the display.

Another object of the invention is to provide LC displays with polymer walls that show high transparency in the addressed state, good contrast, high switching speed and a large operating temperature range.

Another object of the present invention is to provide an improved technical solution for enabling LCD technology for free form and unbreakable plastic substrate based LC displays.

The above objects have been achieved in accordance with the present invention by materials and processes as described and claimed hereinafter.

Thus, it has surprisingly been found that at least some of the above-mentioned objects can be achieved by using an LC medium which comprises an LC host mixture and one or more polymerisable monomers as disclosed and claimed hereinafter.

It has also been surprisingly found that the polymerisable compounds contained in the LC medium can also be used for forming spacers to maintain a constant cell gap between the substrates of the LC display. This can support or even replace the spacer materials that are normally used in prior art.

SUMMARY OF THE INVENTION

The invention relates to a liquid crystal (LC) medium comprising a polymerisable component A) which comprises, and preferably consists of, one or more polymerisable compounds, and a liquid-crystalline component B), hereinafter also referred to as "LC host mixture", which comprises, and preferably consists of, one or more mesogenic or liquid-crystalline compounds, wherein the polymerisable component A) comprises one or more first polymerisable compounds comprising a, preferably exactly one, polymerisable group and a bi- or polycyclic hydrocarbon group, preferably a bridged bi- or polycyclic hydrocarbon group, and one or more second polymerisable compounds comprising a, preferably exactly one, polymerisable group and a straight-chain, branched or monocyclic hydrocarbon group, and the liquid-crystalline component B) comprises one or more compounds selected from formulae CY and PY

CY

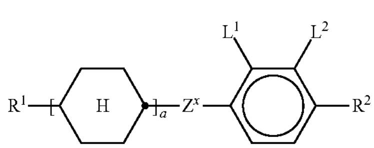

-continued

PY

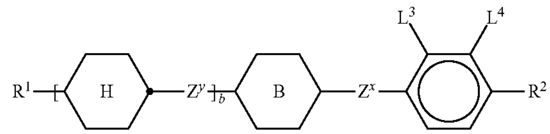

wherein a denotes 1 or 2, b denotes 0 or 1,

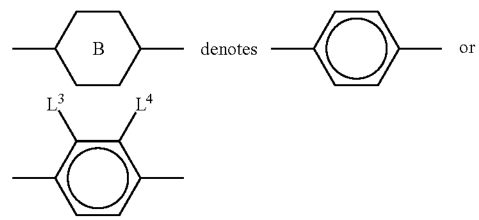

$R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, $L^{1-4}$ each, independently of one another, denote F, Cl, $OCF_3$, $CF_3$, $CH_3$, $CH_2F$, $CHF_2$, The liquid-crystalline component B) of an LC medium according to the present invention is hereinafter also referred to as "LC host mixture", and preferably contains LC compounds that are selected only from low-molecular-weight compounds which are unpolymerisable, like those of formula CY and/or PY, and optionally contains further additives like photoinitiators, stabilisers or chiral dopants.

The invention furthermore relates to an LC medium or LC display as described above and below, wherein the polymerisable compounds, or the compounds of component A), are polymerised.

The invention furthermore relates to a process for preparing an LC medium as described above and below, comprising the steps of mixing one or more compounds of formula A and/or B, or an LC host mixture or LC component B) as described above and below, with one or more polymerisable compounds as described above and below, and optionally with further LC compounds and/or additives.

The invention further relates to the use of LC medium in LC displays, preferably in flexible LC displays.

The invention furthermore relates to an LC display comprising an LC medium as described above and below.

The invention furthermore relates to an LC display comprising polymer walls obtainable by polymerisation of one or more polymerisable compounds or a polymerisable component A) as described above and below, or comprising an LC medium as described above and below.

The invention furthermore relates to an LC display comprising spacers obtainable by polymerisation of one or more polymerisable compounds or a polymerisable component A)

as described above and below, or comprising an LC medium as described above and below.

The LC display according to the present invention is preferably a flexible LC display, and preferably a VA, IPS, FFS or UB-FFS display or related modes using LC-materials with $\Delta\varepsilon<0$.

The invention furthermore relates to an LC display comprising two substrates, at least one which is transparent to light, an electrode provided on each substrate or two electrodes provided on only one of the substrates, and located between the substrates a layer of an LC medium as described above and below, wherein the polymerisable compounds are polymerised between the substrates of the display.

The invention furthermore relates to a process for manufacturing an LC display as described above and below, comprising the steps of filling or otherwise providing an LC medium as described above and below between the substrates of the display, and polymerising the polymerisable compounds.

The displays according to the invention have two electrodes, preferably in the form of transparent layers, which are applied to one or both of the substrates. In some displays, for example in VA displays, one electrode is applied to each of the two substrates. In other displays, for example in IPS or UB-FFS displays, both electrodes are applied to only one of the two substrates.

The polymerisable compounds of the polymerisable component are preferably polymerised by photopolymerisation, very preferably by UV photopolymerisation.

BRIEF DESCRIPTION OF THE DRAWINGS

FIG. 1 schematically illustrates the polymer wall formation process in displays according to prior art and according to the present invention.

DETAILED DESCRIPTION OF THE INVENTION

Above and below, the term "bi- or polycyclic group" will be understood to mean a group that consists of two or more fused rings, i.e. rings that share at last one common atom (in contrast to rings that are connected via covalent bonds between atoms belonging to different rings), wherein fusion of the rings occurs a) across a sequence of atoms (bridgehead), like for example in bicyclo[2.2.1]heptane (norbornane) or tricyclo [3.3.3.1]decane (adamantane), hereinafter also referred to as "bridged bi- or polycyclic groups", b) across a bond between two atoms, like for example in bicyclo[4.4.0]decane (decalin), hereinafter also referred to as "fused bi- or polycyclic groups".

c) at a single atom (spiro atom), like for example in spiro[4.5]decane, hereinafter also referred to as "spirocyclic groups".

Unless indicated otherwise, the abbreviation "RM" is used above and below when referring to a reactive mesogen.

Above and below, polymerisable compounds or RMs with one polymerisable reactive group are also referred to as "monoreactive", polymerisable compounds or RMs with two polymerisable reactive groups are also referred to as "direactive", and polymerisable compounds or RMs with three polymerisable reactive groups are also referred to as "trireactive".

Unless indicated otherwise, the expression "LC mixture" is used when referring to the LC host mixture (i.e. without the RMs or polymerizable compounds), while the expression "LC medium" is used when referring to the LC host mixture plus the RM(s) or polymerizable compounds.

Unless stated otherwise, the polymerisable compounds and RMs are preferably selected from achiral compounds.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs or polymerizable compounds.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

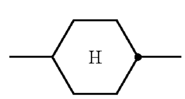

and

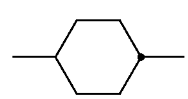

denote a trans-1,4-cyclohexylene ring, and

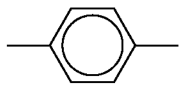

denote a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(═O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)═C($R^x$)—, —C≡C—, —N($R^x$)—, —O—, —S—, —CO—, —CO—O—, —O—CO—, —O—CO—O— in such a way that O and/or S atoms are not linked directly to one another, and $R^x$ denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoiso-quin-oline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b] thiophene, dithienothiophene, isobenzothiophene, dibenzothiophene, benzothiadiazo-thiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds.

Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrroli-dine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as $L^S$, are, for example, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

"Substituted silyl or aryl" preferably means substituted by halogen, —CN, $R^0$, —O$R^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

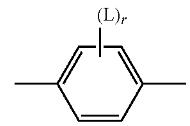

is preferably or

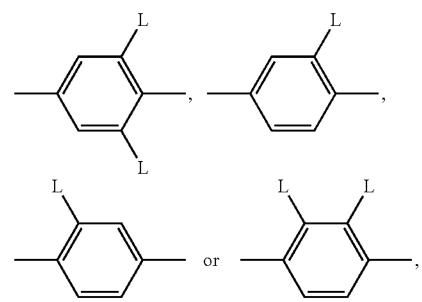

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2$═$CW^1$—CO—O—, $CH_2$═$CW^1$—CO—,

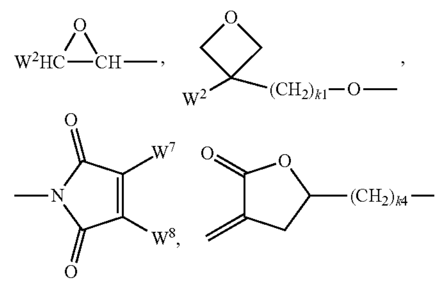

$CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, HO—$CW^2W^3$—, HS—$CW^2W^3$—, $HW^2N$—, HO—$CW^2W^3$—NH—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl, $CH_3$ or $C_2H_5$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2{=}CW^1{-}CO{-}O{-}$, $CH_2{=}CW^1{-}CO{-}$,

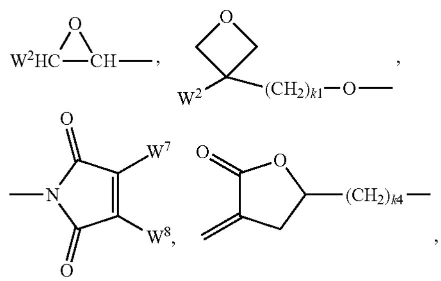

$CH_2{=}CW^2{-}O{-}$, $CH_2{=}CW^2{-}$, $CW^1{=}CH{-}CO{-}(O)_{k3}{-}$, $CW^1{=}CH{-}CO{-}NH{-}$, $CH_2{=}CW^1{-}CO{-}NH{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $CH_2{=}CW^1{-}CO{-}NH{-}$, $CH_2{=}CH{-}(COO)_{k1}$-Phe-$(O)_{k2}{-}$, $CH_2{=}CH{-}(CO)_{k1}$-Phe-$(O)_{k2}{-}$, Phe-CH=CH— and $W^4W^5W^6Si{-}$, in which $W^1$ denotes H, F, Cl, CN, $CF_3$, phenyl or alkyl having 1 to 5 C atoms, in particular H, F, Cl, $CH_3$ or $C_2H_5$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2{=}CW^1{-}CO{-}O{-}$, in particular $CH_2{=}CH{-}CO{-}O{-}$, $CH_2{=}C(CH_3){-}CO{-}O{-}$ and $CH_2{=}CF{-}CO{-}O{-}$, furthermore $CH_2{=}CH{-}O{-}$, $(CH_2{=}CH)_2CH{-}O{-}CO{-}$, $(CH_2{=}CH)_2CH{-}O{-}$,

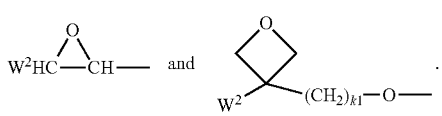

Further preferred polymerisable groups P are selected from the group consisting of vinyloxy, acrylate, methacrylate, ethacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, $-N(R^0)-$, $-Si(R^0R^{00})-$, —CO—, —CO—O—, —O—CO—, —O—CO—O—, —S—CO—, —CO—S—, $-N(R^{00})-CO-O-$, $-O-CO-N(R^0)-$, $-N(R^0)-CO-N(R^{00})-$, —CH=CH— or —C≡C— in such a way that O and/or S atoms are not linked directly to one another, X" denotes —O—, —S—, —CO—, —CO—O—, —O—CO—, —O—CO—O—, $-CO-N(R^0)-$, $-N(R^0)-CO-$, $-N(R^0)-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, —CH=N—, —N=CH—, —N=N—, $-CH{=}CR^0-$, $-CY^2{=}CY^3-$, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, $-CO-NR^0-$, $-NR^0-CO-$, $-NR^0-CO-NR^{00}-$ or a single bond.

Typical spacer groups Sp and -Sp"-X"— are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^0R^{00}-O)_{p1}-$, in which p1 is an integer from 1 to 12, q1 is an integer from 1 to 3, and $R^0$ and $R^{00}$ have the meanings indicated above.

Particularly preferred groups Sp and -Sp"-X"— are $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

The LC medium according to the present invention contains a polymerisable component A) comprising one or more first polymerisable compounds with a polymerisable group and a bi- or polycyclic hydrocarbon group, and one or more second polymerisable compounds with a polymerisable group and a straight-chain, branched or monocyclic hydrocarbon group.

The hydrocarbon group contained in the first and second polymerisable compounds is preferably a non-aromatic group.

In a first preferred embodiment the present invention the bi- or polycyclic hydrocarbon group in the first polymerisable compound is a bridged bi- or polycyclic hydrocarbon group, i.e. which consists of fused hydrocarbon rings, preferably fused cycloalkyl rings, where fusion occurs across a sequence of atoms (bridgehead), preferably a bipodal bridge, like in bicyclo[2.2.1]heptane (norbornane), bicyclo[2.2.2]octane or tricyclo[3.3.3.1]decane (adamantane).

In a second preferred embodiment the present invention the bi- or polycyclic hydrocarbon group in the first polymerisable compounds is a fused bi- or polycyclic hydrocarbon group, i.e. which consists of fused hydrocarbon rings, preferably fused cycloalkyl rings, where fusion occurs across a bond between two atoms, like in bicyclo[3.2.0]heptane or bicyclo[4.4.0]decane (decalin).

In a third preferred embodiment the present invention the bi- or polycyclic hydrocarbon group in the first polymerisable compounds is a spirocyclic group, i.e. which consists of fused hydrocarbon rings, preferably fused cycloalkyl rings, where fusion occurs at a single atom (spiro atom), like in spiro[3.3]heptane or spiro[4.5]decane.

The bi- or polycyclic group os optionally substituted by one or more substituents. Preferred substituents are the groups L and $L^S$ as defined above and below.

Preferably the bi- or polycyclic group is selected from the group consisting of bicyclo[1.1.1]pentyl, bicyclo[2.1.1]hexyl, bicyclo[2.2.1]heptyl (norbornyl), bicyclo[3.2.1]octyl, bicyclo[2.2.2]octyl, bicyclo[3.2.2]nonyl, bicyclo[3.3.1]nonyl, bicyclo[3.3.2]decyl, bicyclo[3.3.3]undecyl, tricyclo[3.3.3.1]decyl (adamantyl), tricyclo[5.2.1.0]decyl (tetrahydrodicyclopentadiyl), bicyclo[2.1.0]pentyl, bicyclo[2.2.0]hexyl, bicyclo[3.2.0]heptyl, bicyclo[4.2.0]octyl, bicyclo[3.3.0]octyl, bicyclo[4.3.0]nonyl, bicyclo[4.4.0]decyl (decalin), spiro[2.2]pentyl, spiro[3.2]hexyl, spiro[3.3]heptyl, spiro[4.3]octyl, spiro[4.4]nonyl, spiro[4.5]decyl, all of which are optionally substituted by one or more groups L or $L^S$ as defined above and below.

Very preferably the bi- or polycyclic group is selected from the group consisting of bicyclo[1.1.1]pentyl, bicyclo[2.1.1]hexyl, bicyclo[2.2.1]heptyl (norbornyl), bicyclo[3.2.1]octyl, bicyclo[2.2.2]octyl, bicyclo[3.2.2]nonyl, bicyclo[3.3.1]nonyl, bicyclo[3.3.2]decyl, bicyclo[3.3.3]undecyl, tricyclo[3.3.3.1]decyl (adamantyl), all of which are optionally substituted by one or more groups L or $L^S$ as defined above and below.

Most preferably the bi- or polycyclic group is selected from the group consisting of bicyclo[2.2.1]heptyl (norbornyl), bicyclo[2.2.2]octyl, tricyclo[3.3.3.1]decyl (adamantyl), all of which are optionally substituted by one or more groups L or $L^S$ as defined above and below.

Preferably component A) of the LC medium comprises one or more first polymerisable compounds selected from formula I $$\text{P-Sp-G}^1 \qquad \text{I}$$

wherein

P is a polymerisable group,

Sp is a spacer group or a single bond, $G^1$ is a bi-, tri- or tetracyclic hydrocarbon group, preferably a bridged or fused bi-, tri- or tetracyclic alkyl group, having 6 to 20 ring atoms which is optionally substituted by one or more groups L, L is F, Cl, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl or heteroaryl having 5 to 20 ring atoms, or straight-chain or branched alkyl having 1 to 25, particularly preferably 1 to 10, C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, —CN, $R^x$ is H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl, $R^0$, $R^{00}$ are H or alkyl having 1 to 20 C atoms, $Y^1$ is halogen, preferably F or Cl.

P is preferably acrylate, methacrylate or oxetane, very preferably acrylate or methacrylate.

Sp is preferably of the formula Sp"-X", so that the respective radical P-Sp-conforms to the formula P-Sp"-X"—, wherein Sp" and X" are as defined above.

Sp is very preferably"—are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 is an integer from 1 to 12.

L is preferably is selected from F, Cl, —CN and straight-chain or branched alkyl having 1 to 25, particularly preferably 1 to 10, C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

L is very preferably selected from F, —CN, and alkyl or alkoxy with 1 to 6 C atoms that is optionally fluorinated, preferably F, Cl, CN, $CH_3$, $OCH_3$, $OCF_3$, $OCF_2H$ or $OCFH_2$, very preferably F.

$G^1$ is preferably selected the group consisting of bicyclo[1.1.1]pentyl, bicyclo[2.1.1]hexyl, bicyclo[2.2.1]heptyl (norbornyl), bicyclo[3.2.1]octyl, bicyclo[2.2.2]octyl, bicyclo[3.2.2]nonyl, bicyclo[3.3.1]nonyl, bicyclo[3.3.2]decyl, bicyclo[3.3.3]undecyl, tricyclo[3.3.3.1]decyl (adamantyl), tricyclo[5.2.1.0]decyl (tetrahydrodicyclopentadiyl), bicyclo[2.1.0]pentyl, bicyclo[2.2.0]hexyl, bicyclo[3.2.0]heptyl, bicyclo[4.2.0]octyl, bicyclo[3.3.0]octyl, bicyclo[4.3.0]nonyl, bicyclo[4.4.0]decyl (decalin), spiro[2.2]pentyl, spiro[3.2]hexyl, spiro[3.3]heptyl, spiro[4.3]octyl, spiro[4.4]nonyl, spiro[4.5]decyl, all of which are optionally substituted by one or more groups L.

$G^1$ is very preferably selected from the group consisting of bicyclo[1.1.1]pentyl, bicyclo[2.1.1]hexyl, bicyclo[2.2.1]heptyl (norbornyl), bicyclo[3.2.1]octyl, bicyclo[2.2.2]octyl, bicyclo[3.2.2]nonyl, bicyclo[3.3.1]nonyl, bicyclo[3.3.2]decyl, bicyclo[3.3.3]undecyl, tricyclo[3.3.3.1]decyl (adamantyl), all of which are optionally substituted by one or more groups L.

$G^1$ is most preferably selected from the group consisting of, bicyclo[2.2.1]heptyl (norbornyl), bicyclo[2.2.2]octyl, tricyclo[3.3.3.1]decyl (adamantyl) all of which are optionally substituted by one or more groups L.

Preferred compounds of formula I are selected from the following formulae

IA

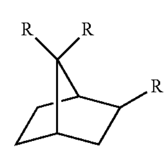

IB

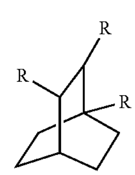

-continued

IC

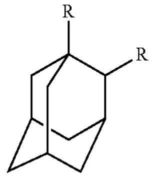

wherein R on each occurrence identically or differently denotes P-Sp- or has one of the meanings given for $R^x$ above, and at least one of the groups R in each of formulae IA-IC denotes P-Sp-.

Further preferred compounds of formula I are selected from the following formulae

I1

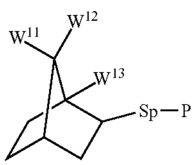

I2

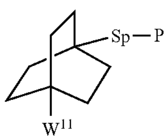

I3

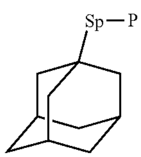

I4

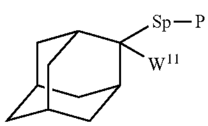

wherein P and Sp have the meanings given in formula I or one of the preferred meanings given above, $W^{11}$, $W^{12}$ and $W^{13}$ are independently of each other H, F or $C_1$-$C_{12}$-alkyl, preferably methyl, and the cycloalkyl groups are optionally substituted with one or more groups L as defined above.

Very preferred compounds of formula I are selected from the following formulae

I1a

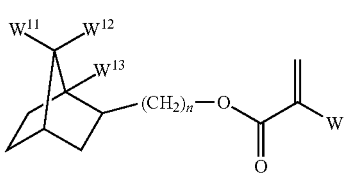

I2a

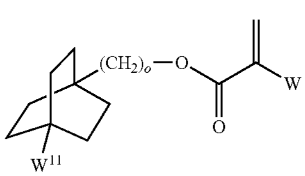

-continued

I3a

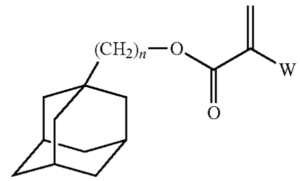

I4a

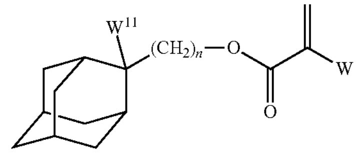

wherein n is 0 or an integer from 1 to 8, W is H, $CH_3$ or $C_2H_5$ and $W^{11}$, $W^{12}$ and $W^{13}$ are H, F or $C_1$-$C_{12}$-alkyl, preferably methyl.

Further preferred compounds of formula I are selected from the following formulae I1a1

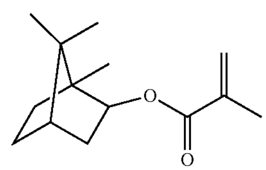

I1a2

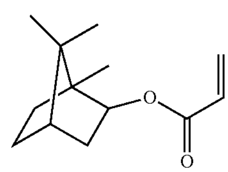

I2a1

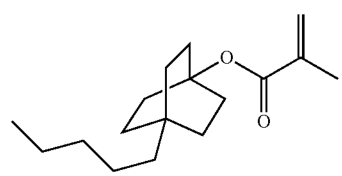

I2a2

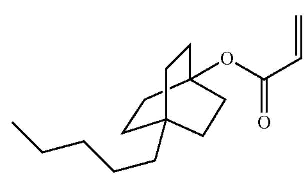

I3a1

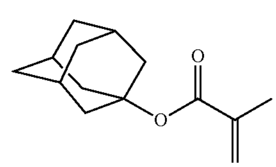

I3a2

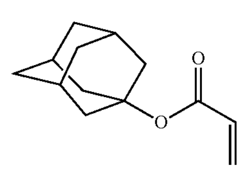

-continued

I3a3

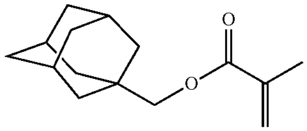

II3a4

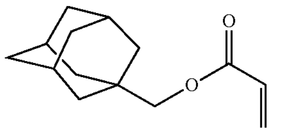

I3a5

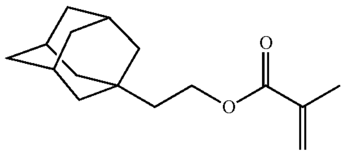

I3a6

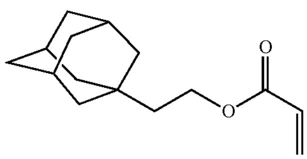

I3a7

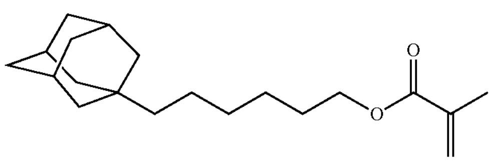

I3a8

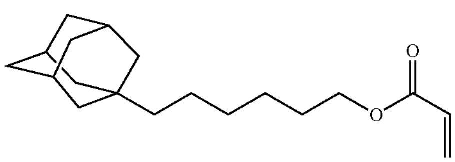

I4a1

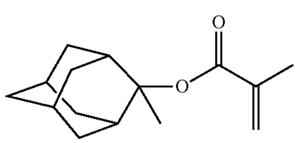

I4a2

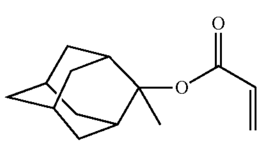

Preferably component A) of the LC medium comprises one or more second polymerisable compounds selected of formula II P-Sp-$G^2$ II wherein P and Sp have the meanings given in formula I or one of the preferred meanings given above and below, and $G^2$ is a straight-chain, branched or monocyclic alkyl group with 1 to 20 C atoms that is optionally mono-, poly- or perfluorinated and is optionally substituted by one or more groups L as defined in formula I, and wherein one or more $CH_2$-groups are optionally replaced by —O—, —CO—, —O—CO— or —CO—O— such that O-atoms are not directly adjacent to one another.

Preferred compounds of formula II are selected from the following formulae $$P—Sp—(CHW^{11})_{n2}—(CH_2)_{n1}—(CHW^{12})_{n3}—CH_3 \quad \text{II1}$$

$$P—Sp—(CH_2)_{n2}—(CF_2)_{n1}—CFW^{13}W^{14} \quad \text{II2}$$

II3

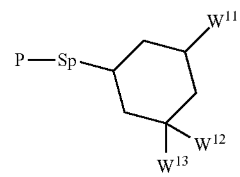

II4

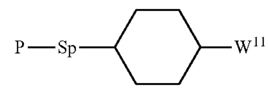

$$P—Sp—(CH_2)_{n6}—(CH_2CH_2O)_{n5}—(CH_2)_{n7}—CH_3 \quad \text{II5}$$

wherein the individual radicals, independently of each other and on each occurrence identically or differently, have the following meanings P, Sp have the meanings given in formula I or one of the preferred meanings given above and below, $W^{11}$, $W^{12}$ are H, F or $C_1$-$C_{12}$-alkyl, $W^{13}$, $W^{14}$ are H or F, n1 is an integer from 2 to 15, n2, n3 are 0 or an integer from 1 to 3, n5 an integer from 1 to 5, n6, n7 0 or an integer from 1 to 15.

Very preferred compounds of formula II are selected from the following formulae $$CH_2{=}CW—CO—O—(CHW^{11})_{n2}—(CH_2)_{n1}—(CHW^{12})_{n3}—CH_3 \quad \text{II1a}$$

$$CH_2{=}CW—CO—O—(CH_2)_{n2}—(CF_2)_{n1}—CFW^{13}W^{14} \quad \text{II2a}$$

II3a

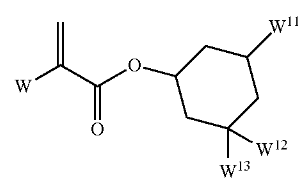

II4a

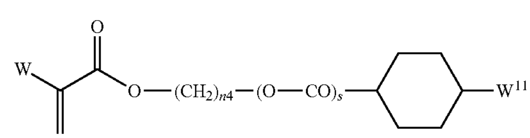

$$CH_2{=}CW—CO—O—(CH_2)_{n6}—(CH_2CH_2O)_{n5}—(CH_2)_{n7}—CH_3 \quad \text{II5a}$$

wherein W is H, $CH_3$ or $C_2H_5$, and $W^{11}$, $W^{12}$, $W^{13}$, $W^{14}$, n1, n2 and n3 are as defined in formula II1 and II2, n4 is 0 or an integer from 1 to 15, s is 0 or 1, and if s is 1 then n4 is not 0.

Further preferred compounds of formula II are selected from the following formulae II1a1
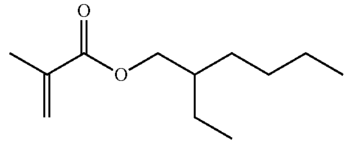
II1a2
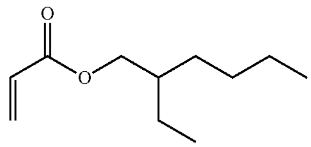
II1a3
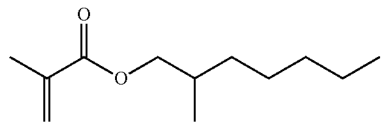
II1a4
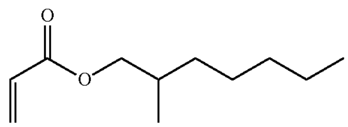
II1a5
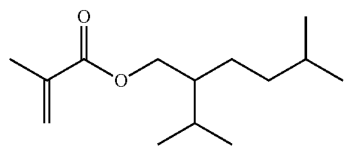
II1a6
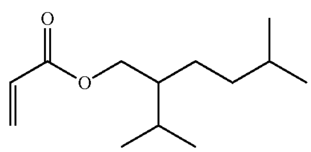
II1a7
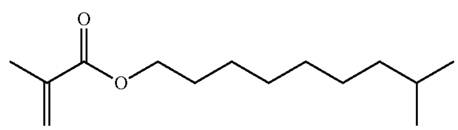
II1a8
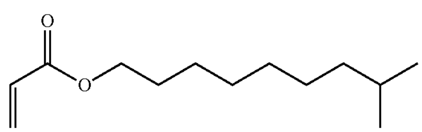
II1a9
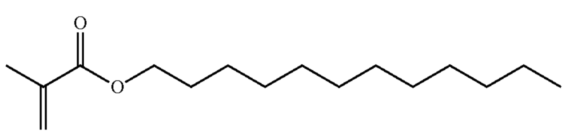
II1a10
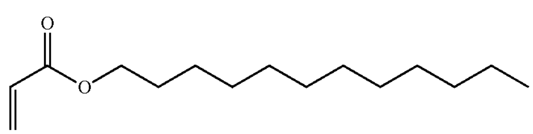
II1a11
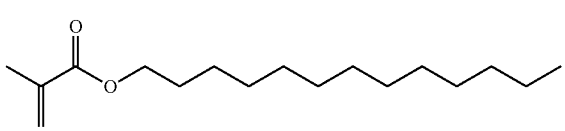
-continued
II1a12
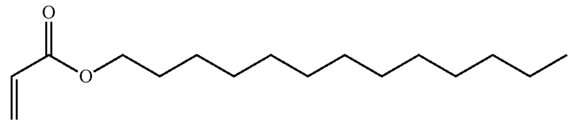
II1a13
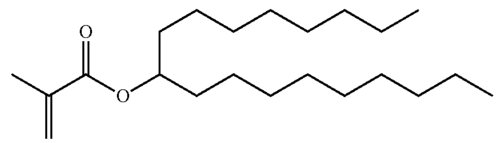
II1a14
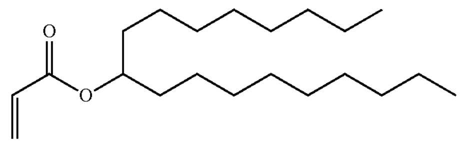
II2a1
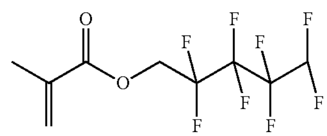
II2a2
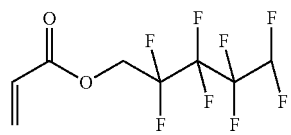
II3a1
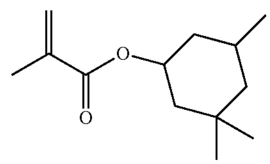
II3a2
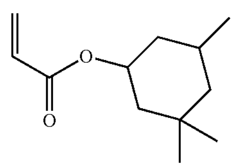
II4a1
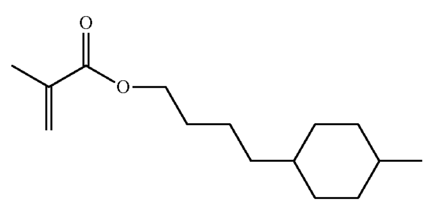
II4a2
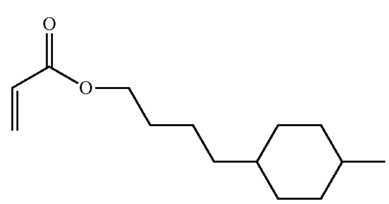

-continued

II4a3

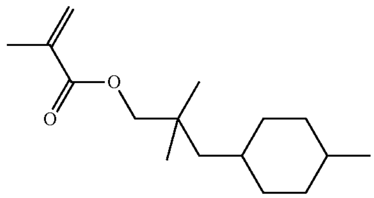

II4a4

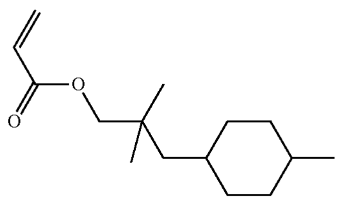

II5a1

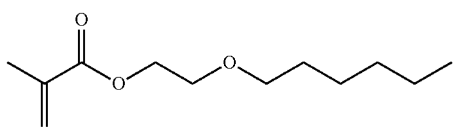

II5a2

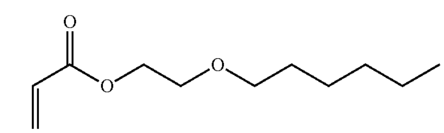

II5a3

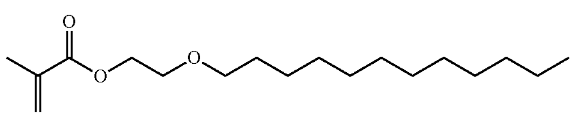

II5a4

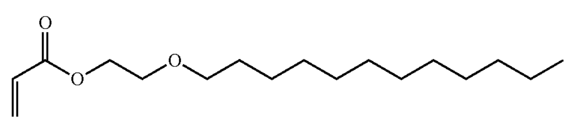

II5a5

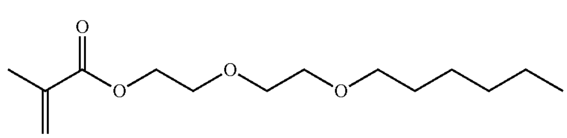

II5a6

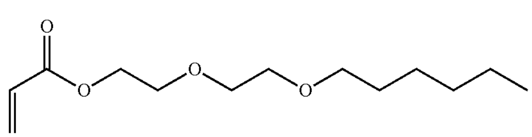

II5a7

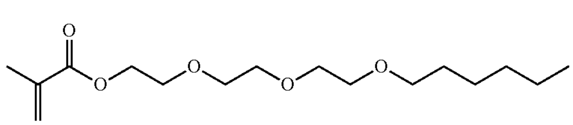

II5a8

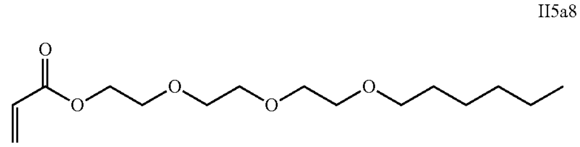

-continued

II5a9

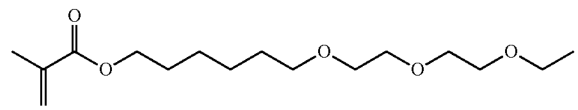

II5a10

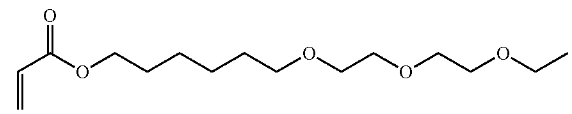

In another preferred embodiment of the present invention component A) of the LC medium comprises, alternatively or in addition to the first polymerisable compound of formula I, one or more first polymerisable compounds comprising two or more polymerisable groups and a bi- or polycyclic hydrocarbon group.

These compounds are preferably selected from formula III $$P^1\text{-}Sp^1\text{-}G^1\text{-}Sp^2\text{-}P^2 \qquad \text{III}$$

wherein $P^1$, $P^2$ have one of the meanings of P given in formula I or its preferred meanings given above, $Sp^1$, $Sp^2$ have one of the meanings of Sp given in formula I or its preferred meanings given above, $G^1$ has one of the meanings given in formula I or its preferred meanings given above, which is optionally substituted by one or more groups L and/or P-Sp-.

wherein P and Sp have the meanings given in formula I or one of the preferred meanings given above, and the cycloalkyl groups are optionally substituted with one or more groups L.

In another preferred embodiment of the present invention component A) of the LC medium comprises, alternatively or in addition to the second polymerisable compound of formula II, one or more second polymerisable compounds comprising two or more polymerisable groups and a straight-chain, branched or monocyclic hydrocarbon group.

These compounds are preferably selected from formula IV $$P^1\text{-}Sp^1\text{-}G^2\text{-}Sp^2\text{-}P^2 \qquad \text{IV}$$

wherein $P^1$, $P^2$ have one of the meanings of P given in formula II or its preferred meanings given above, $Sp^1$, $Sp^2$ have one of the meanings of Sp given in formula II or its preferred meanings given above, $G^2$ has one of the meanings given in formula II or its preferred meanings given above, which is optionally substituted by one or more groups L and/or P-Sp-.

Preferred compounds of formula IV are selected from the following formulae $$P^1—Sp^1—(CHW^{11})_{n2}—(CH_2)_{n1}—(CHW^{12})_{n3}—Sp^2—P^2 \qquad \text{IV1}$$

IV2

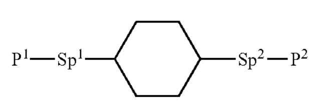

$$P^1—Sp^1—(CH_2)_{n2}—(CF_2)_{n1}—(CH_2)_{n3}—Sp^2—P^2 \qquad \text{IV3}$$

wherein $P^1$, $P^2$, $Sp^1$, $Sp^2$ are as defined in formula IV, and $W^{11}$, $W^{12}$, $W^{13}$, n1, n2 and n3 are as defined in formula II1 and II2, and the cyclohexylene ring in formula IV2 is optionally substituted by one or more identical or different groups $W^{11}$.

Very preferred compounds of formula IV are selected from the following formulae

-continued

IV1a6

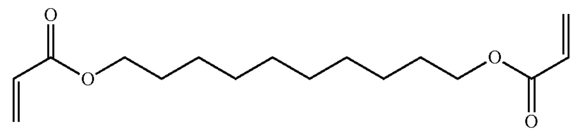

IV1a $$CH_2{=}CW{-}CO{-}O{-}(CHW^{11})_{n2}{-}(CH_2)_{n1}{-}(CHW^{12})_{n3}{-}O{-}CO{-}CW{=}CH_2$$

IV2a

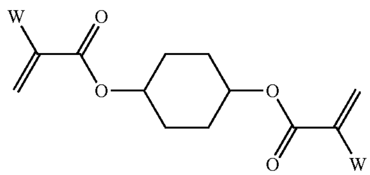

IV2b

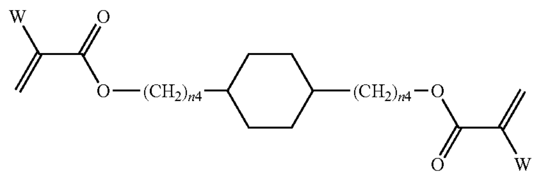

IV3a $$CH_2{=}CW{-}CO{-}O{-}(CH_2)_{n2}{-}(CF_2)_{n1}{-}(CH_2)_{n3}{-}O{-}CO{-}CW{=}CH_2$$

wherein W, $W^{11}$, $W^{12}$, $W^{13}$, $W^{14}$, n1, n2 and n3 are as defined in formula II1 and II2, n4 is an integer form 1 to 6, and the cyclohexylene ring in formula IV2a is optionally substituted by one or more identical or different groups $W^{11}$.

Further preferred compounds of formula IV are selected from the following formulae IV1a1

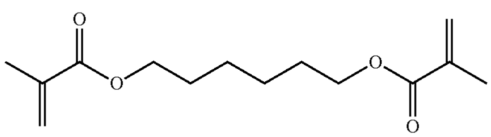

IV1a2

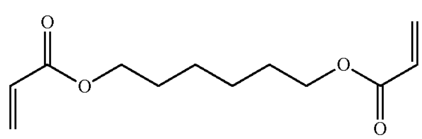

IV1a3

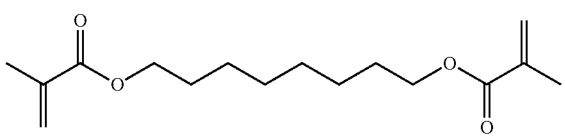

IV1a4

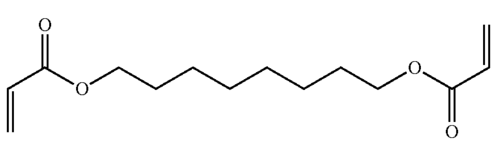

IV1a5

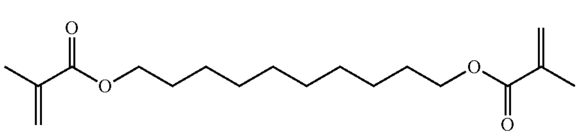

-continued

IV2a1

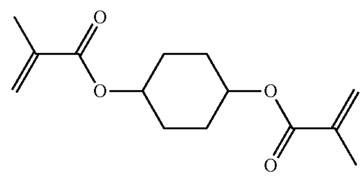

IV2a2

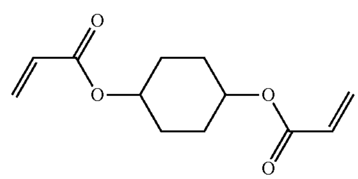

IV2b1

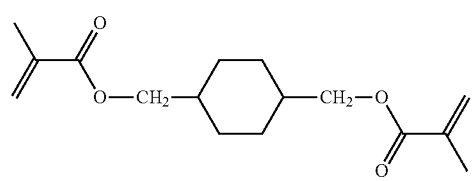

IV2b2

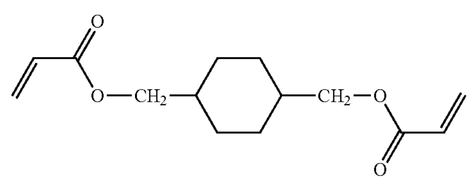

IV3a1

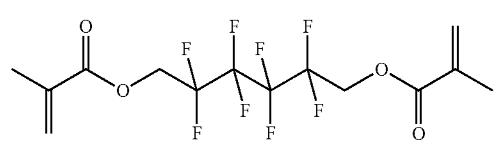

-continued

IV3a2

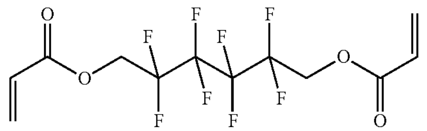

Further preferred compounds of formula IV are selected from the following formulae IV4a

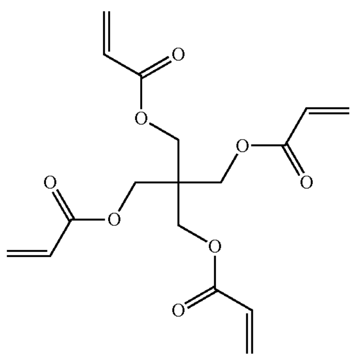

IV4b

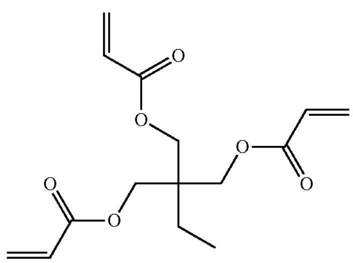

IV4c

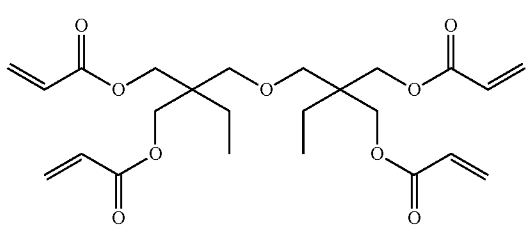

IV4d

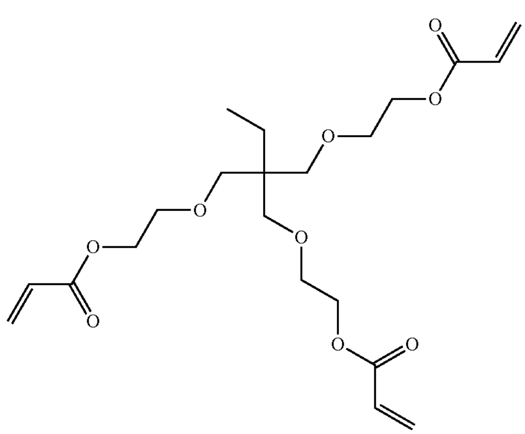

-continued

IV4e

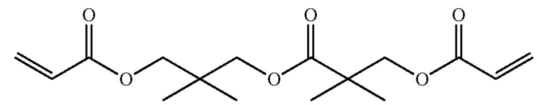

The concentration of the first and second polymerisable compounds, or compounds of formula I, II, III and IV, in the LC medium is preferably from 1 to 30% by weight, very preferably from 1 to 25% by weight.

In a first preferred embodiment of the present invention, the concentration of the first and second polymerisable compounds, or compounds of formula I, II, III and IV in the LC medium is from 10 to 20% by weight.

In a second preferred embodiment of the present invention, the concentration of the first and second polymerisable compounds, or compounds of formula I, II, III and IV in the LC medium is from 5 to 10% by weight.

In a third preferred embodiment of the present invention, the concentration of the first and second polymerisable compounds, or compounds of formula I, II, III and IV in the LC medium is from 1 to 5% by weight.

In a fourth preferred embodiment of the present invention, the concentration of the first and second polymerisable compounds, or compounds of formula I, II, III and IV in the LC medium is from 15 to 25% by weight.

The ratio of first polymerisable compounds or compounds of formula I and III, and second polymerisable compounds or compounds of formula II and IV, in the LC medium is preferably from 50:1 to 1:50, very preferably from 10:1 to 1:10, most preferably from 4:1 to 1:4.

The concentration of first and second polymerisable compounds with (exactly) one polymerisable group, or compounds of formula I and II, in the LC medium is preferably from 5 to 30% by weight.

The concentration of first and second polymerisable compounds with (exactly) two polymerisable groups, or compounds of formula II and IV, in the LC medium is preferably from 0.1 to 10%, very preferably from 0.1 to 5%, most preferably from 0.1 to 2% by weight.

Particular preference is given to LC media wherein the polymerisable component A) comprises one, two or three first polymerisable compounds or compounds of formula I and/or III, and one, two or three second polymerisable compounds or compounds of formula II and/or IV.

In another preferred embodiment of the present invention, the polymerisable component A) of the LC medium comprises, in addition to the first and second polymerisable compounds as described above, one or more polymerisable compounds comprising an aromatic or heteroaromatic ring, preferably selected from reactive mesogens.

Preferred reactive mesogens are selected of formula M $$R^a\text{—}B^1\text{—}(Z^b\text{—}B^2)_m\text{—}R^b \qquad \text{M}$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, wherein at least one of $B^1$ and $B^2$ denotes an aromatic or heteroaromatic group, $Z^b$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n11}$—, —CH═CH—, —CF═CF—, —C≡C—, —CH═CH—COO—, —OCO—CH═CH—, $CR^0R^{00}$ or a single bond, $R^0$ and $R^{00}$ each, independently of one another, denote H or alkyl having 1 to 12 C atoms, m denotes 0, 1, 2, 3 or 4, n11 denotes 1, 2, 3 or 4, L P, P-Sp-, OH, $CH_2OH$, F, Cl, Br, I, —CN, —$NO_2$, —NCO, —NCS, —OCN, —SCN, —C(═O)N$(R^x)_2$, —C(═O)$Y^1$, —C(═O)$R^x$, —N$(R^x)_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydrophenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Very particularly preferred compounds of formula M are those in which $B^1$ and $B^2$ each, independently of one another, denote 1,4-phenylene, 1,3-phenylene, naphthalene-1,4-diyl or naphthalene-2,6-diyl.

Further preferred compounds of formula M are selected from the group consisting of the following formulae:

M1

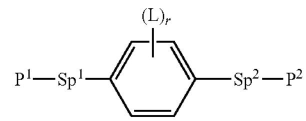

M2

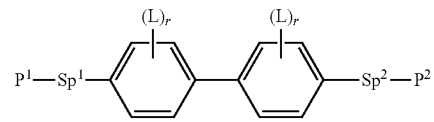

M3

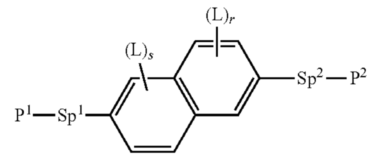

M4

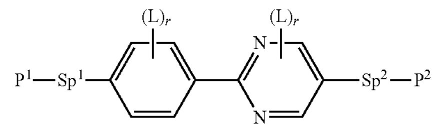

M5

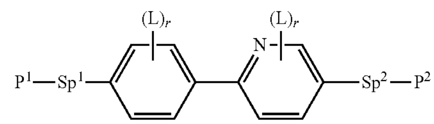

M6

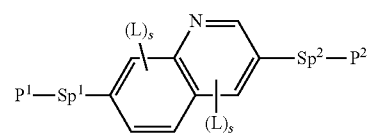

M7

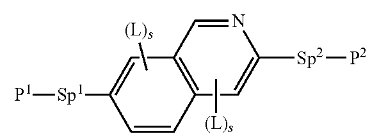

M8

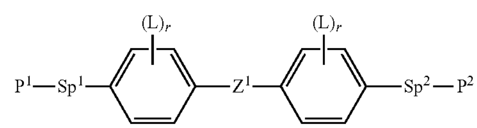

M9

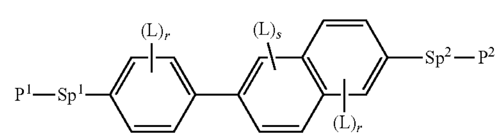

M10

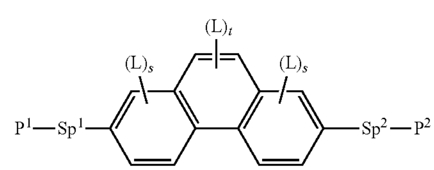

M11

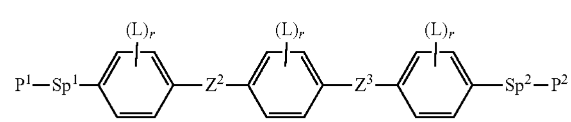

-continued
M12
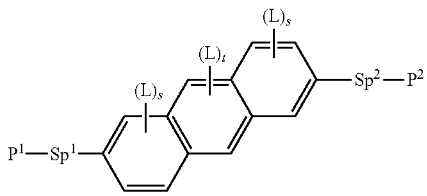
M13
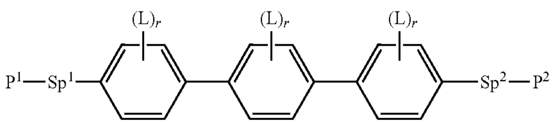
M14
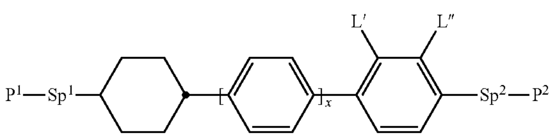
M15
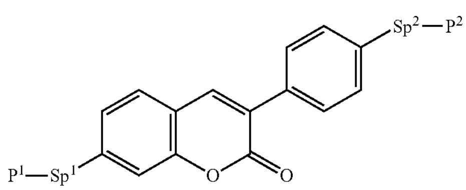
M16
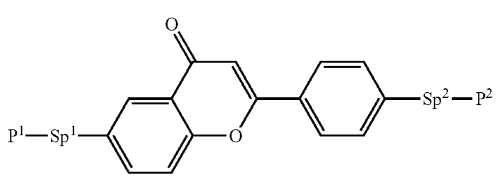
M17
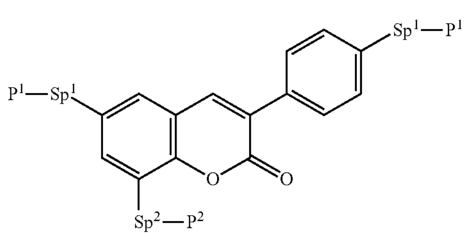
M18
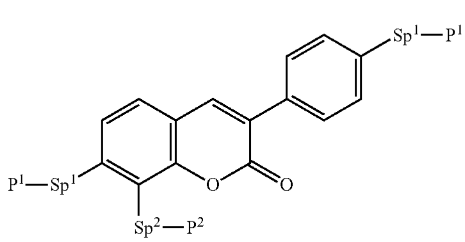
M19
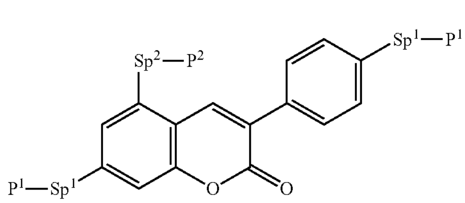
-continued
M20
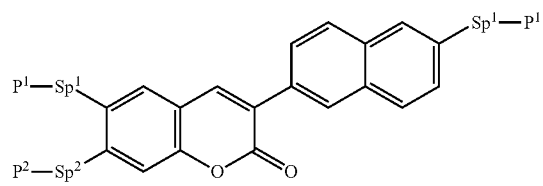
M21
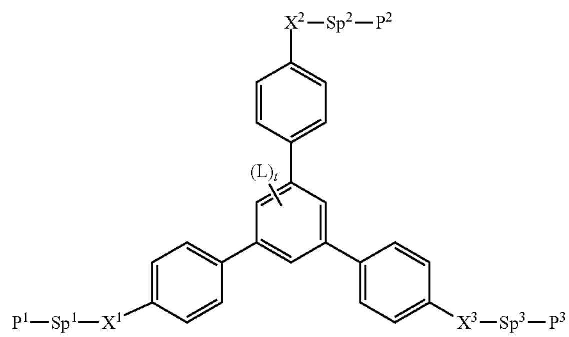
M22
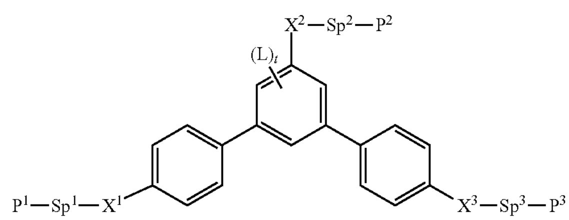
M23
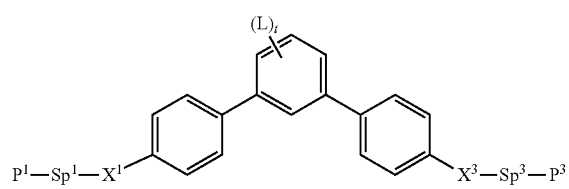
M24
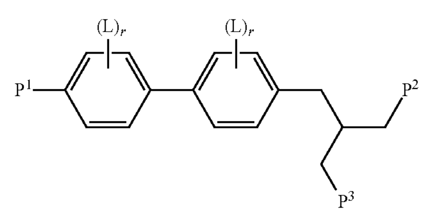
M25
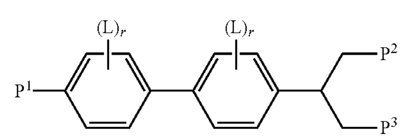
M26
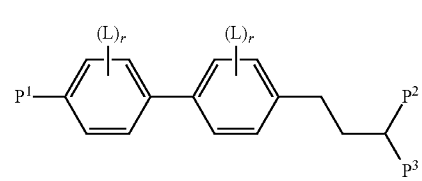

-continued

M27

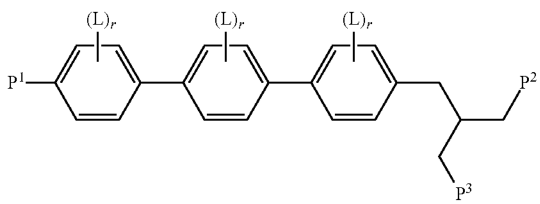

M28

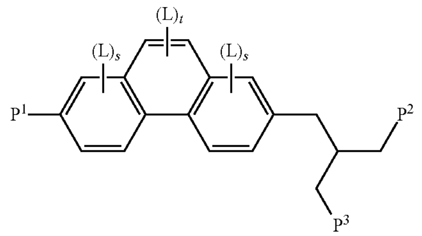

M29

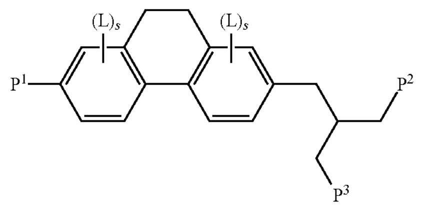

M30

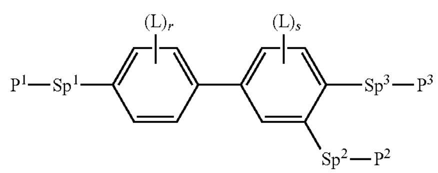

M31

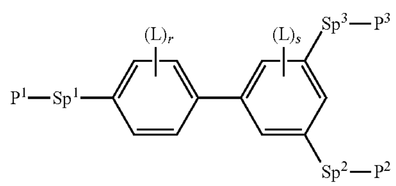

in which the individual radicals, on each occurrence identically or differently, and each, independently of one another, have the following meaning:

$P^1$, $P^2$, $P^3$ a vinyloxy, acrylate, methacrylate, fluoroacrylate, chloroacrylate, oxetane or epoxy group, $Sp^1$, $Sp^2$, $Sp^3$ a single bond or a spacer group where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ H, F, Cl, CN or straight-chain or branched alkyl having 1 to 25 C atoms, in which, in addition, one or more non-adjacent $CH_2$ groups may each be replaced, independently of one another, by —$(R^0)$═$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^2$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^1$ —O—, —CO—, —$C(R^yR^z)$— or —$CF_2CF_2$—, $Z^2$, $Z^3$ —CO—O—, —O—CO—, —$CH_2O$—, —$OCH_2$—, —$CF_2O$—, —$OCF_2$— or —$(CH_2)_{n11}$—, where n11 is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, r 0, 1, 2, 3 or 4, s 0, 1, 2 or 3, t 0, 1 or 2, x 0 or 1.

Especially preferred are direactive compounds of formulae M1 to M14, in particular those of formula M2 and M13.

Further preferred are trireactive compounds M15 to M30, in particular those of formula M17, M18, M19, M22, M23, M24, M25, M26, M30 and M31.

In the compounds of formulae M1 to M31 the group

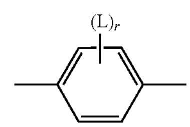

is preferably

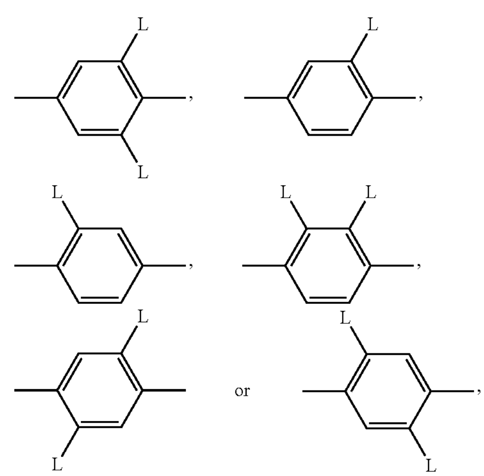

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ oder $OCF_3$, especially F or $CH_3$.

Preferred compounds of formulae M1 to M31 are those wherein $P^1$, $P^2$ and $P^3$ denote an acrylate, methacrylate, oxetane or epoxy group, very preferably an acrylate or methacrylate group.

Further preferred compounds of formulae M1 to M31 are those wherein $Sp^1$, $Sp^2$ and $Sp^3$ are a single bond.

Further preferred compounds of formulae M1 to M31 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M31 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Particular preference is given to LC media comprising one, two or three polymerisable compounds of formula M.

Preferably the proportion of polymerisable compounds of formula M in the LC medium is from 0.01 to 5%, very preferably from 0.05 to 1%, most preferably from 0.1 to 0.5%.

Besides the polymerisable component A) as described above, the LC medium according to the present invention comprises an LC component B), or LC host mixture, comprising one or more, preferably two or more LC compounds which are selected from low-molecular-weight compounds that are unpolymerisable, and at least one of which is selected of formula CY and PY. These LC compounds are selected such that they stable and/or unreactive to a polymerisation reaction under the conditions applied to the polymerisation of the polymerisable compounds.

Examples of such compounds are the compounds of formula CY and PY above and below and the compounds of formulae T, AN, AY, ZK and DK.

Preference is given to LC media in which the LC component B), or the LC host mixture, has a nematic LC phase, and preferably has no chiral liquid crystal phase. The LC component B), or LC host mixture, is preferably a nematic LC mixture. Further preferably the LC component B) or LC host mixture, and the LC medium have a negative dielectric anisotropy Δε.

Preference is furthermore given to achiral polymerisable compounds, and to LC media in which the compounds of component A) and/or B) are selected exclusively from the group consisting of achiral compounds.

Preferably the proportion of the LC component B) in the LC medium is from 70 to 95% by weight.

The LC media and LC host mixtures of the present invention preferably have a nematic phase range ≥80 K, very preferably ≥100 K, and preferably a rotational viscosity ≤250 mPa·s, very preferably ≤200 mPa·s, at 20° C.

The birefringence Δn of LC media and LC host mixtures according to the invention is preferably below 0.16, very preferably from 0.06 to 0.14, most preferably from 0.07 to 0.12.

The LC media and LC host mixtures according to the invention preferably have a negative dielectric anisotropy Δε from −0.5 to −10, in particular from −2.5 to −7.5, at 20° C. and 1 kHz.

In the compounds of formula CY and PY, preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

CY1

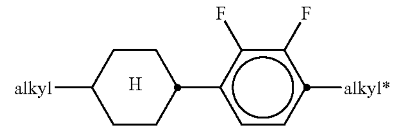

CY2

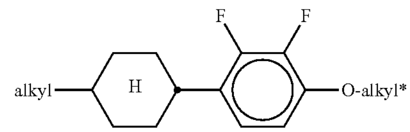

CY3

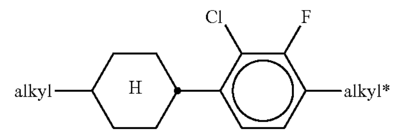

CY4

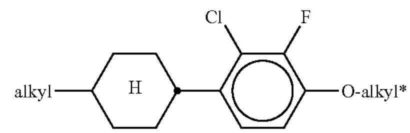

CY5

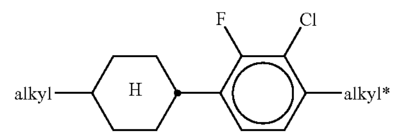

CY6

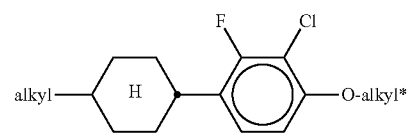

CY7

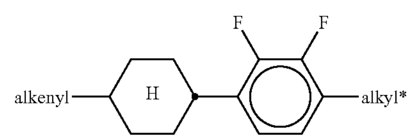

CY8

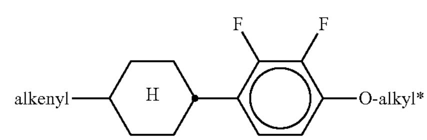

CY9

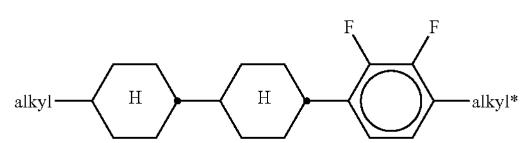

CY10

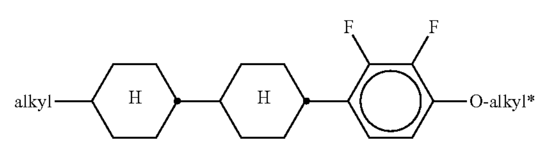

CY11

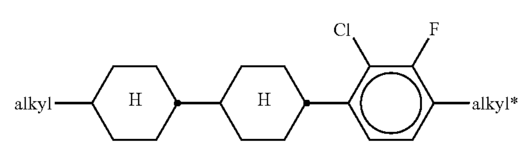

-continued
CY12
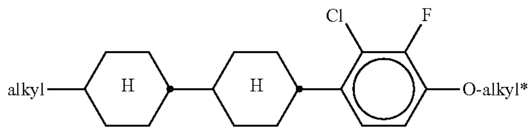
CY13
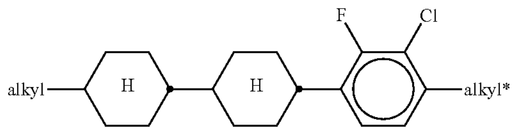
CY14
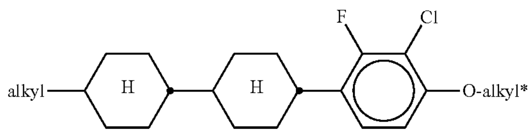
CY15
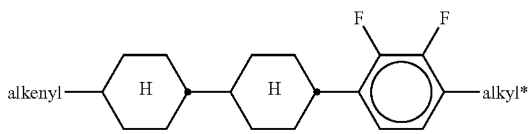
CY16
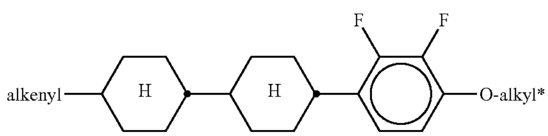
CY17
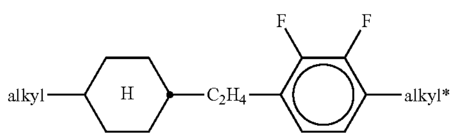
CY18
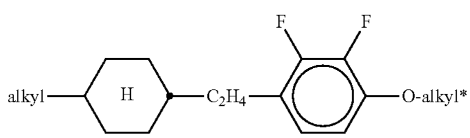
CY19
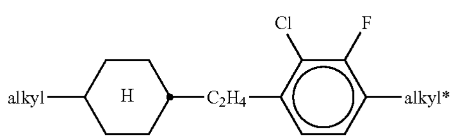
CY20
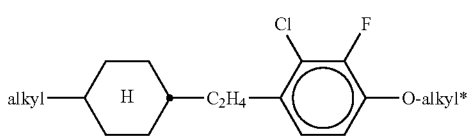
CY21
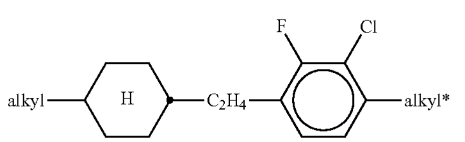
CY22
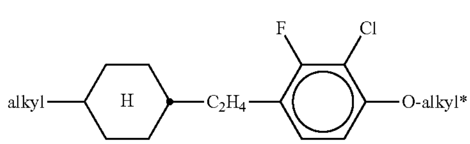
-continued
CY23
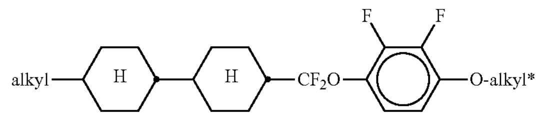
CY24
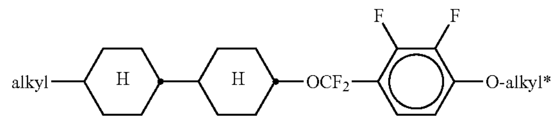
CY25
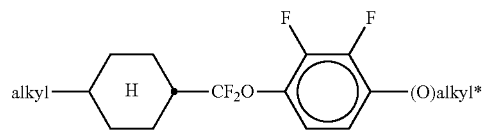
CY26
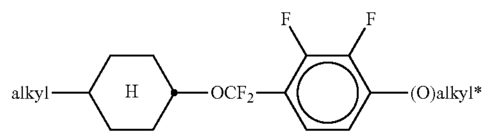
CY27
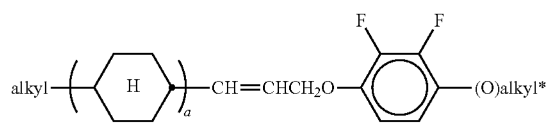
CY28
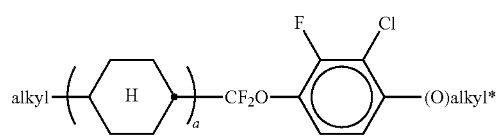
CY29
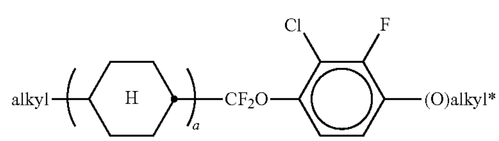
CY30
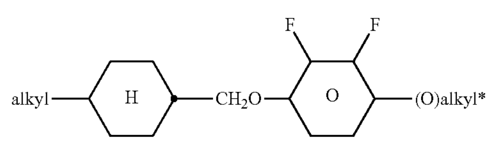
CY30
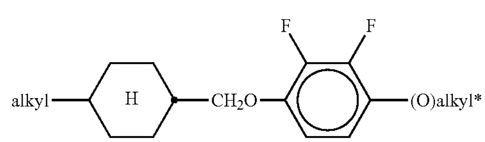
CY31
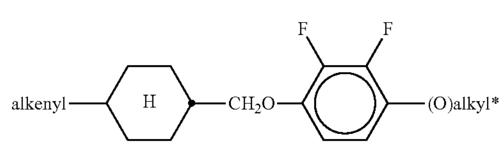

-continued

CY32

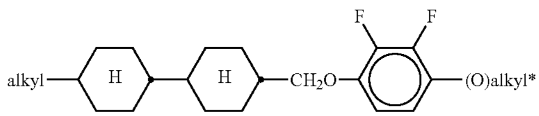

CY33

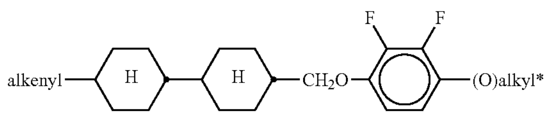

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Especially preferred are compounds selected from formulae CY2, CY8, CY10 and CY16.

The compounds of the formula PY are preferably selected from the group consisting of the following sub-formulae:

PY1

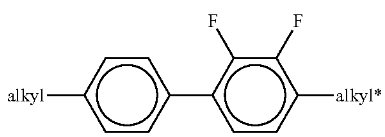

PY2

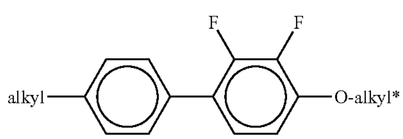

PY3

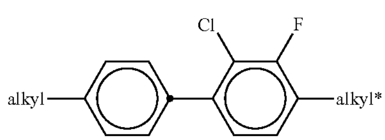

PY4

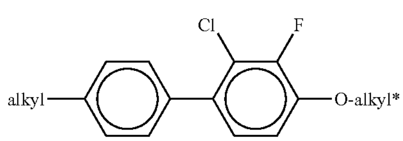

PY5

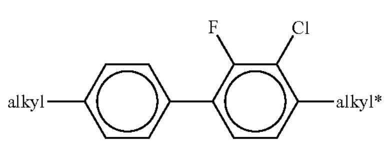

PY6

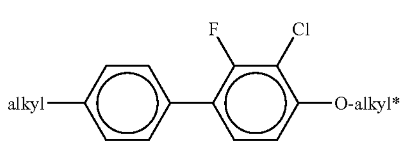

-continued

PY7

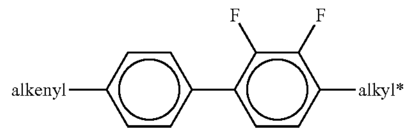

PY8

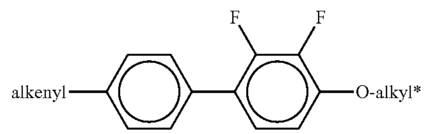

PY9

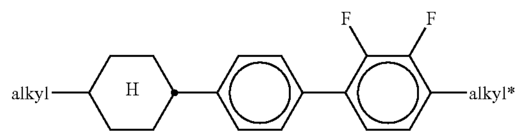

PY10

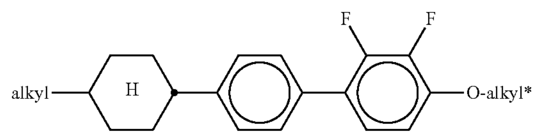

PY11

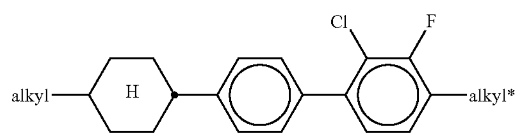

PY12

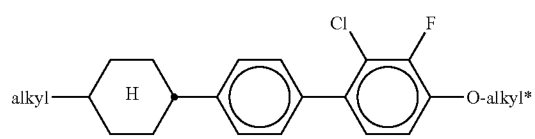

PY13

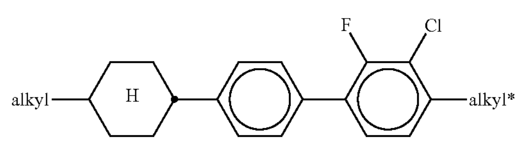

PY14

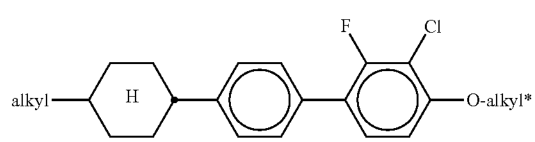

PY15

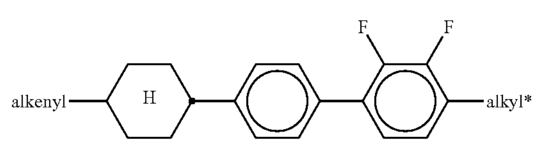

PY16

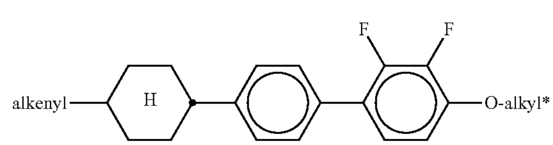

-continued

PY17

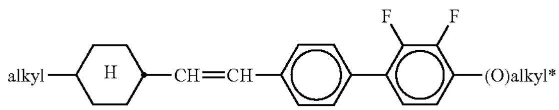

PY18

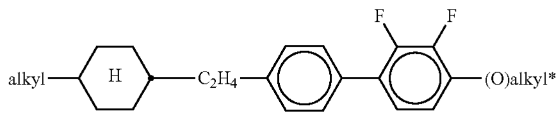

PY19

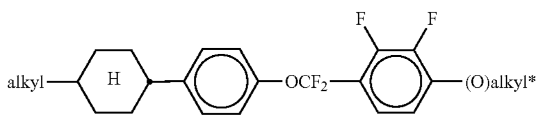

PY20

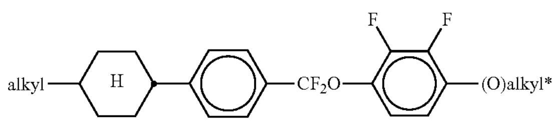

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Especially preferred are compounds selected from formulae PY2, PY8, PY10 and PY16.

Preferably the concentration of the compounds of formula CY and PY and their subformulae in the LC medium is from 10 to 70% by weight, very preferably from 15 to 50% by weight.

Preferably the concentration of the compounds of formula CY and its subformulae in the LC medium is from 2 to 50% by weight, very preferably from 3 to 30% by weight.

Preferably the concentration of the compounds of formula PY and its subformulae in the LC medium is from 2 to 50% by weight, very preferably from 3 to 30% by weight.

In another preferred embodiment of the present invention the LC component B), or LC host mixture, of the LC medium comprises one or more mesogenic or LC compounds comprising a straight-chain, branched or cyclic alkenyl group (hereinafter also referred to as "alkenyl compounds"), wherein said alkenyl group is stable to a polymerisation reaction under the conditions used for polymerisation of the polymerisable compounds contained in the LC medium.

These alkenyl compounds are preferably selected from formula AN and AY

AN

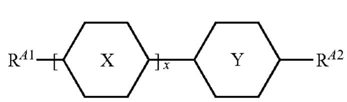

-continued

AY

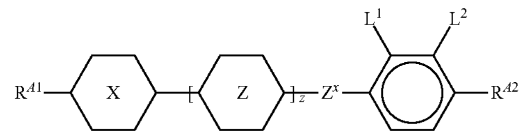

in which the individual radicals, on each occurrence identically or differently, and each, independently of one another, have the following meaning:

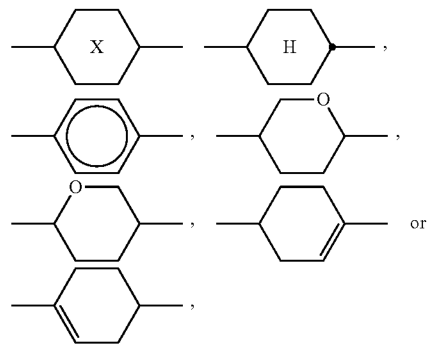

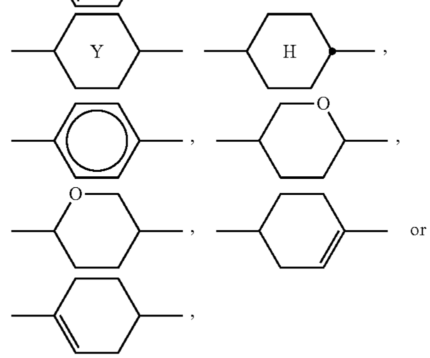

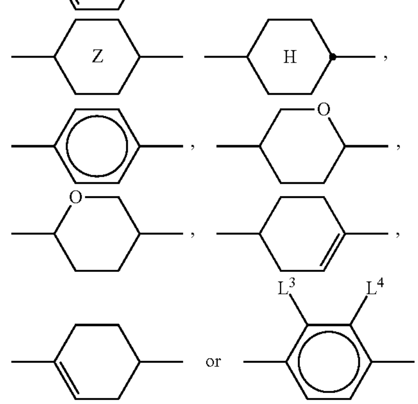

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may be replaced by —O—, —CH═CH—, —CO—, —OCO— or —COO— in such a way that O atoms are not linked directly to one another, $Z^x$ $—CH_2CH_2—$, —CH═CH—, $—CF_2O—$, $—OCF_2—$, $—CH_2O—$, $—OCH_2—$, —CO—O—, —O—CO—, —$C_2F_4$—, —CF═CF—, —CH═CH—$CH_2O$—, or a single bond, preferably a single bond, $L^{1-4}$ H, F, Cl, $OCF_3$, $CF_3$, $CH_3$, $CH_2F$ or $CHF_2H$, preferably H, F or Cl, x 1 or 2, z 0 or 1.

Preferred compounds of formula AN and AY are those wherein $R^{A2}$ is selected from ethenyl, propenyl, butenyl, pentenyl, hexenyl and heptenyl.

Further preferred compounds of formula AN and AY are those wherein $L^1$ and $L^2$ denote F, or one of $L^1$ and $L^2$ denotes F and the other denotes Cl, and $L^3$ and $L^4$ denote F, or one of $L^3$ and $L^4$ denotes F and the other denotes Cl.

The compounds of the formula AN are preferably selected from the following sub-formulae:

AN1

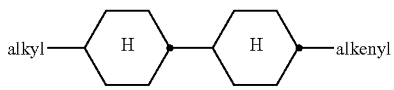

AN2

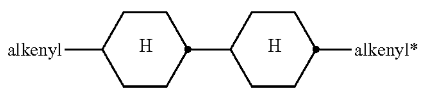

AN3

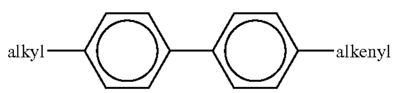

AN4

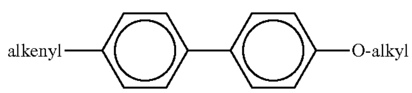

AN5

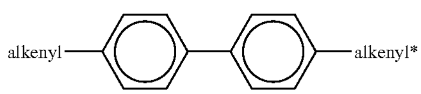

AN6

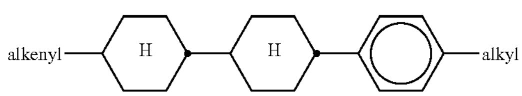

AN7

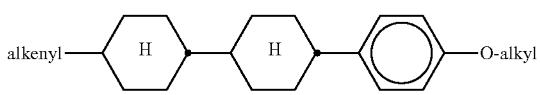

AN8

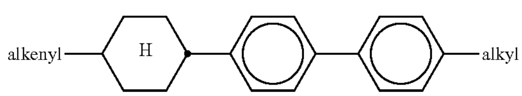

AN9

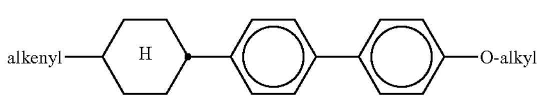

AN10

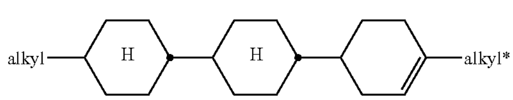

AN11

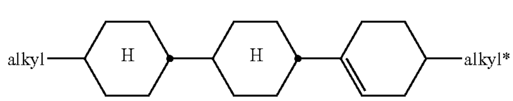

-continued

AN12

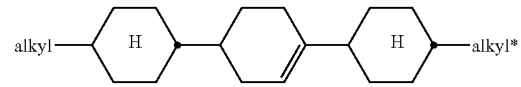

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferred compounds of the formula AN are selected from the following sub-formulae:

AN1a

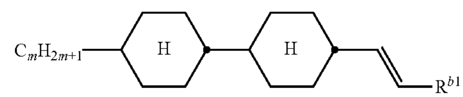

AN3a

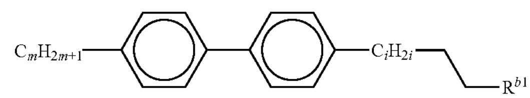

AN6a

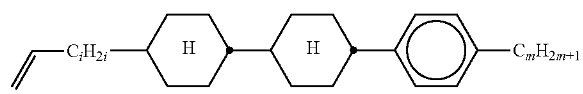

in which m denotes 1, 2, 3, 4, 5 or 6, i denotes 0, 1, 2 or 3, and $R^{b1}$ denotes H, $CH_3$ or $C_2H_5$.

Very particularly preferred compounds of the formula AN are selected from the following sub-formulae:

AN1a1

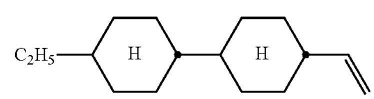

AN1a2

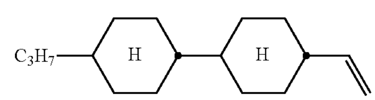

AN1a3

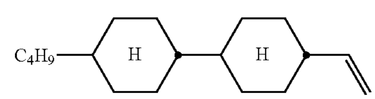

AN1a4

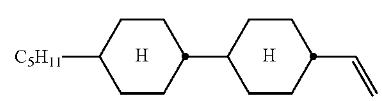

AN1a5

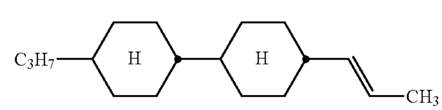

Most preferred are compounds of formula AN1a2 and AN1a5.

The compounds of the formula AY are preferably selected from the following sub-formulae:

-continued
AY1
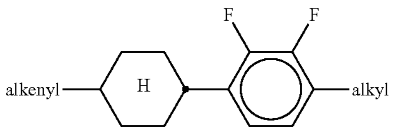
AY2
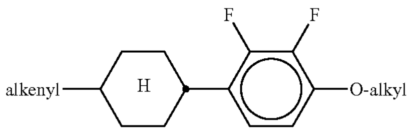
AY3
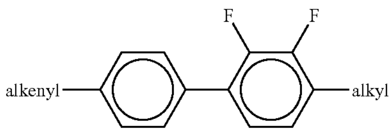
AY4
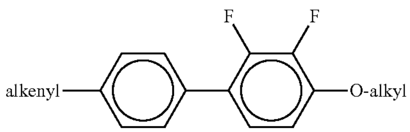
AY5
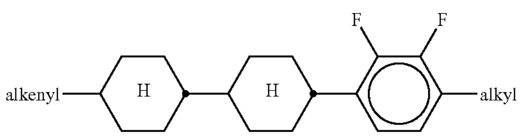
AY6
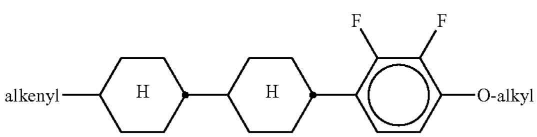
AY7
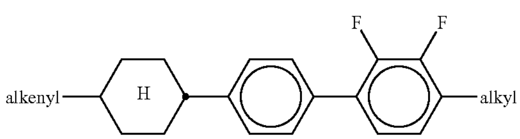
AY8
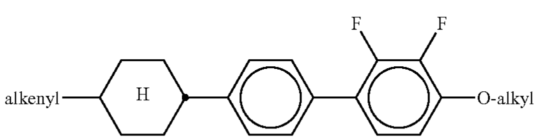
AY9
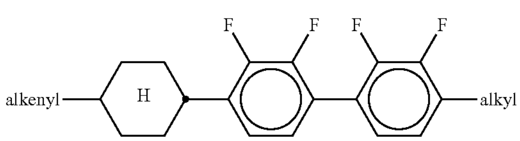
AY10
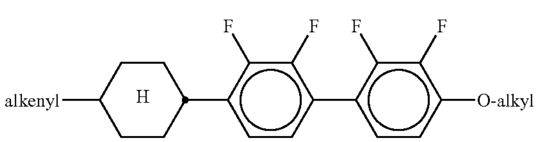
AY11
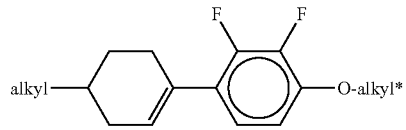
AY12
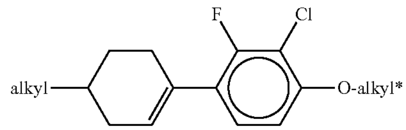
AY13
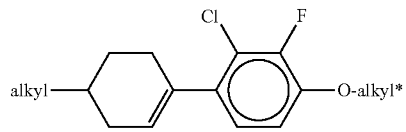
AY14
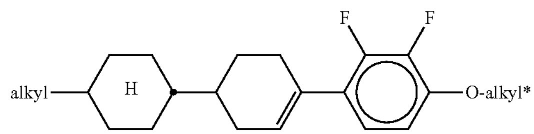
AY15
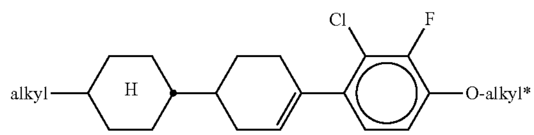
AY16
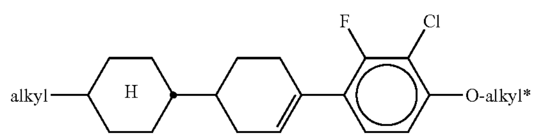
AY17
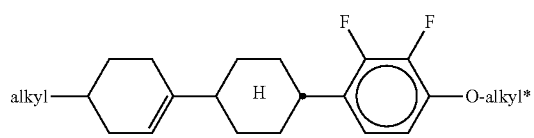
AY18
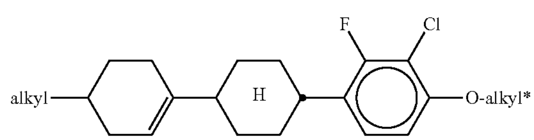
AY19
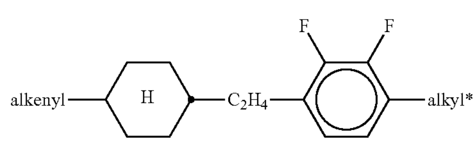
AY20
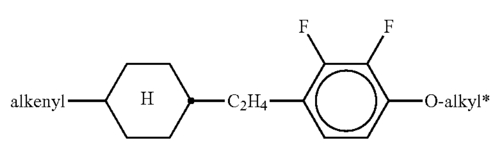

-continued

AY21

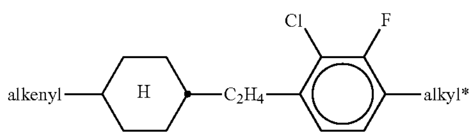

AY22

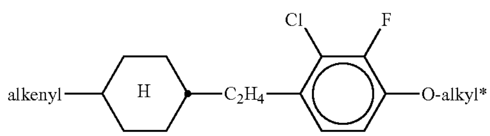

AY23

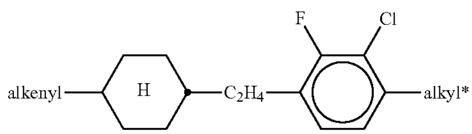

AY24

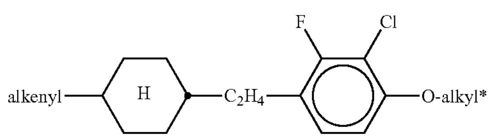

AY25

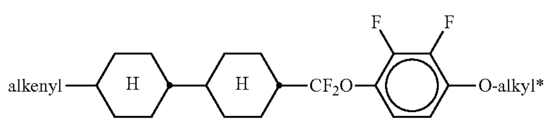

AY26

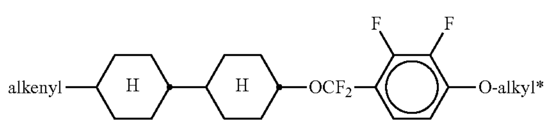

AY27

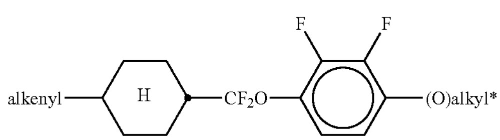

AY28

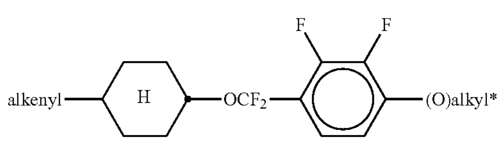

AY29

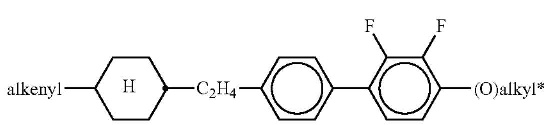

AY30

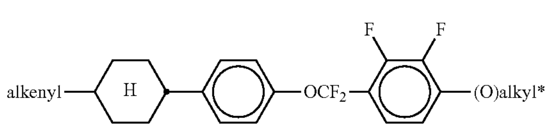

-continued

AY31

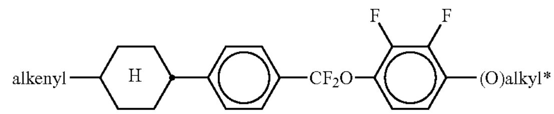

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

In a preferred embodiment of the present invention the LC host mixture, or component B), contains one or more compounds selected from formulae AY14, AY15 and AY16, very preferably one or more compounds of formula AY14.

Very preferred compounds of the formula AY are selected from the following sub-formulae:

AY5a

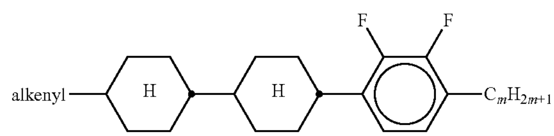

AY6a

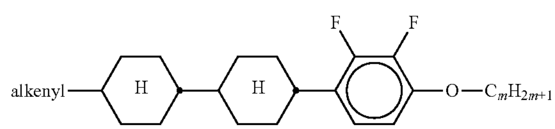

AY9a

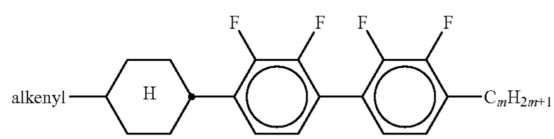

AY10a

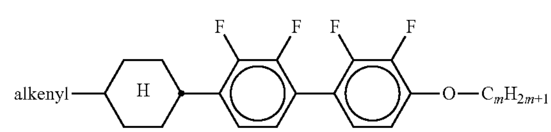

AY11a

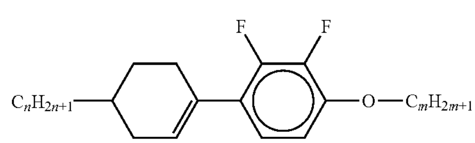

AY14a

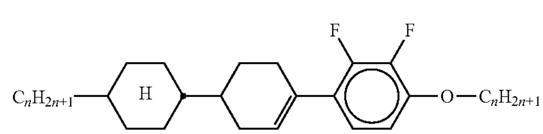

in which m and n each, independently of one another, denote 1, 2, 3, 4, 5 or 6, and alkenyl denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Preferably the proportion of compounds of formula AN and AY in the LC medium is from 2 to 60% by weight, very preferably from 5 to 45% by weight, most preferably from 10 to 40% by weight.

Preferably the LC medium or LC host mixture contains 1 to 5, preferably 1, 2 or 3 compounds selected from formulae AN and AY.

The addition of alkenyl compounds of formula AN and/or AY enables a reduction of the viscosity and response time of the LC medium.

In another preferred embodiment the LC host mixture, or component B), comprises one or more compounds of formula T

T

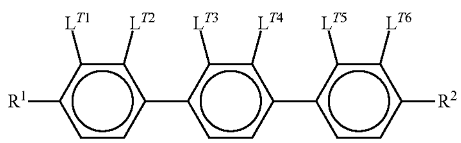

in which the individual radicals, on each occurrence identically or differently, and each, independently of one another, have the following meaning:

$R^1$, $R^2$ alkyl, alkoxy, oxaalkyl or alkoxyalkyl having 1 to 9 C atoms or alkenyl or alkenyloxy having 2 to 9 C atoms, all of which are optionally fluorinated, $L^{T1}$-$L^{T6}$ H, F or Cl, preferably H or F, wherein preferably at least one of $L^{T1}$ to $L^{T6}$ is F or Cl, preferably F, The compounds of the formula T are preferably selected from the group consisting of the following sub-formulae:

T1

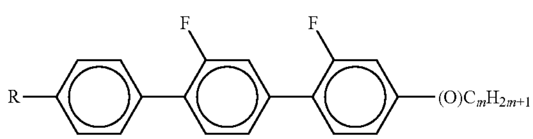

T2

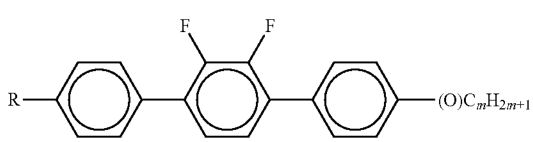

T3

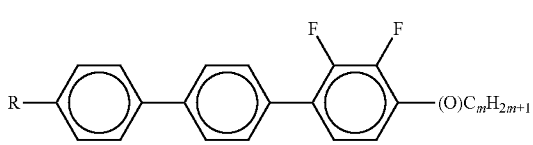

T4

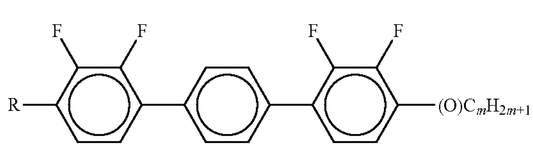

T5

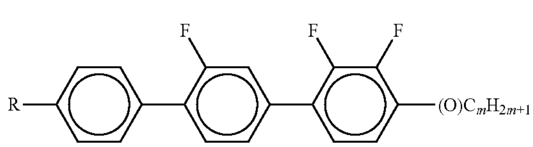

-continued

T6

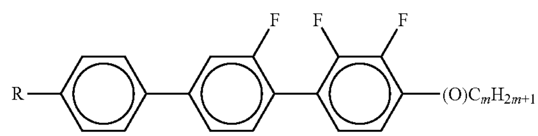

T7

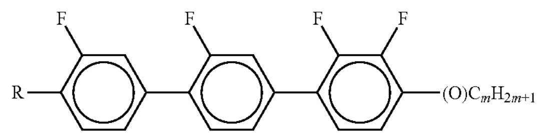

T8

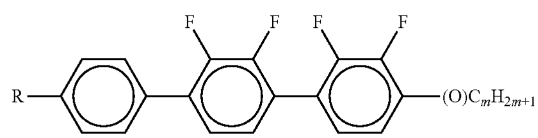

T9

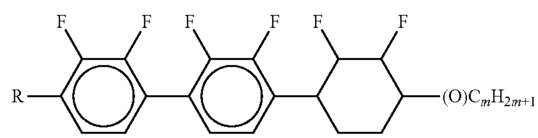

T10

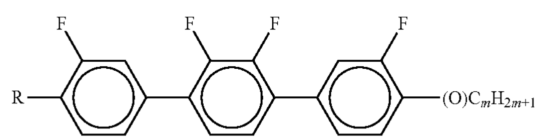

T11

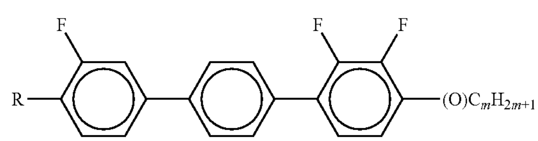

T12

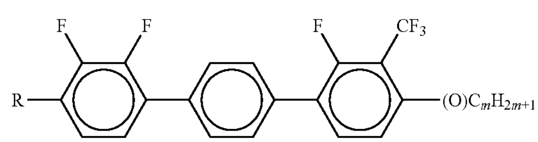

T13

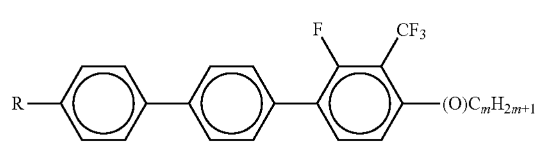

T14

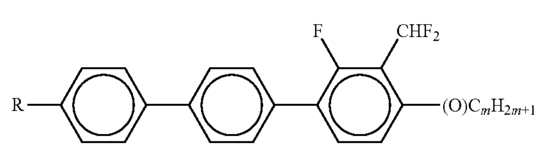

T15

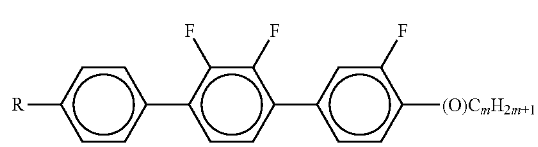

-continued

T16

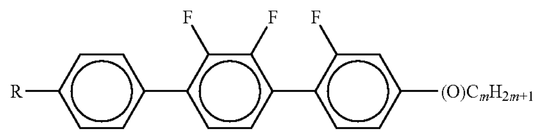

T17

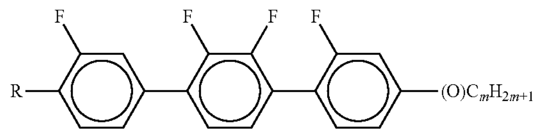

T18

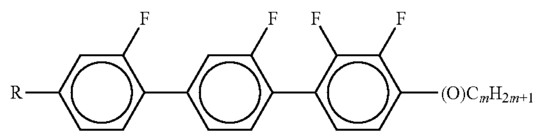

T19

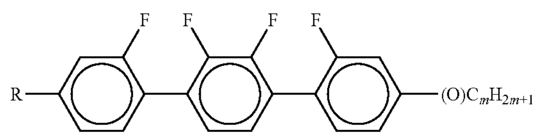

T20

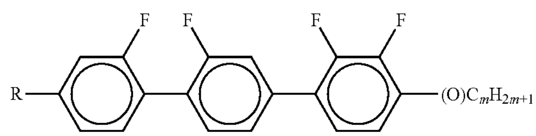

T21

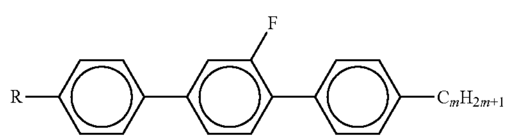

T22

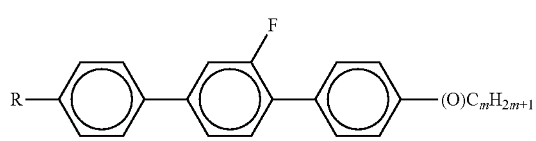

T23

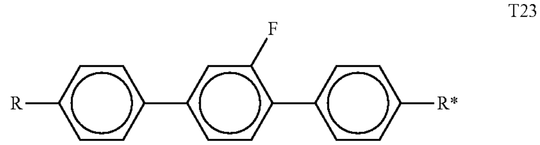

T24

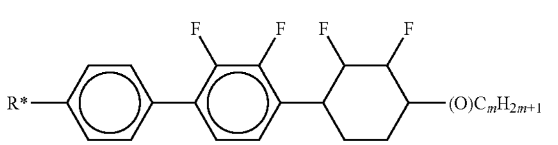

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

R and R* preferably denote methyl, ethyl, propyl, butyl, pentyl, hexyl, methoxy, ethoxy, propoxy, butoxy or pentoxy.

Very preferred are compounds of formulae T1, T2, T3, T5 and T21, especially those of formula T1 and T2 and T5.

Very preferred are compounds of formula T1-T24 wherein (O) denotes an oxygen atom, m is 1, 2, 3, 4 or 5 and R is methyl, ethyl, propyl, butyl of pentyl or hexyl, which are preferably straight-chained.

Preferably, the LC medium does not contain more than 15% of compounds of formula T or T1-T24 or any other compounds with a terphenyl group.

Preferably the proportion of compounds of formula T or T1-T24 or any other compounds with a terphenyl group in the LC medium is from 5 to 15%, very preferably from 5 to 10%.

Preferably the LC medium contains 1 to 5, very preferably 1 or 2 compounds of formula T or T1-T24.

Further preferred embodiments of the present invention are listed below, including any combination thereof.

Preferably the LC medium contains an LC component B), or LC host mixture, based on compounds with negative dielectric anisotropy. Such LC media are especially suitable for use in PS-VA and PS-UB-FFS displays. Particularly preferred embodiments of such an LC medium are those of sections a)-z) below:

a) LC medium which additionally comprises one or more compounds of the following formula:

ZK

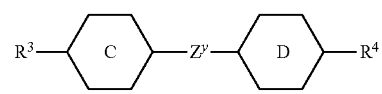

in which the individual radicals have the following meanings:

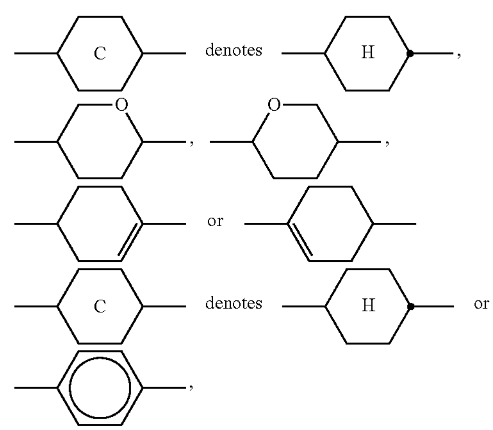

$R^3$ and $R^4$ each, independently of one another, denote alkyl having 1 to 12 C atoms, in which, in addition, one or two non-adjacent $CH_2$ groups may be replaced by —O—, —CH═CH—, —CO—, —O—CO— or —CO—O— in such a way that O atoms are not linked directly to one another, $Z^y$ denotes —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond.

The compounds of the formula ZK are preferably selected from the group consisting of the following sub-formulae:

ZK1

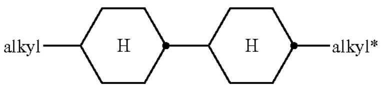

ZK2

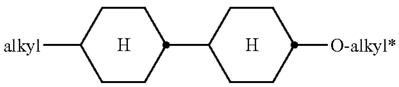

ZK3

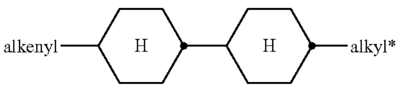

ZK4

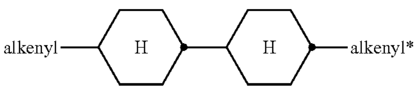

ZK5

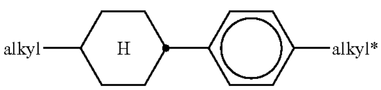

ZK6

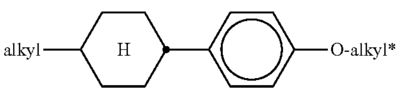

ZK7

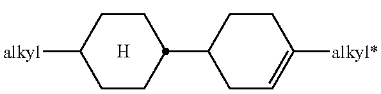

ZK8

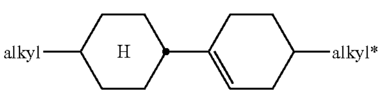

ZK9

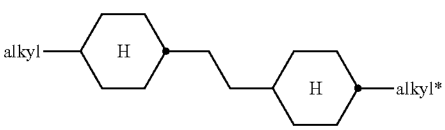

ZK10

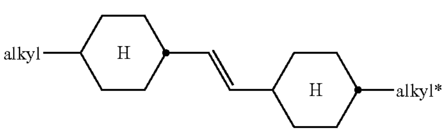

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Especially preferred are compounds of formula ZK1.

Particularly preferred compounds of formula ZK are selected from the following sub-formulae:

ZK1a

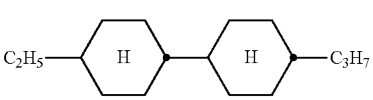

-continued

ZK1b

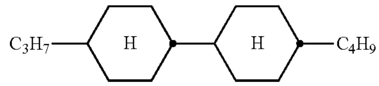

ZK1c

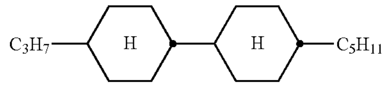

wherein the propyl, butyl and pentyl groups are straight-chain groups.

Most preferred are compounds of formula ZK1a.

b) LC medium which additionally comprises one or more compounds of the following formula:

DK

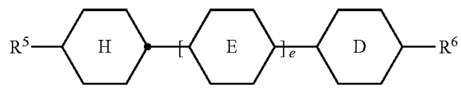

in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms,

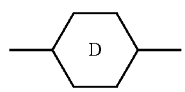 denotes 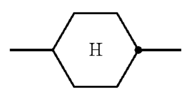 or

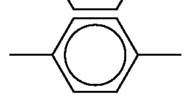,

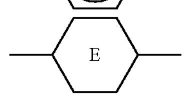 denotes 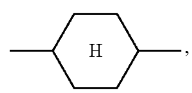,

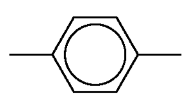 or 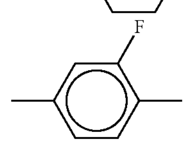, e denotes 1 or 2.

The compounds of the formula DK are preferably selected from the group consisting of the following sub-formulae:

DK1

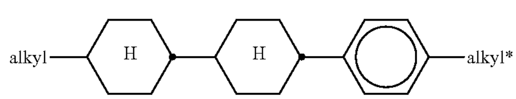

DK2

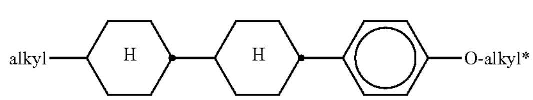

-continued

DK3

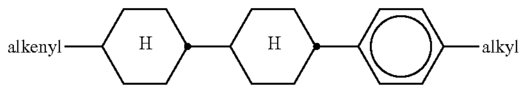

DK4

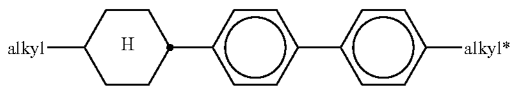

DK5

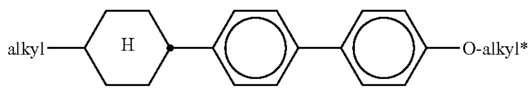

DK6

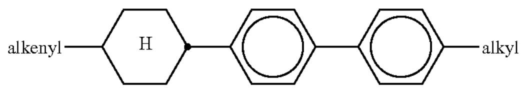

DK7

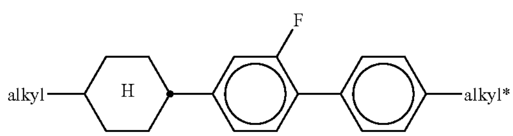

DK8

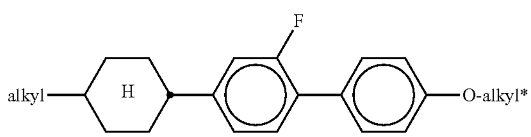

DK9

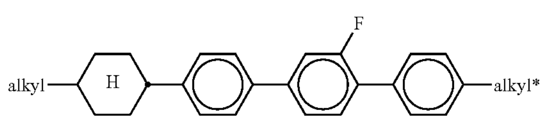

DK10

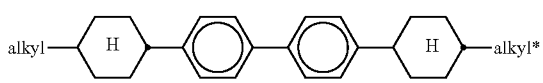

DK11

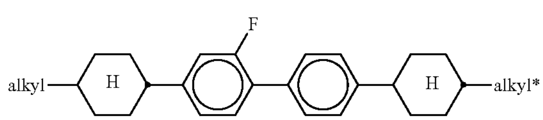

DK12

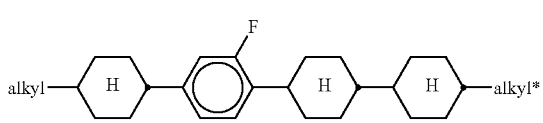

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

c) LC medium which additionally comprises one or more compounds of the following formula:

LY

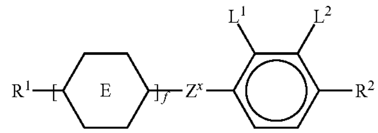

in which the individual radicals have the following meanings:

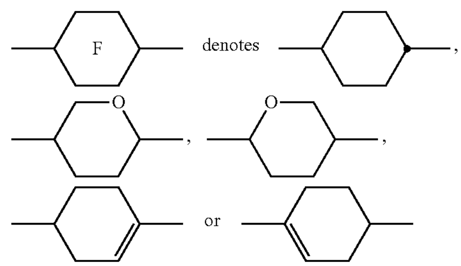

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, $Z^x$ denotes —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond.

$L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1

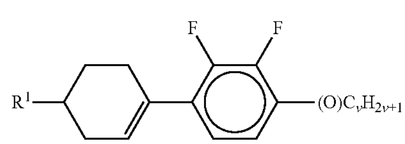

LY2

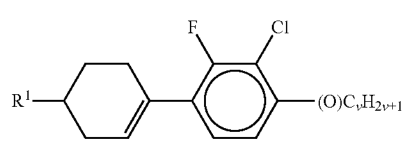

LY3

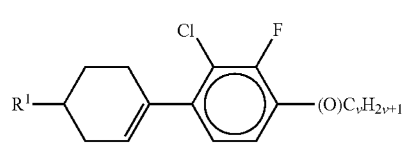

-continued

LY4

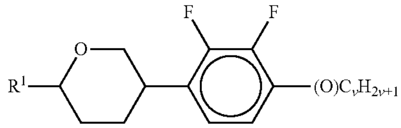

LY5

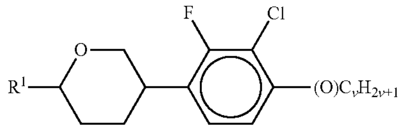

LY6

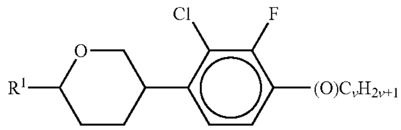

LY7

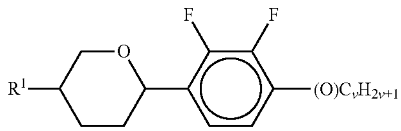

LY8

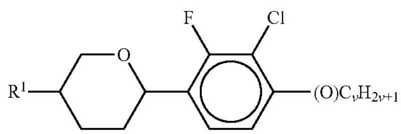

LY9

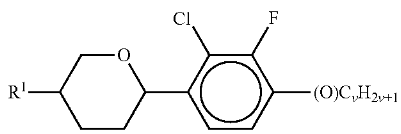

LY10

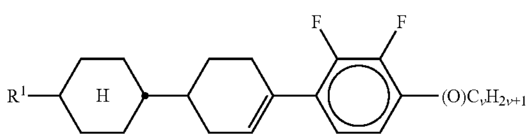

LY11

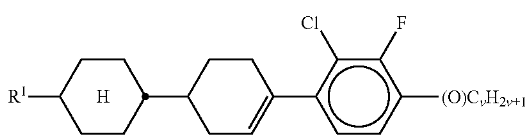

LY12

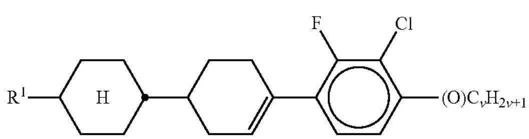

LY13

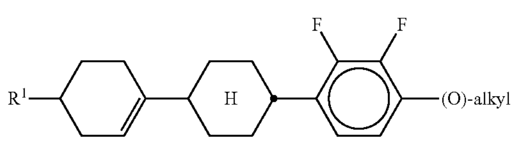

LY14

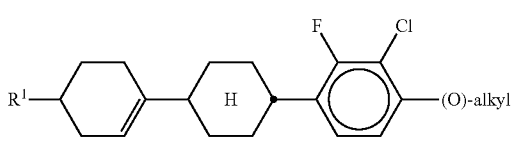

-continued

LY15

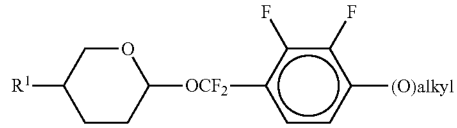

LY16

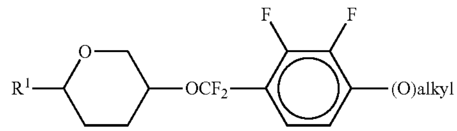

LY17

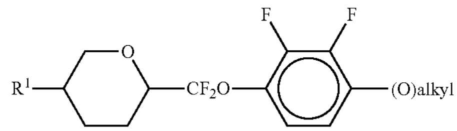

LY18

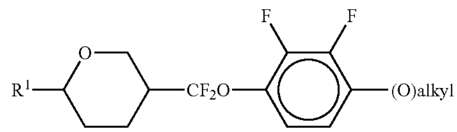

LY19

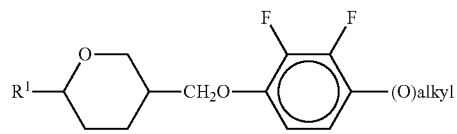

LY20

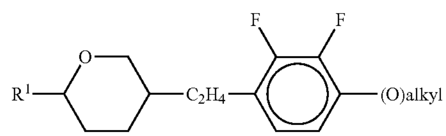

LY21

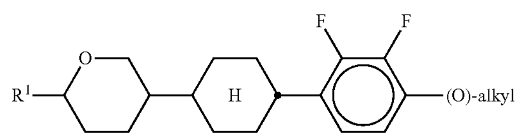

LY22

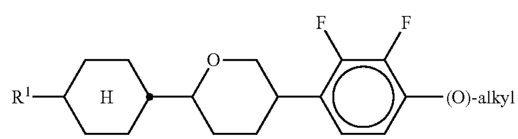

LY23

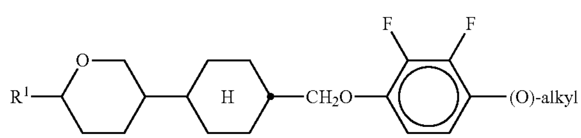

LY24

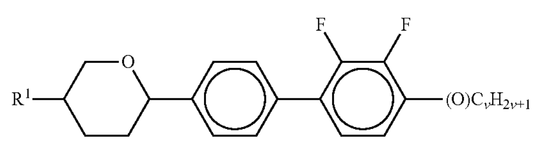

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

d) LC medium which additionally comprises one or more compounds selected from the group consisting of the following formulae:

Anmerkung: T1/Seite 67) und G1 sind identisch

G1

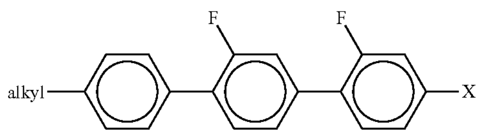

G2

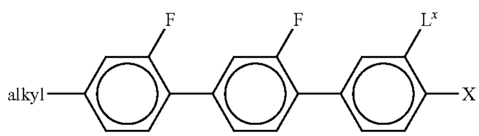

G3

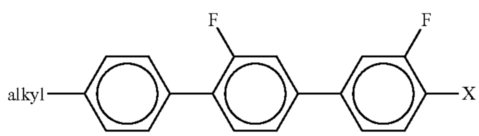

G4

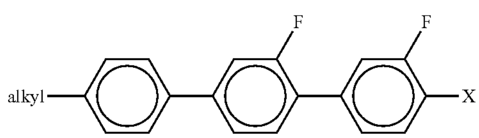

in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

e) LC medium which additionally comprises one or more compounds selected from the group consisting of the following formulae:

Y1

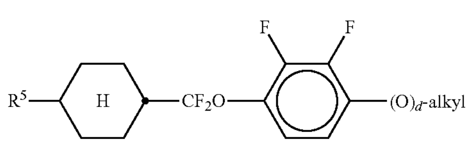

Y2

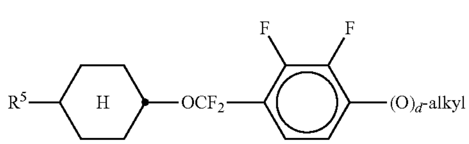

Y3

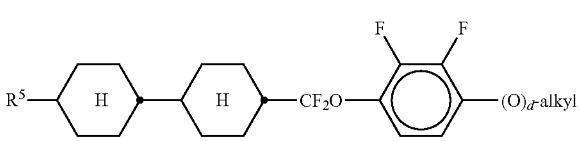

-continued

Y4

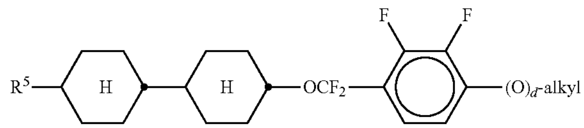

Y5

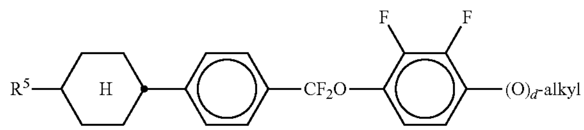

Y6

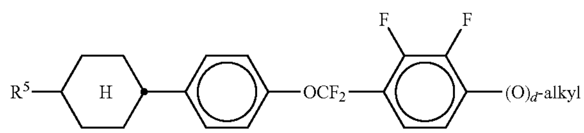

Y7

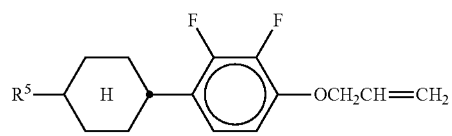

Y8

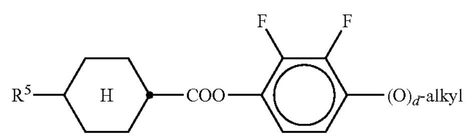

Y9

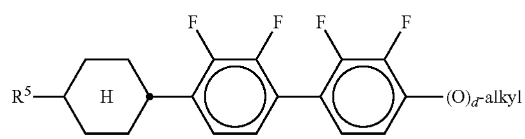

LY10

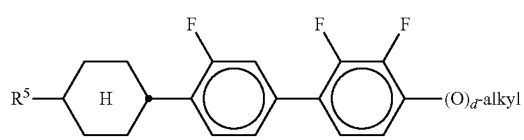

LY11

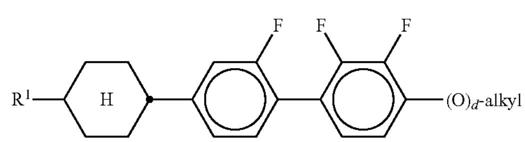

LY12

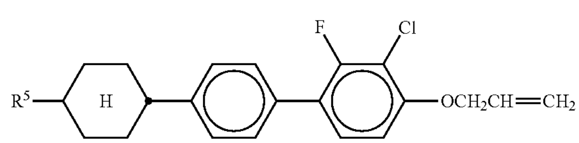

LY13

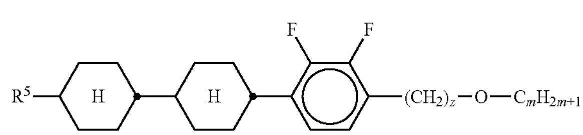

-continued

LY14

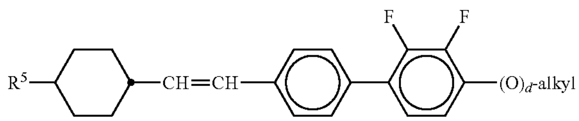

LY15

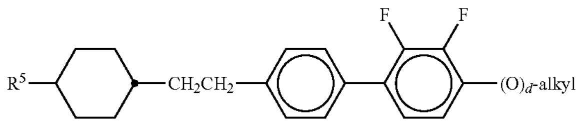

LY16

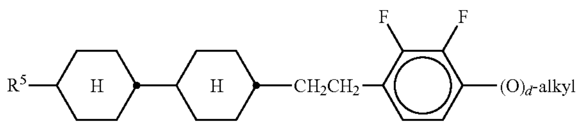

Y10

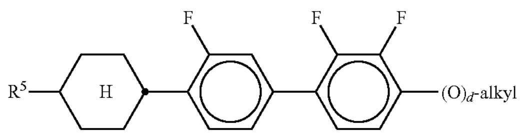

Y11

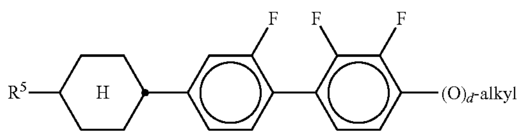

Y12

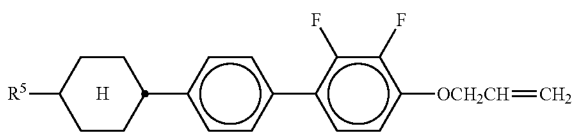

Y13

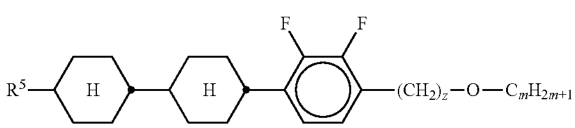

Y14

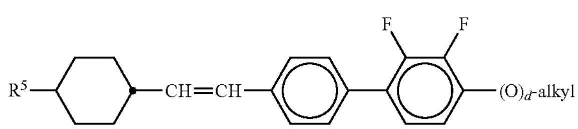

Y15

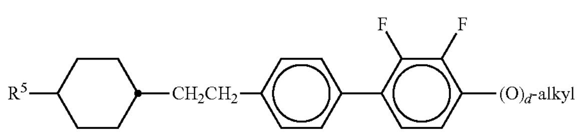

Y16

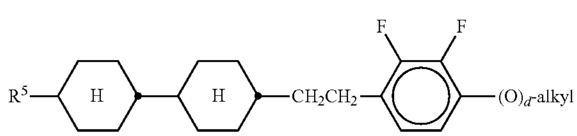

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

f) LC medium which additionally comprises one or more biphenyl compounds selected from the group consisting of the following formulae:

B1a

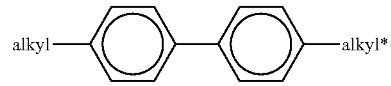

B2a

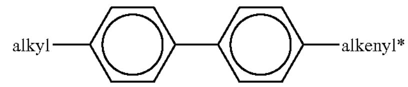

B2b

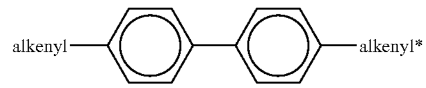

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

B1a

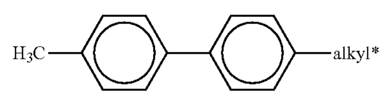

B2a

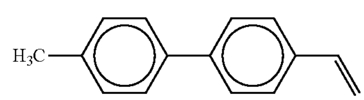

B2b

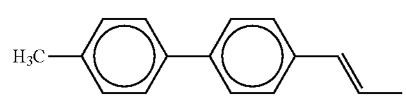

B2c

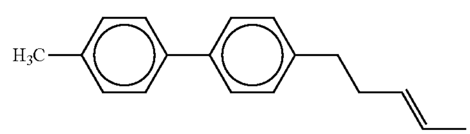

in which alkyl* denotes an alkyl radical having 1-6 C atoms. The medium according to the invention particularly preferably comprises one or more compounds of the formulae B1a and/or B2c.

g) LC medium which additionally comprises one or more quaterphenyl compounds selected from the group consisting of the following formulae:

Q

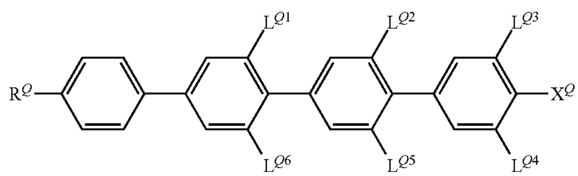

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

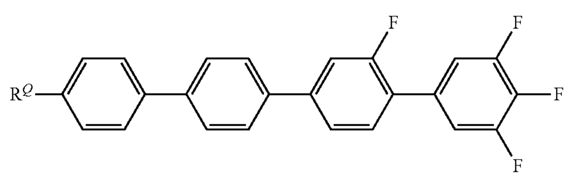

Q2

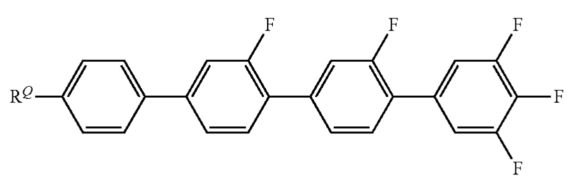

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC medium is from >0 to ≤5% by weight, very preferably from 0.1 to 2% by weight, most preferably from 0.2 to 1.5% by weight.

Preferably the LC medium contains 1 to 5, preferably 1 or 2 compounds of formula Q.

The addition of quaterphenyl compounds of formula Q to the LC medium mixture enables to reduce ODF mura, whilst maintaining high UV absorption, enabling quick and complete polymerisation, enabling strong and quick tilt angle generation, and increasing the UV stability of the LC medium.

Besides. the addition of compounds of formula Q, which have positive dielectric anisotropy, to the LC medium with negative dielectric anisotropy allows a better control of the values of the dielectric constants $\varepsilon_{\|}$ and $\varepsilon_{\perp}$ and in particular enables to achieve a high value of the dielectric constant $\varepsilon_{\|}$ while keeping the dielectric anisotropy $\Delta\varepsilon$ constant, thereby reducing the kick-back voltage and reducing image sticking.

h) LC medium which additionally comprises one or more compounds of formula C:

C

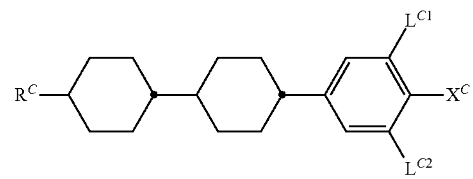

wherein $R^C$ denotes alkyl, alkoxy, oxaalkyl or alkoxyalkyl having 1 to 9 C atoms or alkenyl or alkenyloxy having 2 to 9 C atoms, all of which are optionally fluorinated, $X^C$ denotes F, Cl, halogenated alkyl or alkoxy having 1 to 6 C atoms or halogenated alkenyl or alkenyloxy having 2 to 6 C atoms, $L^{C1}$, $L^{C2}$ independently of each other denote H or F, with at least one of $L^{C1}$ and $L^{C2}$ being F.

Preferred compounds of formula C are those wherein $R^C$ denotes straight-chain alkyl with 2 to 6 C-atoms, very preferably ethyl, n-propyl or n-butyl.

Preferred compounds of formula C are those wherein $L^{C1}$ and $L^{C2}$ are F.

Preferred compounds of formula C are those wherein $X^C$ denotes F or $OCF_3$, very preferably F.

Preferred compounds of formula C are selected from the following formula

C1

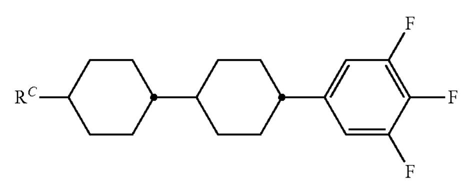

wherein $R^C$ has one of the meanings of formula C or one of its preferred meanings given above and below, and is preferably ethyl, n-propyl or n-butyl, very preferably n-propyl.

Preferably the proportion of compounds of formula C in the LC medium is from >0 to ≤10% by weight, very preferably from 0.1 to 8% by weight, most preferably from 0.2 to 5% by weight.

Preferably the LC medium contains 1 to 5, preferably 1, 2 or 3 compounds of formula C.

The addition of compounds of formula C, which have positive dielectric anisotropy, to the LC medium with negative dielectric anisotropy allows a better control of the values of the dielectric constants $\vartheta_{\|}$ and $\varepsilon_{\perp}$ and in particular enables to achieve a high value of the dielectric constant $\varepsilon_{\|}$ while keeping the dielectric anisotropy $\Delta\varepsilon$ constant, thereby reducing the kick-back voltage and reducing image sticking. Besides, the addition of compounds of formula C enables to reduce the viscosity and the response time of the LC medium.

i) LC medium which additionally comprises one or more compounds selected from the group consisting of the following formulae:

O1

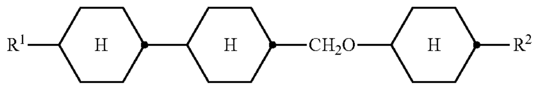

O2

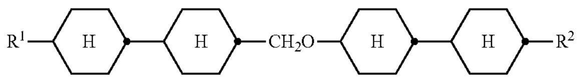

O3

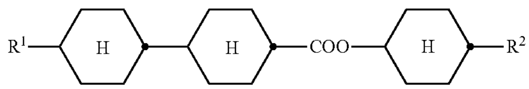

O4

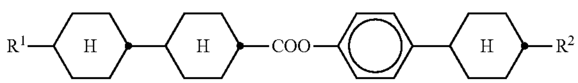

O5

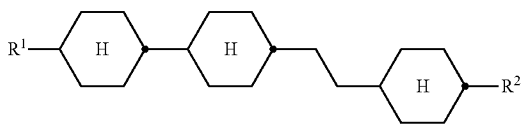

O6

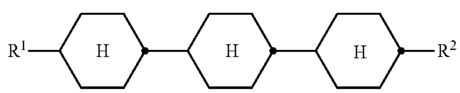

O7

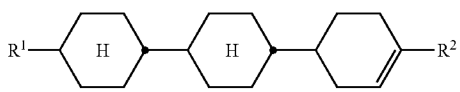

O8

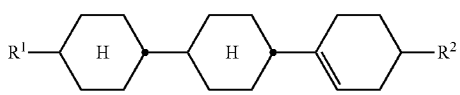

O9

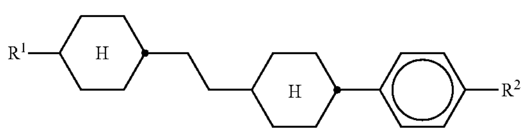

O10

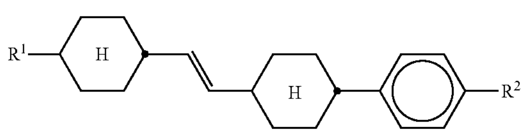

O11

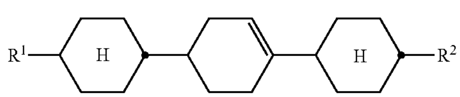

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae 01, 03 and 04.

k) LC medium which additionally comprises one or more compounds of the following formula:

FI

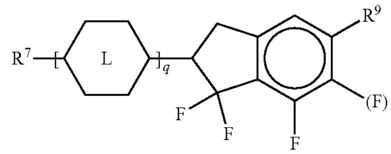

in which

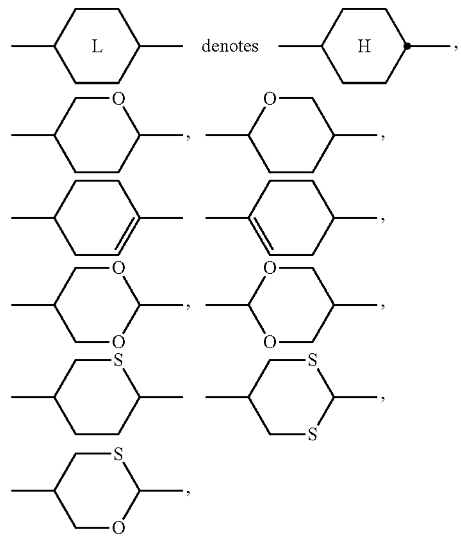

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1

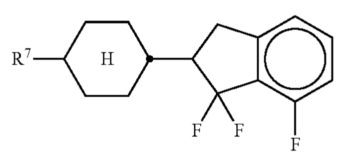

FI2

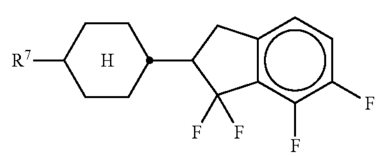

FI3

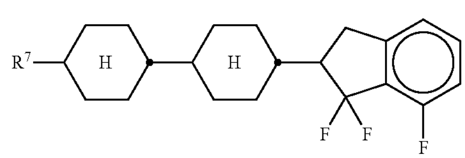

-continued

FI4

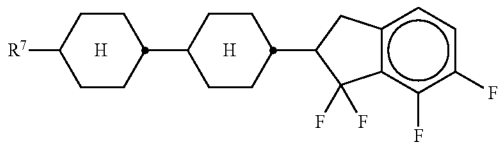

FI5

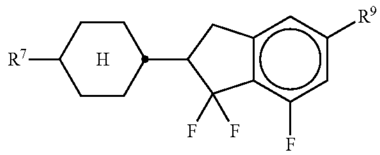

FI6

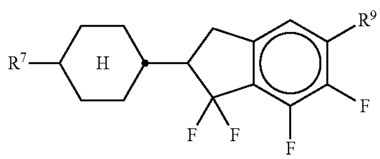

FI7

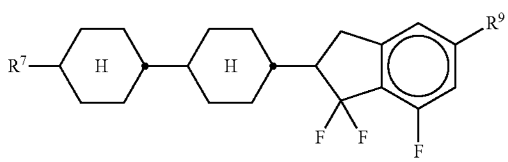

FI8

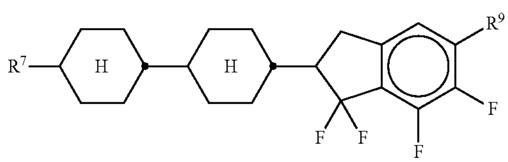

in which $R^7$ preferably denotes straight-chain alkyl, and $R^9$ denotes $CH_3$, $C_2H_5$ or n-$C_3H_7$. Particular preference is given to the compounds of the formulae $F_{11}$, $F_{12}$ and $F_{13}$.

l) LC medium which additionally comprises one or more compounds selected from the group consisting of the following formulae:

VK1

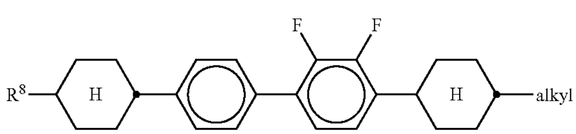

VK2

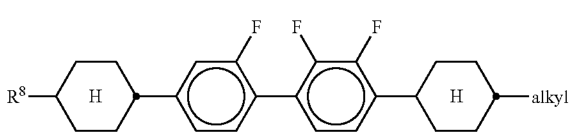

VK3

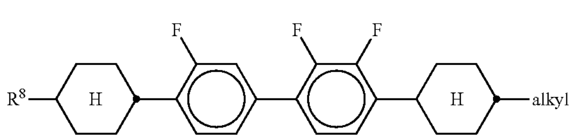

-continued

VK4

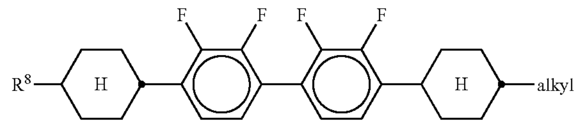

in which $R^8$ has the meaning indicated for $R^1$, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

N1

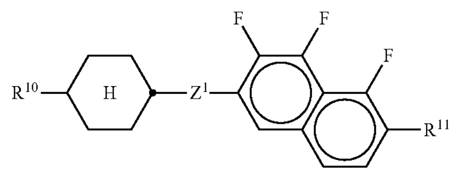

N2

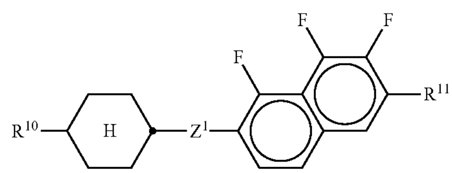

N3

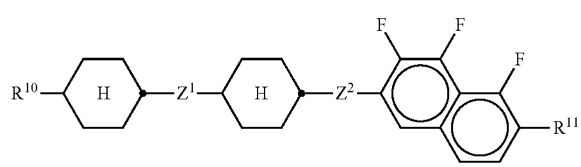

N4

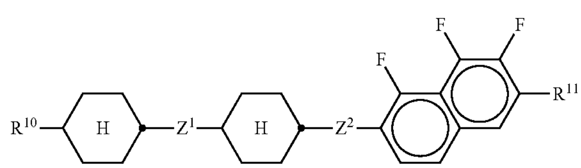

N5

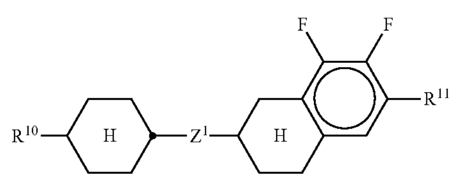

N6

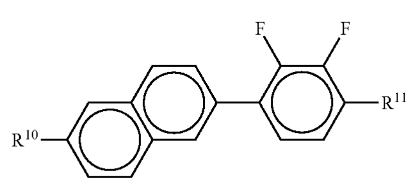

-continued

N7

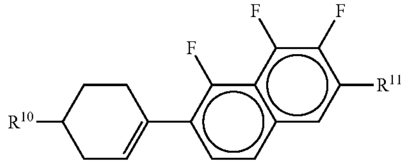

N8

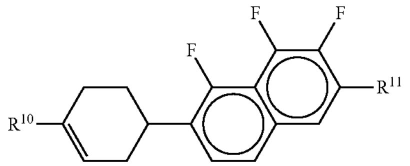

N9

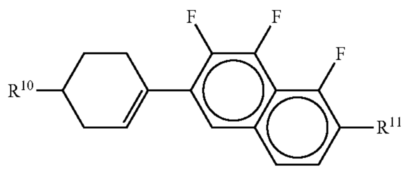

N10

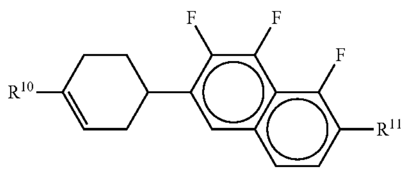

in which $R^{10}$ and $R^{11}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH═CH—, —$(CH_2)_4$—, —$(CH_2)_3O$—, —$O(CH_2)_3$—, —CH═CH—$CH_2CH_2$—, —$CH_2CH_2$CH═CH—, —$CH_2O$—, —$OCH_2$—, —CO—O—, —O—CO—, —$C_2F_4$—, —CF═CF—, —CF═CH—, —CH═CF—, —$CH_2$— or a single bond.

n) LC medium which additionally comprises one or more difluorodibenzo-chromans and/or chromans of the following formulae:

BC

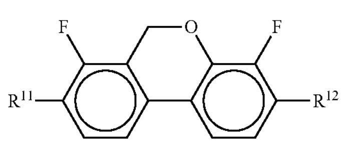

CR

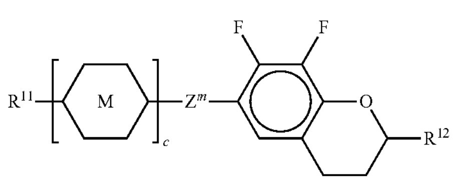

-continued

RC

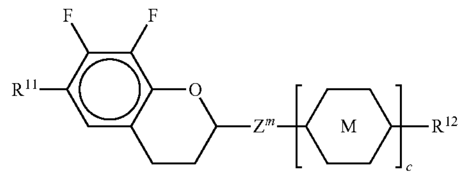

in which $R^{11}$ and $R^{12}$ each, independently of one another, have one of the meanings indicated above for $R^{11}$, ring M is trans-1,4-cyclohexylene or 1,4-phenylene, $Z^m$ —$C_2H_4$—, —$CH_2O$—, —$OCH_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1

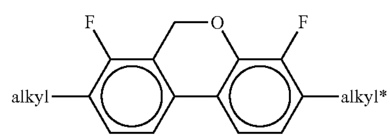

BC2

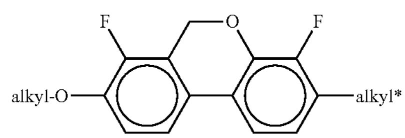

BC3

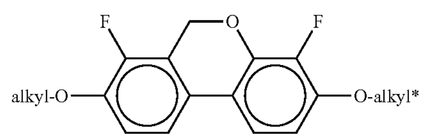

BC4

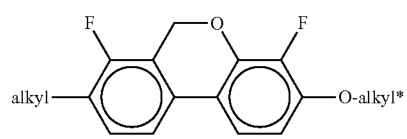

BC5

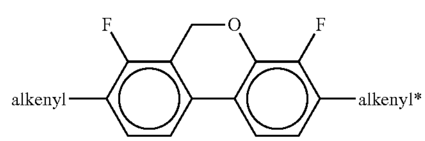

BC6

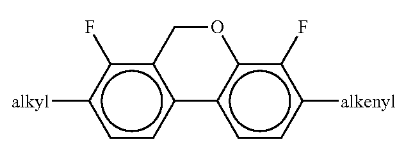

BC7

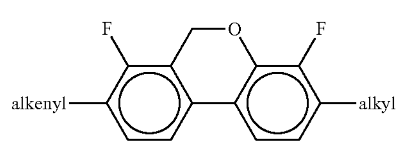

-continued

CR1

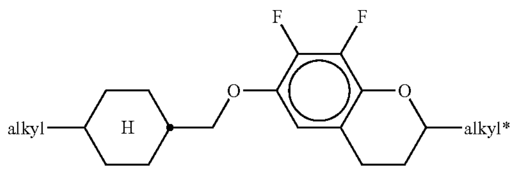

CR2

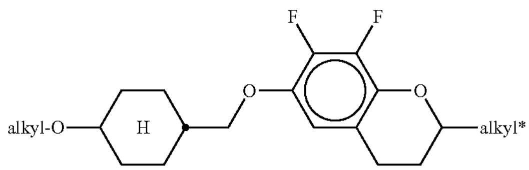

CR3

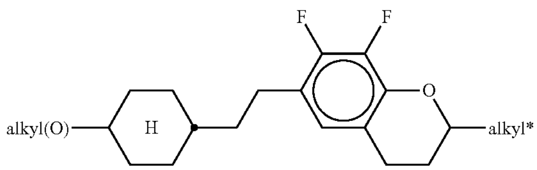

CR4

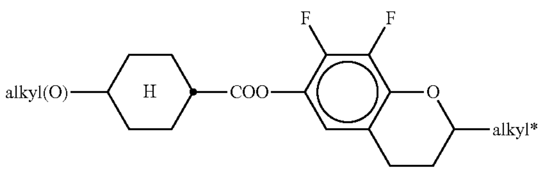

CR5

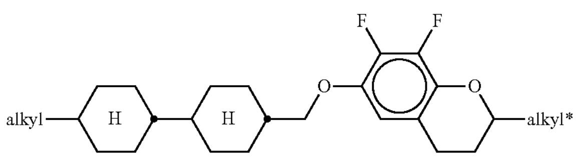

CR6

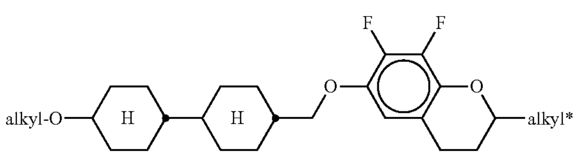

CR7

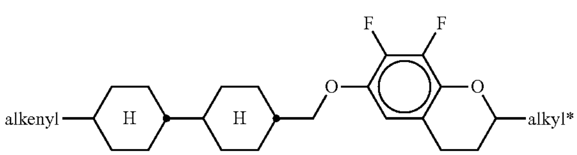

CR8

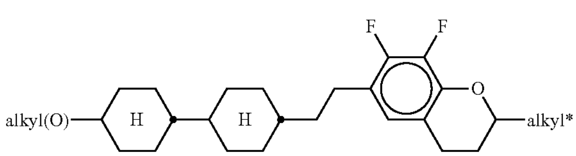

-continued

CR9

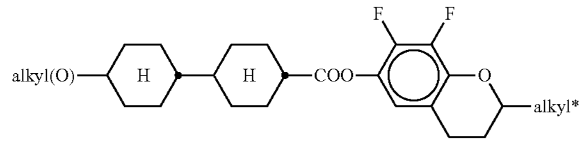

RC1

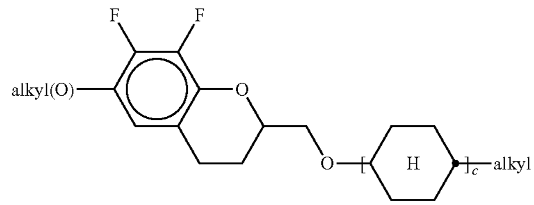

RC2

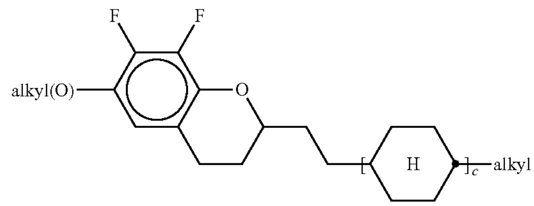

RC3

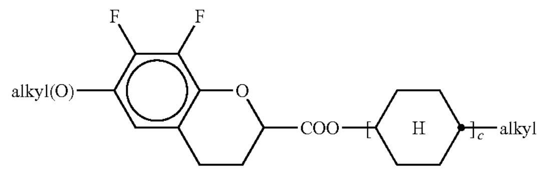

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2{=}CH$—, $CH_2{=}CHCH_2CH_2$—, $CH_3$—$CH{=}CH$—, $CH_3$—$CH_2$—$CH{=}CH$—, $CH_3$—$(CH_2)_2$—$CH{=}CH$—, $CH_3$—$(CH_2)_3$—$CH{=}CH$— or $CH_3$—$CH{=}CH$—$(CH_2)_2$—.

Very particular preference is given to mixtures comprising one, two or three compounds of the formula BC-2.

o) LC medium which additionally comprises one or more fluorinated phenanthrenes and/or dibenzofurans of the following formulae:

PH

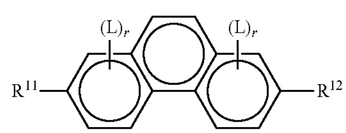

BF

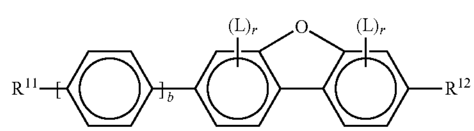

in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

PH1

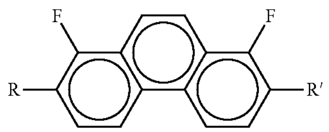

PH2

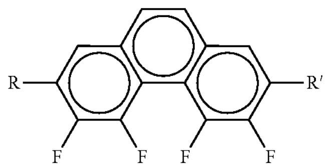

BF1

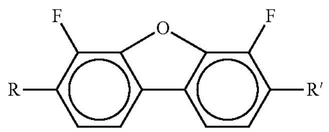

BF2

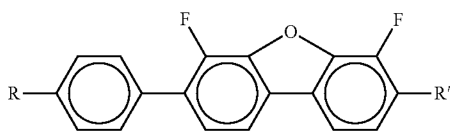

in which R and R' each, independently of one another, denote a straight-chain alkyl or alkoxy radical having 1-7 C atoms.

p) LC medium which additionally comprises one or more monocyclic compounds of the following formula

Y

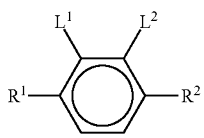

wherein $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

Y1

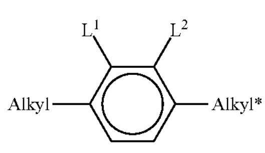

-continued

Y2

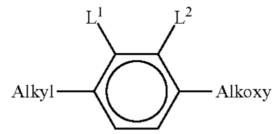

Y3

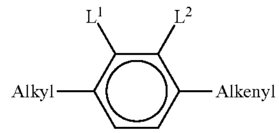

Y4

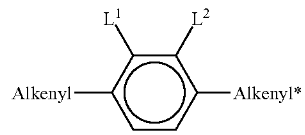

Y5

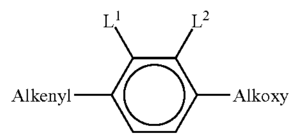

Y6

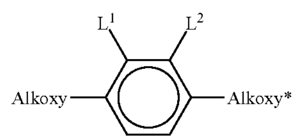

Y7

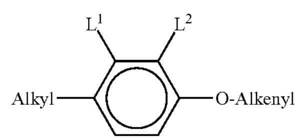

Y8

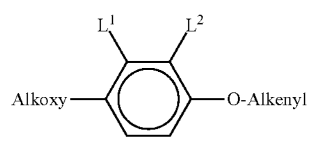

Y9

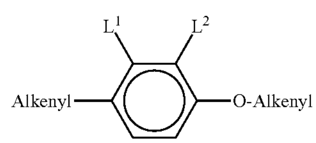

Y10

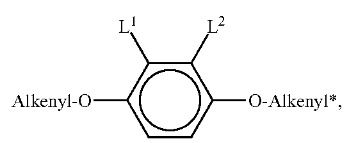

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred compounds of the formula Y are selected from the group consisting of the following sub-formulae:

Y6A

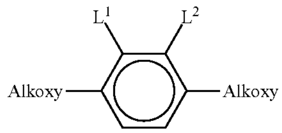

Y6B

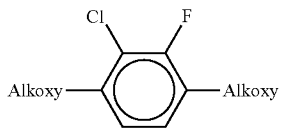

wherein Alkoxy preferably denotes straight-chain alkoxy with 3, 4, or 5 C atoms.

q) LC medium which, apart from the polymerisable compounds according to the invention, in particular of the formula I or sub-formulae thereof and the comonomers, comprises no compounds which contain a terminal vinyloxy group (—O—CH═$CH_2$).

r) LC medium in which the LC host mixture comprises 1 to 8, preferably 1 to 5, compounds of the formulae CY1, CY2, PY1 and/or PY2. The proportion of these compounds in the LC host mixture as a whole is preferably 5 to 70%, particularly preferably 10 to 35%. The content of these individual compounds is preferably in each case 2 to 20%.

s) LC medium in which the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

t) LC medium in which the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 25%, particularly preferably 5 to 45%. The content of these individual compounds is preferably in each case 2 to 20%.

u) LC medium wherein the proportion of compounds of formulae CY, PY and ZK in the LC host mixture as a whole is greater than 70%, preferably greater than 80%.

v) LC medium in which the LC host mixture contains one or more compounds containing an alkenyl group, preferably selected from formulae AN and AY, very preferably selected from formulae AN1, AN3, AN6 and AY14, most preferably from formulae AN1a, AN3a, AN6a and AY14. The concentration of these compounds in the LC host mixture is preferably from 2 to 70%, very preferably from 3 to 55%.

w) LC medium in which the LC host mixture contains one or more, preferably 1 to 5, compounds selected of formula PY1-PY8, very preferably of formula PY2. The proportion of these compounds in the LC host mixture as a whole is preferably 1 to 30%, particularly preferably 2 to 20%. The content of these individual compounds is preferably in each case 1 to 20%.

x) LC medium wherein component B) or the LC host mixture contains one or more, preferably 1, 2 or 3, compounds selected from formulae T1, T2, T3, T5 and T21, very preferably from formula T2. The content of these compounds in the LC host mixture as a whole is preferably 1 to 20%.

z) LC medium in which the LC host mixture contains one or more, preferably 1, 2 or 3, compounds of formula BF1, and one or more, preferably 1, 2 or 3, compounds selected from formulae AY14, AY15 and AY16, very preferably of formula AY14. The proportion of the compounds of formula AY14-AY16 in the LC host mixture is preferably from 2 to 35%, very preferably from 3 to 30%. The proportion of the compounds of formula BF1 in the LC host mixture is preferably from 0.5 to 20%, very preferably from 1 to 15%. Further preferably the LC host mixture according to this preferred embodiment contains one or more, preferably 1, 2 or 3 compounds of formula T, preferably selected from formula T1, T2, T3 and T5, very preferably from formula T1 or T2. The proportion of the compounds of formula T in the LC host mixture medium is preferably from 0.5 to 15%, very preferably from 1 to 10%.

In the LC medium according to the present invention, the use of an LC host mixture comprising compounds of formula CY and/or PY together with the use of a polymerisable component comprising a combination of a first and a second polymerisable compound as described above leads to advantageous properties in LC displays. In particular, one or more of the following advantages could be achieved:

easy and quick formation of polymer walls by polymerisation-induced phase separation of the polymer formed by the first and second polymerisable compounds, formation of polymer walls with highly defined shape and constant thickness, constant cell gap, high flexibility of the display cell in case plastic substrates are used, high resistance of the display cell against mechanical pressure, and low variation of the cell gap under pressure, good adhesion of the polymer walls to the substrates, low number of defects, reduced formation of domains with different electrooptical properties like response time or contrast, high transparency, good contrast, fast response times.

The display manufacture process is known to the skilled person and is described in the literature, for example in U.S. Pat. No. 6,130,738 and EP2818534 A1.

The present invention also relates to a process for the production of an LC display as described above and below, comprising the steps of providing an LC medium as described above and below into the display, and polymerising the polymerisable compounds in defined regions of the display.

Preferably the polymerisable compounds are photopolymerised by exposure to UV irradiation.

Further preferably the polymerisable compounds are photopolymerised by exposure to UV irradiation through a photomask.

The photomask is preferably designed such that it comprises regions that are transparent to the UV radiation used for photopolymerisation, and regions that are not transparent to the UV radiation used for photopolymerisation, and wherein the transparent regions form a pattern or image that corresponds to the desired shape of the polymer walls. As a result the polymerisable compounds are only polymerised in those parts of the display that are covered by the transparent regions of the photomask, thus forming polymer walls of the desired shape.

In a preferred embodiment of the present invention, the display is subjected to a second UV irradiation step, preferably without a photomask applied, after the first UV irradiation step as described above. Thereby it is possible to complete polymerisation of monomers that were not or only partially polymerised in the first step.

For example, an LC display according to the present invention can be manufactured as follows. Polymerisable compounds as described above and below are combined with a suitable LC host mixture. This resulting LC medium can then be included into the display by using conventional manufacturing processes. The resulting LC medium can be filled for example using capillary forces into the cell gap formed by two substrates.

Alternatively, the LC medium can be deposited as a layer onto a substrate, and another substrate is placed on top of the LC layer under vacuum in order to prevent inclusion of air bubbles. The LC medium is in either case located in the cell gap formed by the two substrates, as exemplarily illustrated in FIG. 1*a*. These substrates usually are covered by an alignment layer which is in direct contact with the LC medium. The substrates itself can carry other functional components like TFTs, black matrix, colour filter, or similar.

Subsequently, polymerization induced phase separation is initiated by exposure of the LC medium, which is either in the nematic or the isotropic phase, to UV radiation with collimated light through a photomask, as exemplarily illustrated in FIG. 1*b*. This leads to the formation of polymer wall structures, restoration of the LC host, and alignment of the LC phase with the alignment layer, as exemplarily illustrated in FIG. 1*c*.

Polymerisation of the polymerisable compounds in the LC medium is preferably carried out a room temperature. At the polymerisation temperature the LC medium can be in the nematic or isotropic phase, depending on the concentration of the polymerisable compounds. For example, if the polymerisable compounds are present in higher concentration, for example above 10-15%, it is possible that the LC medium is in the isotropic phase at room temperature.

This process can advantageously utilize display manufacturing processes that are established in the industry. Thus, both the display filling process, for example by one-drop-filling (ODF), and the radiation initiated polymerization step after sealing the display, which is known for example from polymer stabilised or PS-type display modes like PS-VA, are established techniques in conventional LCD manufacturing.

A preferred LC display of the present invention comprises:

- a first substrate including a pixel electrode defining pixel areas, the pixel electrode being connected to a switching element disposed in each pixel area and optionally including a micro-slit pattern, and optionally a first alignment layer disposed on the pixel electrode,
- a second substrate including a common electrode layer, which may be disposed on the entire portion of the second substrate facing the first substrate, and optionally a second alignment layer,
- an LC layer disposed between the first and second substrates and including an LC medium comprising a polymerisable component A) and a liquid-crystalline component B) as described above and below, wherein the polymerisable component A) is polymerised.

The LC display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for VA displays a multi-domain orientation of the LC molecules can be induced by providing electrodes having slits and/or bumps or protrusions in order to create two, four or more different tilt alignment directions.

The first and/or second alignment layer controls the alignment direction of the LC molecules of the LC layer. For example, in TN displays the alignment layer is selected such that it imparts to the LC molecules an orientation direction parallel to the surface, while in VA displays the alignment layer is selected such that it imparts to the LC molecules a homeotropic alignment, i.e. an orientation direction perpendicular to the surface. Such an alignment layer may for example comprise a polyimide, which may also be rubbed, or may be prepared by a photoalignment method.

The substrate can be a glass substrate. The use of an LC medium according to the present invention in an LC display with glass substrates can provide several advantages. For example, the formation of polymer wall structures in the LC medium helps to prevent the so-called “pooling effect” where pressure applied on the glass substrates causes unwanted optical defects. The stabilizing effect of the polymer wall structures also allows to further minimize the panel thickness. Moreover, in bent panels with glass substrates the polymer wall structures enable a smaller radius of curvature.

For flexible LC displays preferably plastic substrates are used. These plastic substrates preferably have a low birefringence. Examples are polycarbonate (PC), polyethersulfone (PES), polycyclic olefine (PCO), polyarylate (PAR), polyetheretherketone (PEEK), or colourless polyimide (CPI) substrates.

The LC layer with the LC medium can be deposited between the substrates of the display by methods that are conventionally used by display manufacturers, for example the one-drop-filling (ODF) method. The polymerisable component of the LC medium is then polymerised for example by UV photopolymerisation.

The polymerisation can be carried out in one step or in two or more steps. It is also possible to carry out the polymerisation in a sequence of several UV irradiation and/or heating or cooling steps. For example, a display manufacturing process may include a first UV irradiation step at room temperature to start polymerisation, and subsequently, in a second polymerisation step to polymerise or crosslink the compounds which have not reacted in the first step (“end curing”).

Upon polymerisation the polymerisable compounds react with each other to a polymer which undergoes macroscopical phase-separation from the LC host mixture and forms polymer walls in the LC medium.

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium contains a polymerisation initiator.

The LC medium may also comprise one or more stabilisers or inhibitors in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-500,000 ppm, particularly preferably 50-50,000 ppm.

Preferably the LC medium according to the present invention does essentially consist of a polymerisable component A) and an LC component B) (or LC host mixture) as described above and below. However, the LC medium may additionally comprise one or more further components or additives.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

Preferred additives are selected from the list including but not limited to comonomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:

(n, m, z: in each case, independently of one another, 1, 2, 3, 4, 5 or 6)

TABLE A

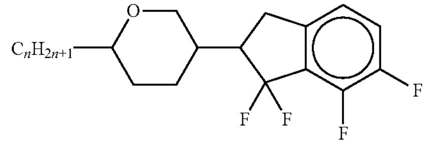

AIK-n-F

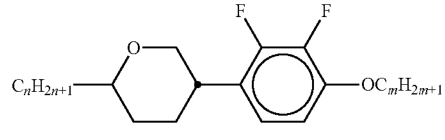

AIY-n-Om

TABLE A-continued
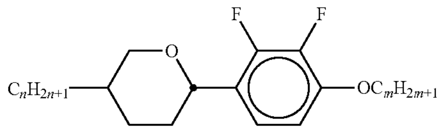
AY-n-Om
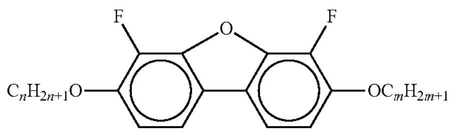
B-nO-Om
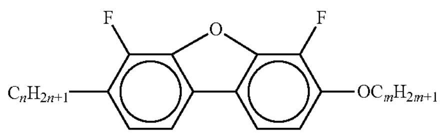
B-n-Om
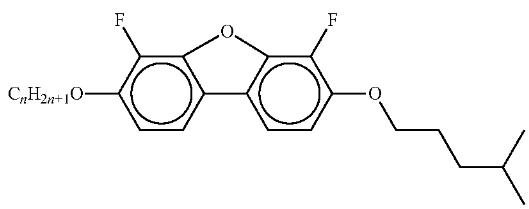
B-nO-O5i
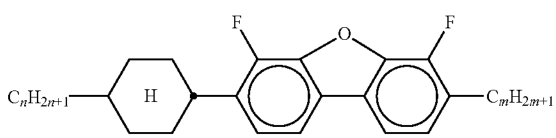
CB-n-m
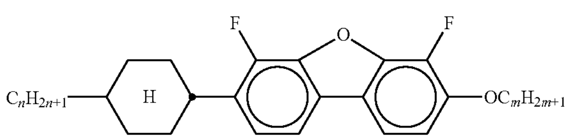
CB-n-Om
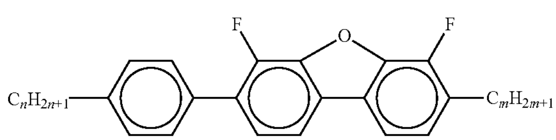
PB-n-m
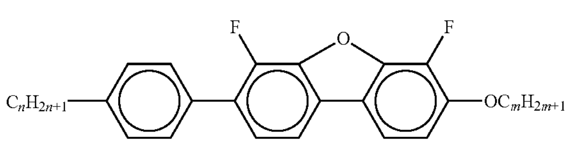
PB-n-Om TABLE A-continued
BCH-nm
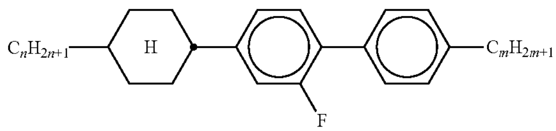
BCH-nmF
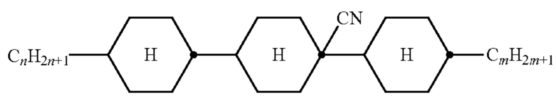
BCN-nm
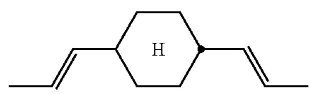
C-1V-V1
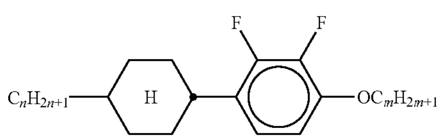
CY-n-Om
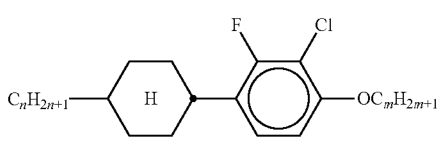
CY(F,Cl)-n-Om
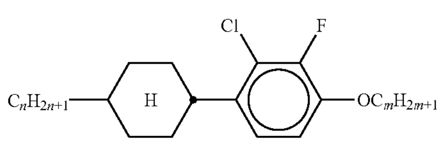
CY(Cl,F)-n-Om
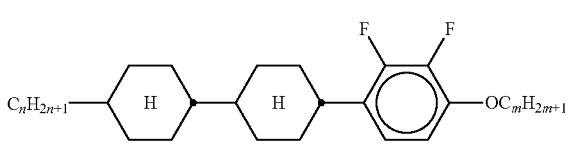
CCY-n-Om
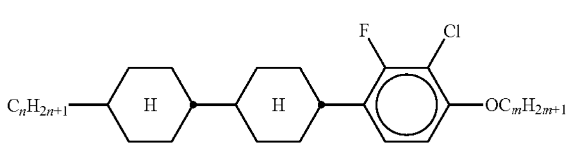
CCY(F,Cl)-n-Om TABLE A-continued
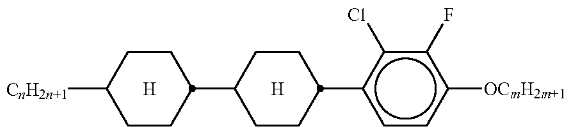
CCY(Cl,F)-n-Om
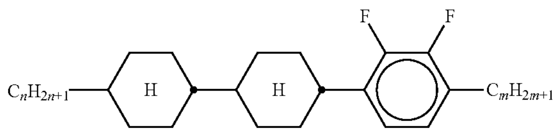
CCY-n-m
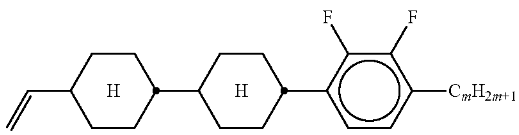
CCY-V-m
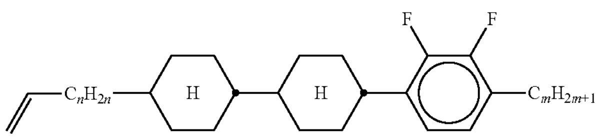
CCY-Vn-m
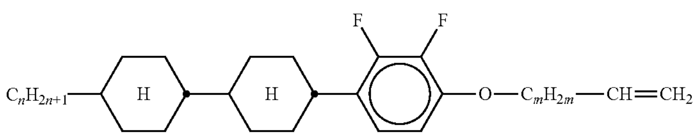
CCY-n-OmV
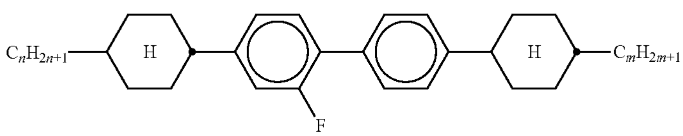
CBC-nmF
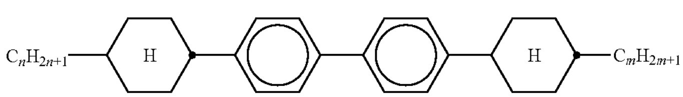
CBC-nm
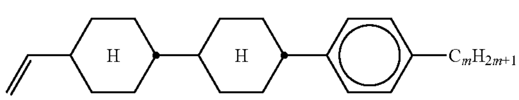
CCP-V-m
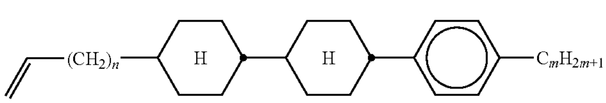
CCP-Vn-m TABLE A-continued
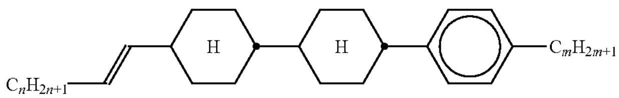
CCP-nV-m
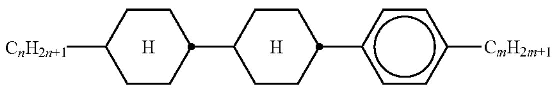
CCP-n-m
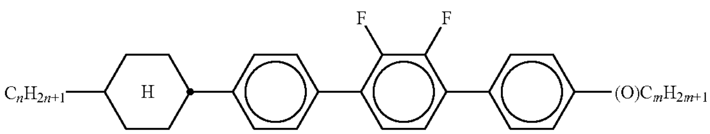
CPYP-n-(O)m
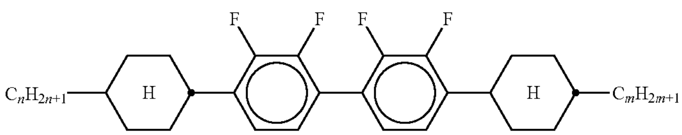
CYYC-n-m
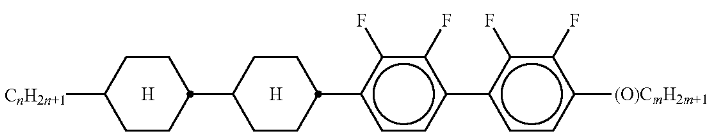
CCYY-n-(O)m
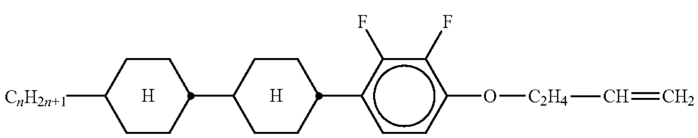
CCY-n-O2V
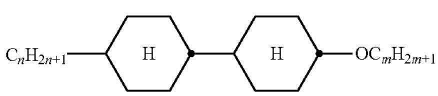
CCH-nOm
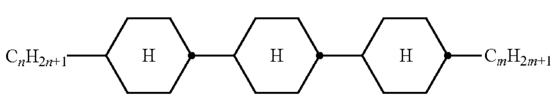
CCC-n-m
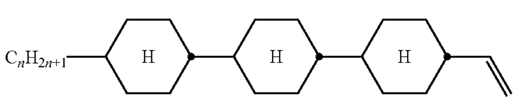
CCC-n-V
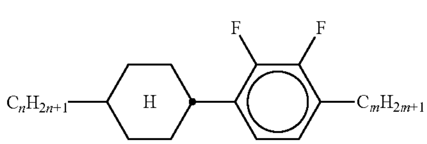
CY-n-m TABLE A-continued
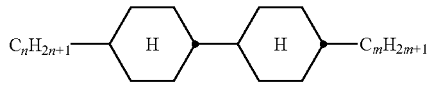
CCH-nm
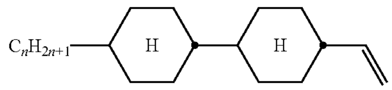
CC-n-V
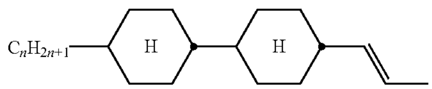
CC-n-V1
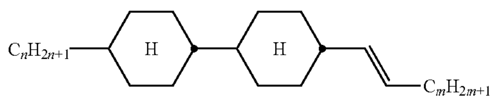
CC-n-Vm
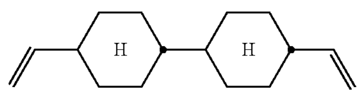
CC-V-V
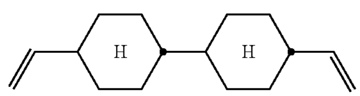
CC-V-V1
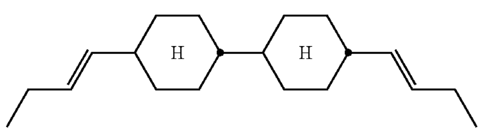
CC-2V-V2
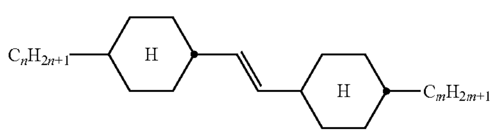
CVC-n-m
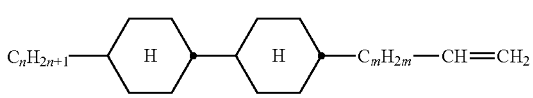
CC-n-mV
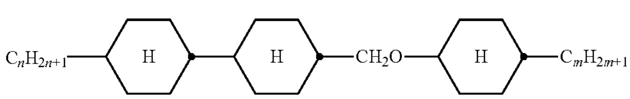
CCOC-n-m TABLE A-continued
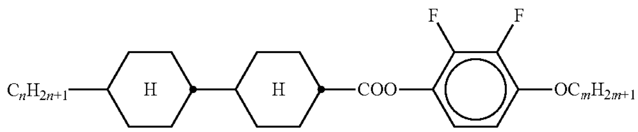
CP-nOmFF
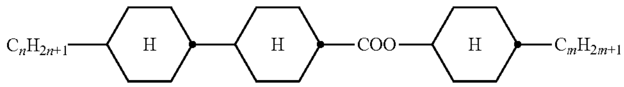
CH-nm
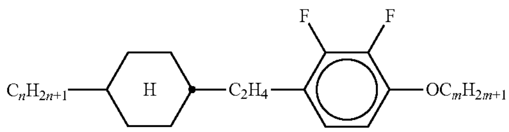
CEY-n-Om
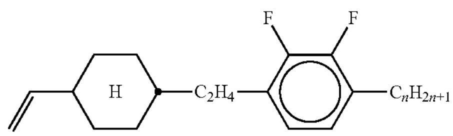
CEY-V-n
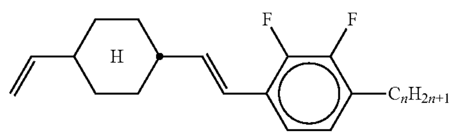
CVY-V-n
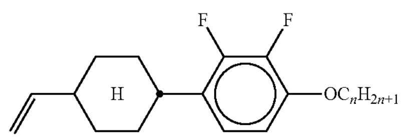
CY-V-On
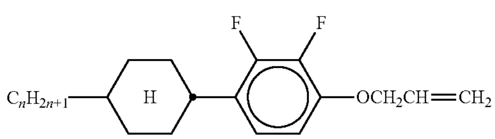
CY-n-O1V
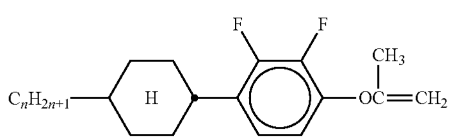
CY-n-OC(CH$_3$)═CH$_2$
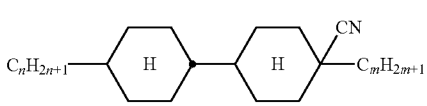
CCN-nm TABLE A-continued
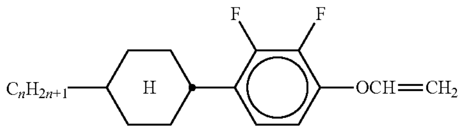
CY-n-OV
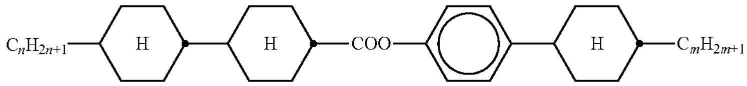
CCPC-nm
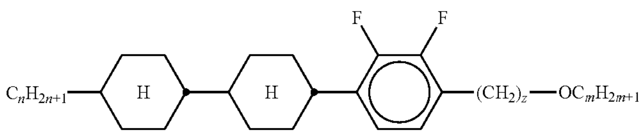
CCY-n-zOm
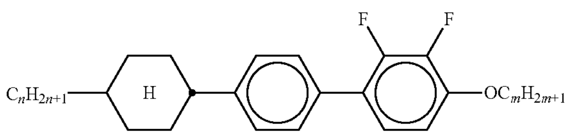
CPY-n-Om
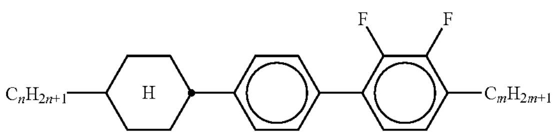
CPY-n-m
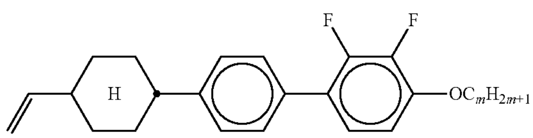
CPY-V-Om
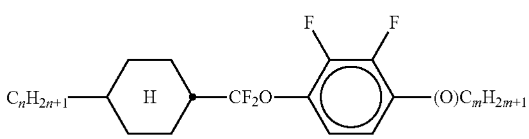
CQY-n-(O)m
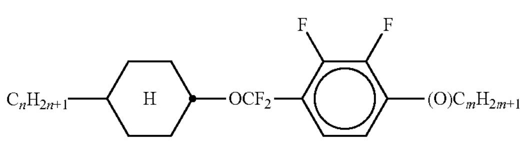
CQIY-n-(O)m
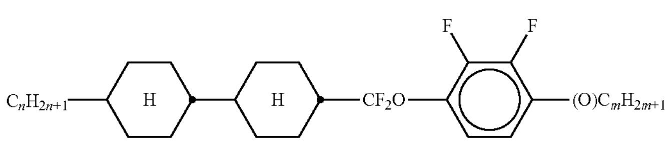
CCQY-n-(O)m TABLE A-continued
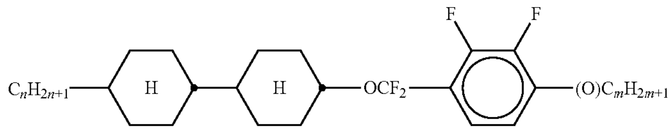
CCQIY-n-(O)m
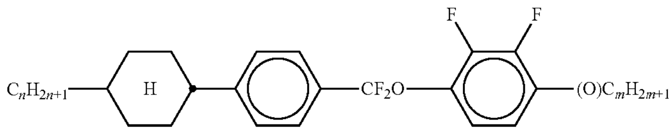
CPQY-n-(O)m
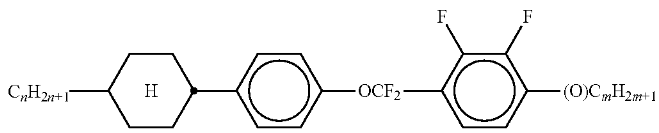
CPQIY-n-(O)m
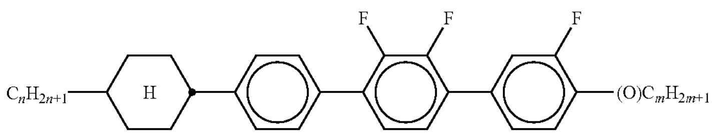
CPYG-n-(O)m
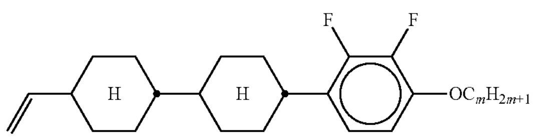
CCY-V-Om
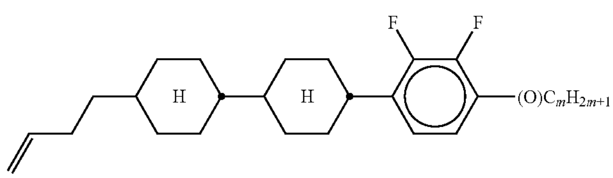
CCY-V2-(O)m
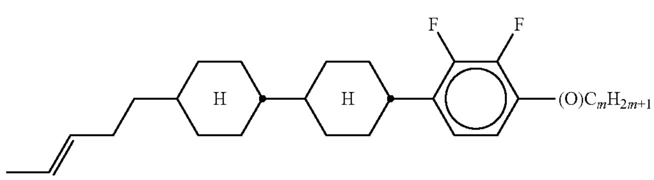
CCY-1V2-(O)m
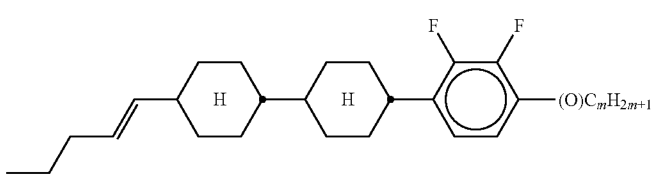
CCY-3V-(O)m TABLE A-continued
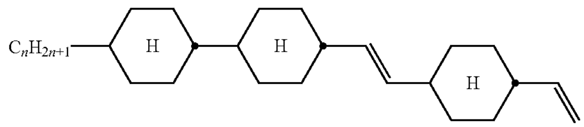
CCVC-n-V
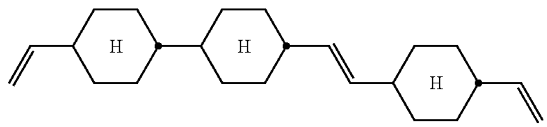
CCVC-V-V
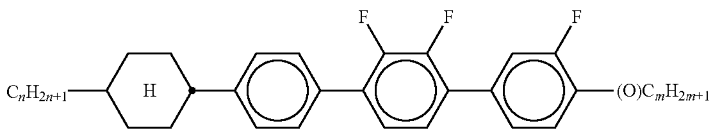
CPYG-n-(O)m
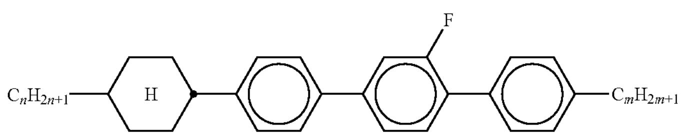
CPGP-n-m
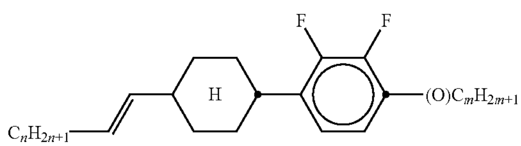
CY-nV-(O)m
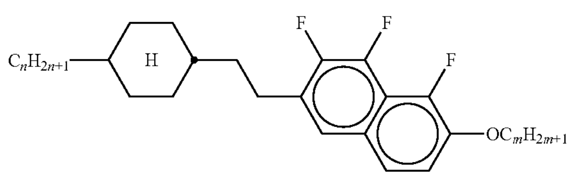
CENaph-n-Om
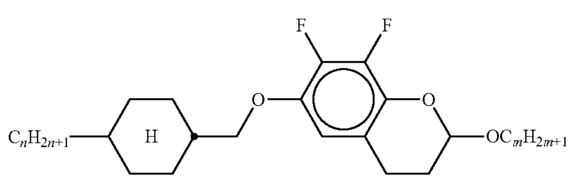
COChrom-n-Om
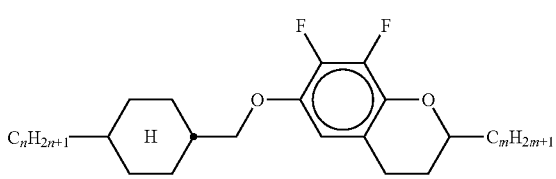
COChrom-n-m TABLE A-continued
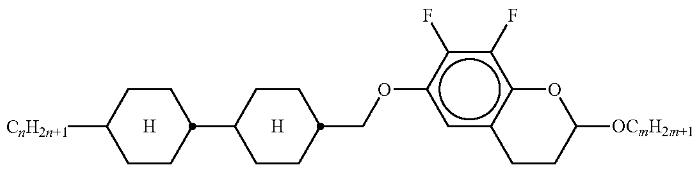
CCOChrom-n-Om
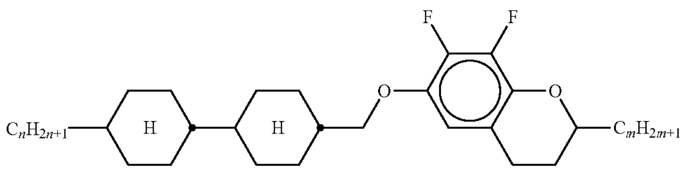
CCOChrom-n-m
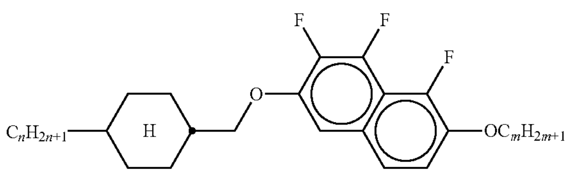
CONaph-n-Om
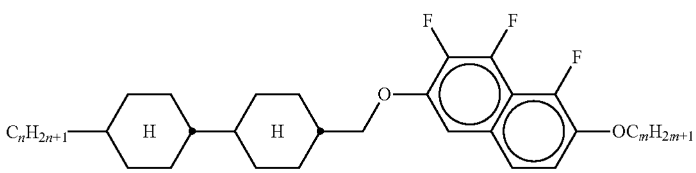
CCONaph-n-Om
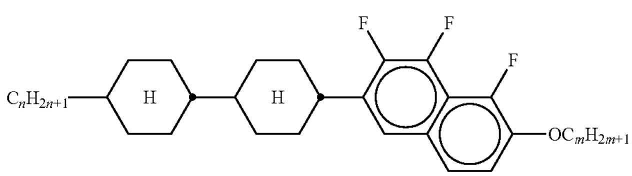
CCNaph-n-Om
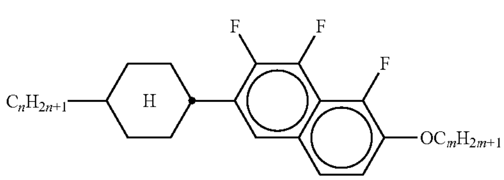
CNaph-n-Om
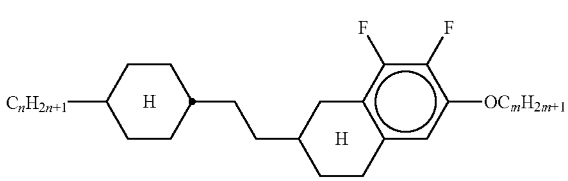
CETNaph-n-Om TABLE A-continued
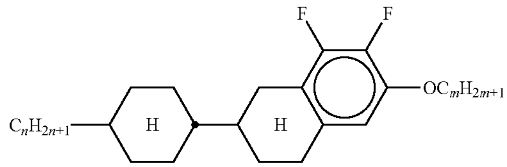
CTNaph-n-Om
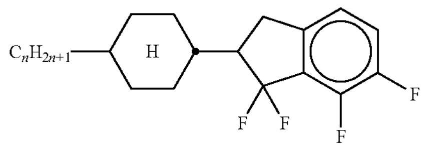
CK-n-F
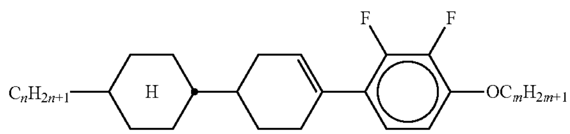
CLY-n-Om
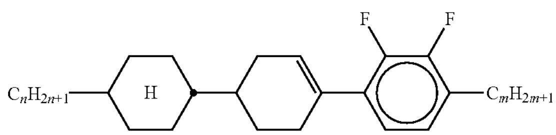
CLY-n-m
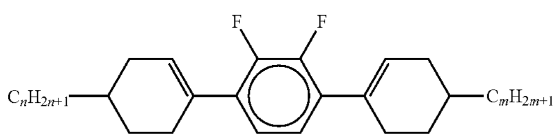
LYLI-n-m
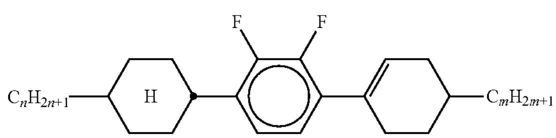
CYLI-n-m
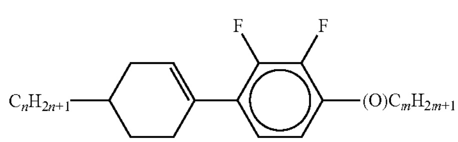
LY-n-(O)m
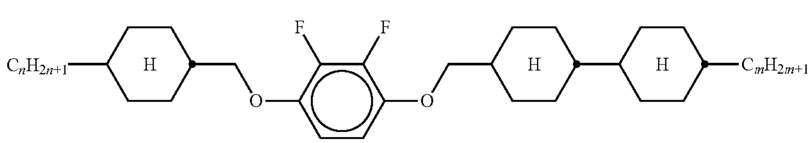
COYOICC-n-m TABLE A-continued
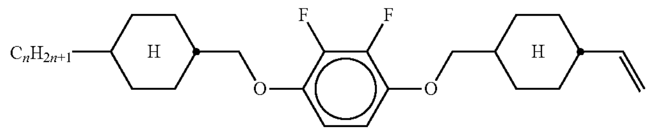
COYOIC-n-V
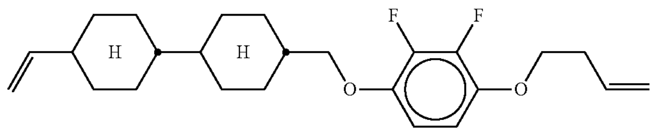
CCOY-V-O2V
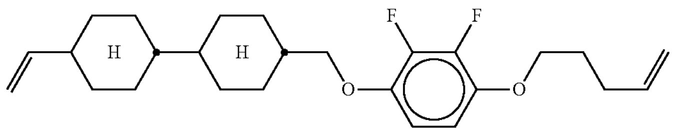
CCOY-V-O3V
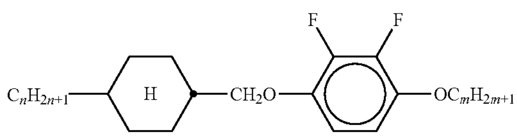
COY-n-Om
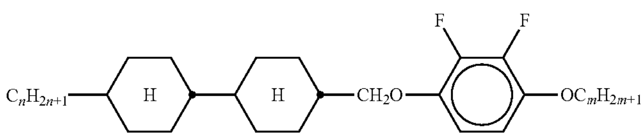
CCOY-n-Om
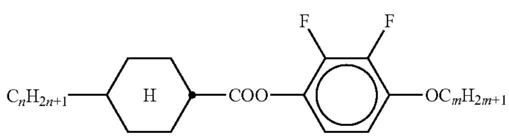
D-nOmFF
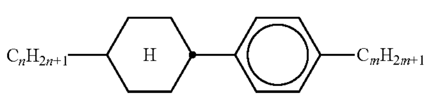
PCH-nm
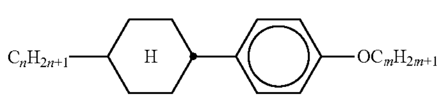
PCH-nOm
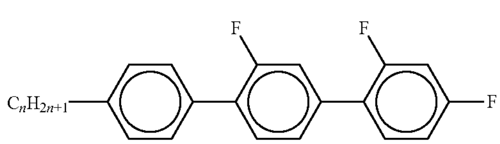
PGIGI-n-F TABLE A-continued
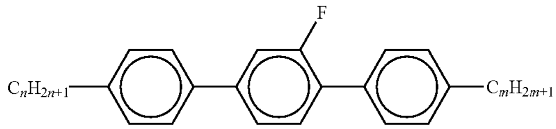
PGP-n-m
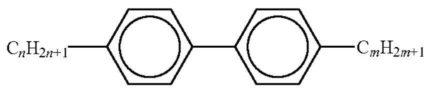
PP-n-m
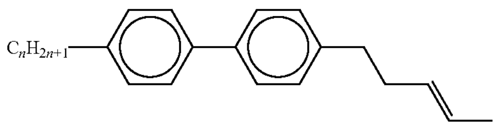
PP-n-2V1
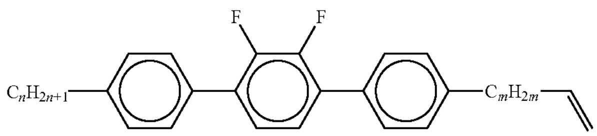
PYP-n-mV
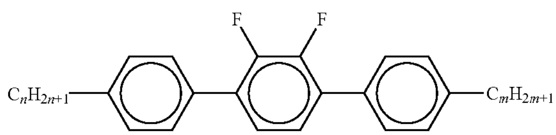
PYP-n-m
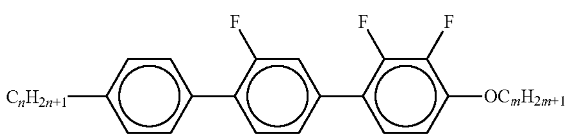
PGIY-n-Om
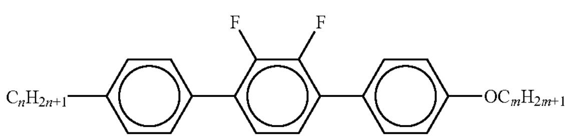
PYP-n-Om
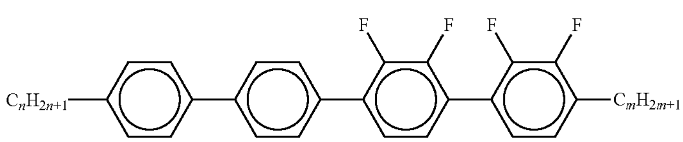
PPYY-n-m
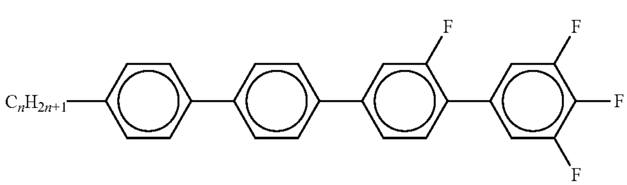
PPGU-n-F TABLE A-continued
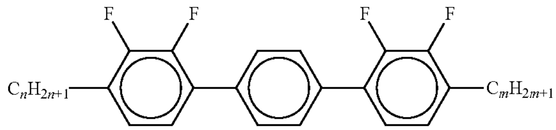
YPY-n-m
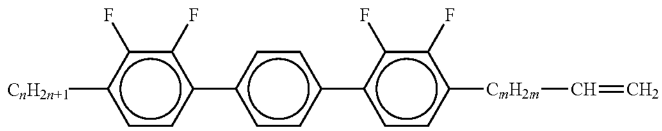
YPY-n-mV
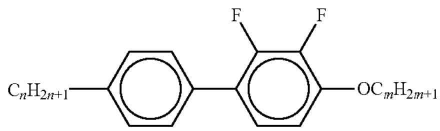
PY-n-Om
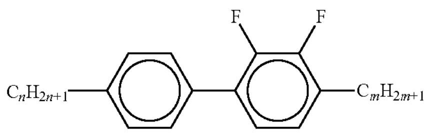
PY-n-m
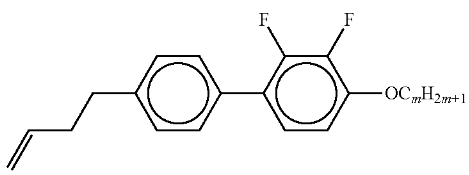
PY-V2-Om
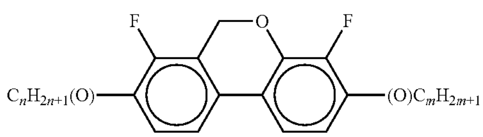
DFDBC-n(O)-(O)m
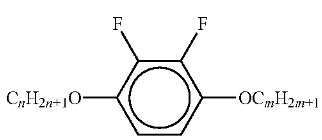
Y-nO-Om
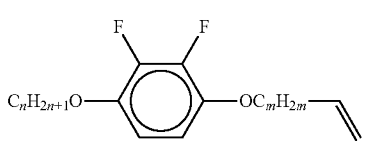
Y-nO-OmV TABLE A-continued
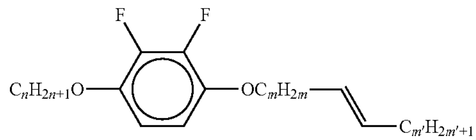
Y-nO-OmVm'
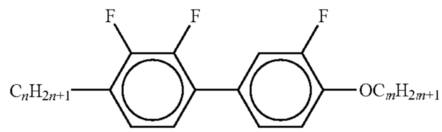
YG-n-Om
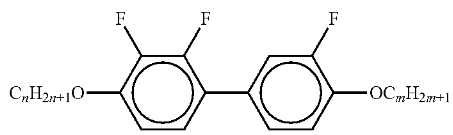
YG-nO-Om
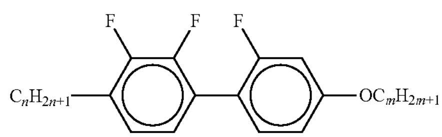
YGI-n-Om
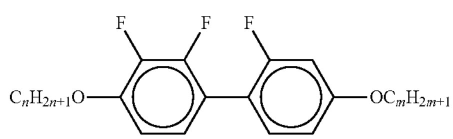
YGI-nO-Om
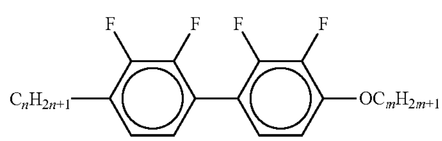
YY-n-Om
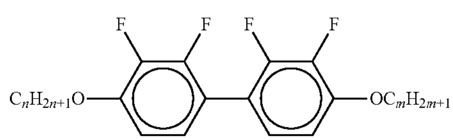
YY-nO-Om
In a preferred embodiment of the present invention, the LC media according to the invention comprise one or more compounds selected from the group consisting of compounds from Table A.
TABLE B
C 15
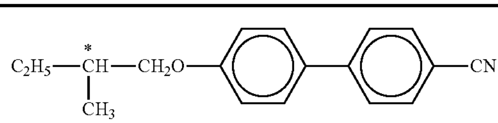

TABLE B-continued
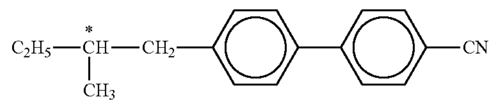
CB 15
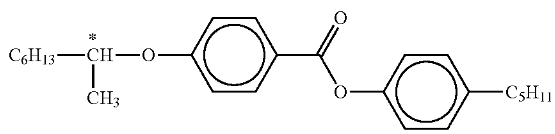
CM 21
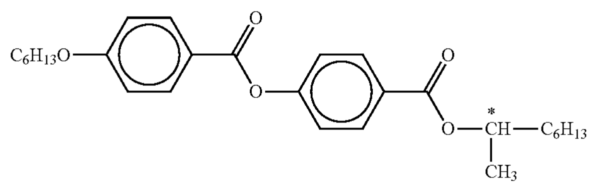
R/S-811
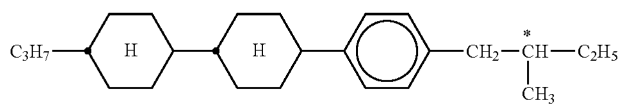
CM 44
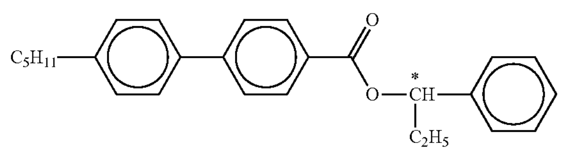
CM 45
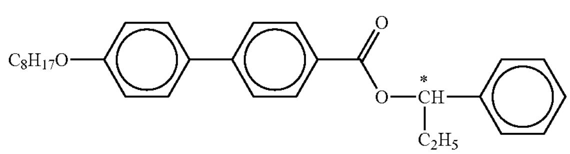
CM 47
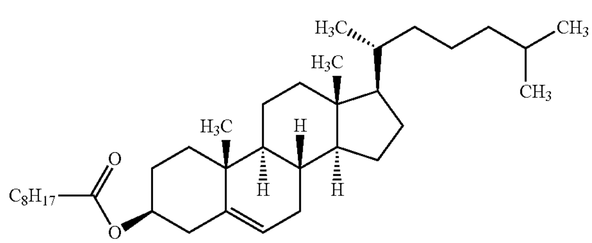
CN
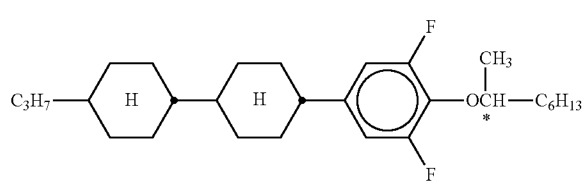
R/S-2011
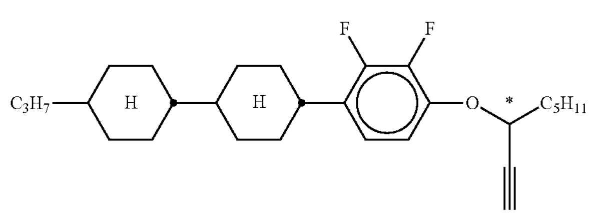
R/S-3011

TABLE B-continued

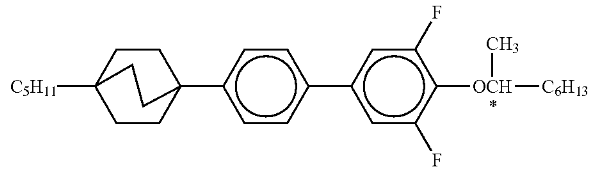

R/S-4011

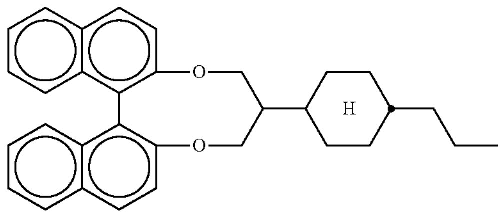

R/S-5011

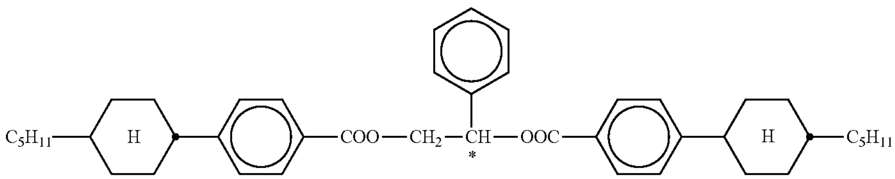

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

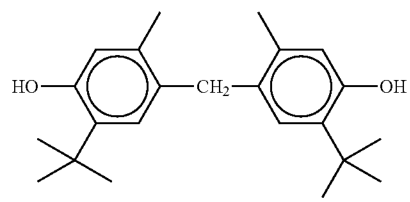

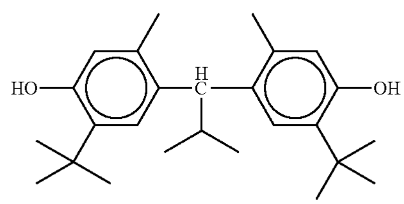

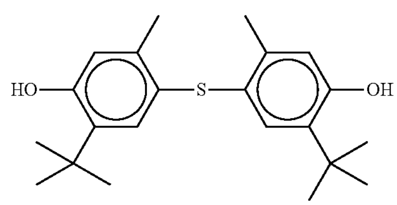

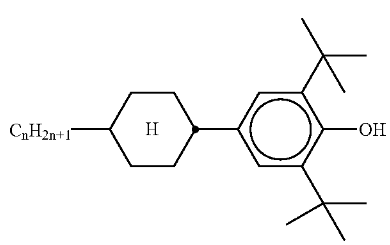

TABLE C-continued
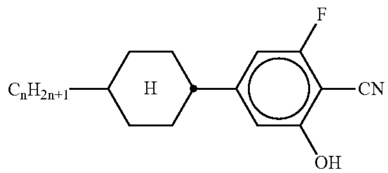
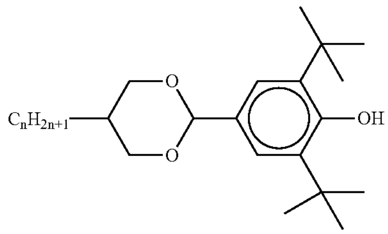
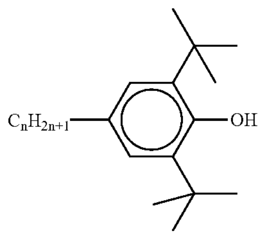
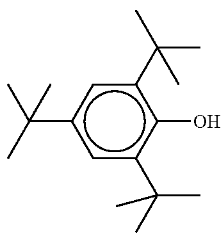
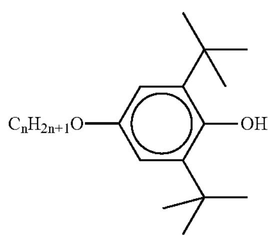
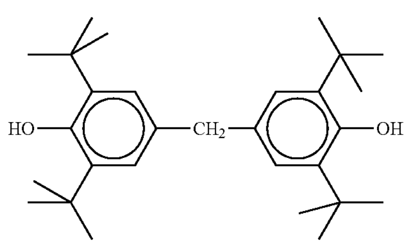
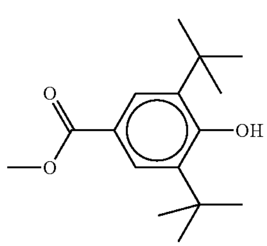

TABLE C-continued
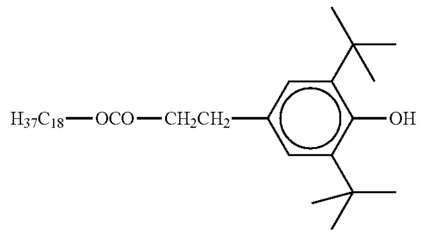
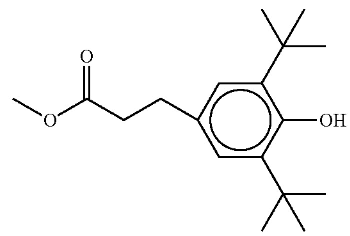
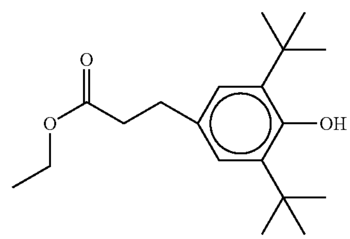
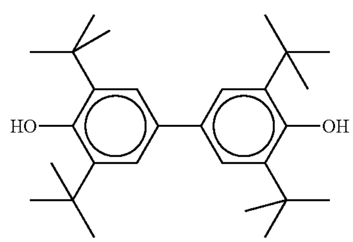
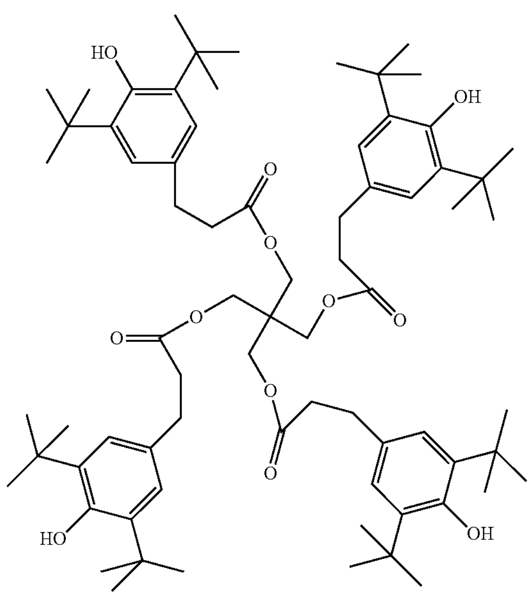 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
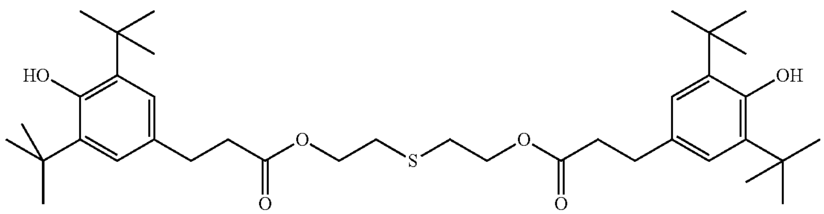 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
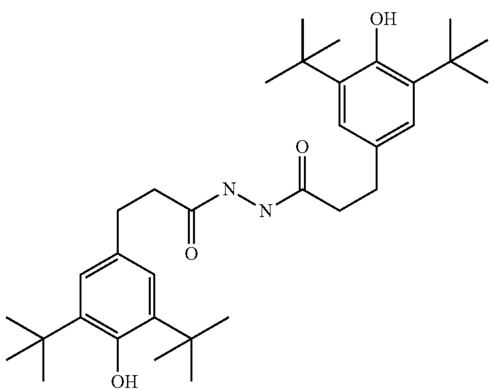 [SMILES: CC(C)(C)c1cc(CCC(=O)NNC(=O)CCc2cc(C(C)(C)C)c(O)c(C(C)(C)C)c2)cc(C(C)(C)C)c1O]
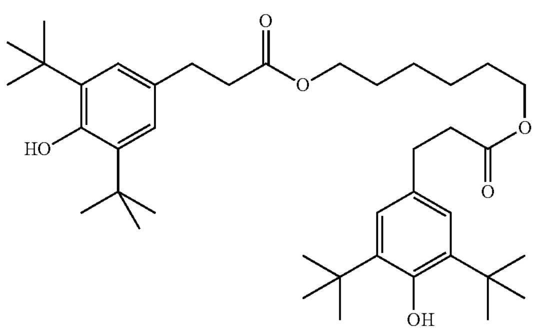 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
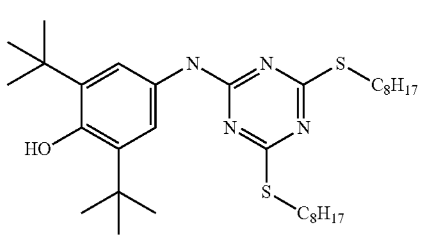

TABLE C-continued
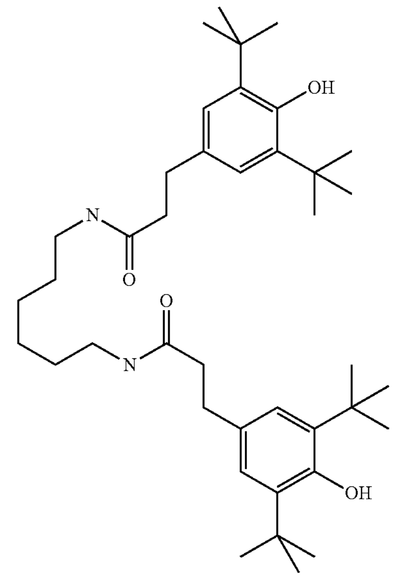 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
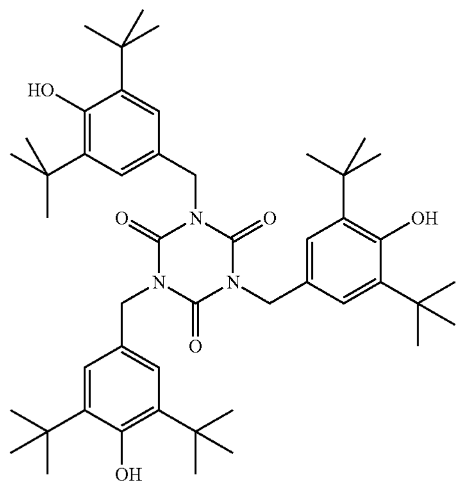 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
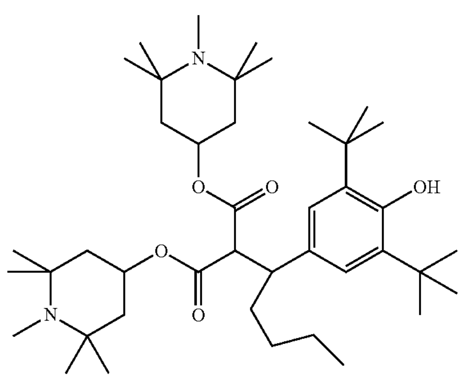 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
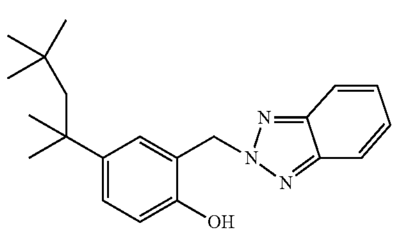 [SMILES: CC(C)(C)CC(C)(C)c1ccc(O)c(Cn2nc3ccccc3n2)c1]

TABLE C-continued
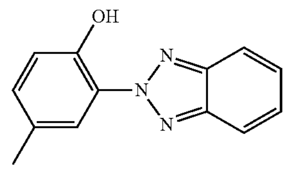 [SMILES: Cc1ccc(O)c(-n2nc3ccccc3n2)c1]
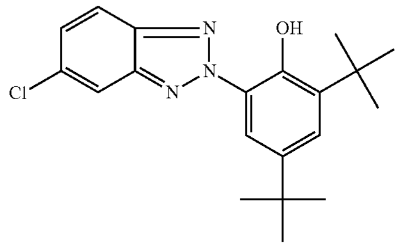 [SMILES: CC(C)(C)c1cc(-n2nc3ccc(Cl)cc3n2)c(O)c(C(C)(C)C)c1]
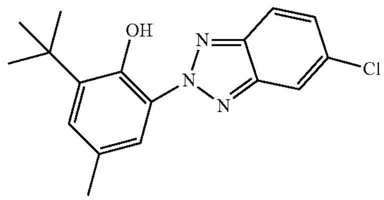 [SMILES: Cc1cc(-n2nc3ccc(Cl)cc3n2)c(O)c(C(C)(C)C)c1]
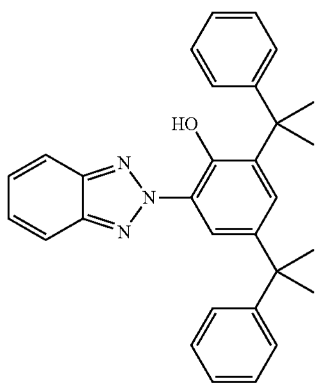 [SMILES: CC(C)(c1ccccc1)c1cc(-n2nc3ccccc3n2)c(O)c(C(C)(C)c2ccccc2)c1]
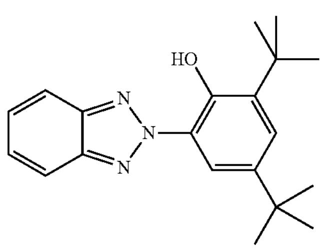 [SMILES: CC(C)(C)c1cc(-n2nc3ccccc3n2)c(O)c(C(C)(C)C)c1]
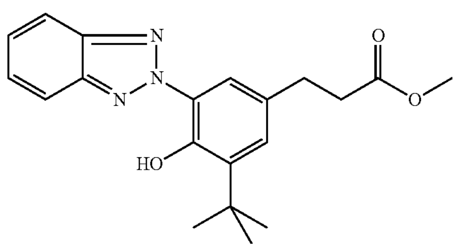 [SMILES: COC(=O)CCc1cc(-n2nc3ccccc3n2)c(O)c(C(C)(C)C)c1]

TABLE C-continued
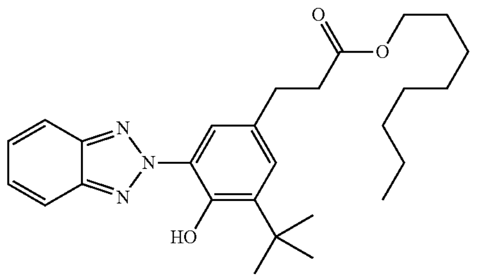 [SMILES: CCCCCCCCOC(=O)CCc1cc(-n2nc3ccccc3n2)c(O)c(C(C)(C)C)c1]
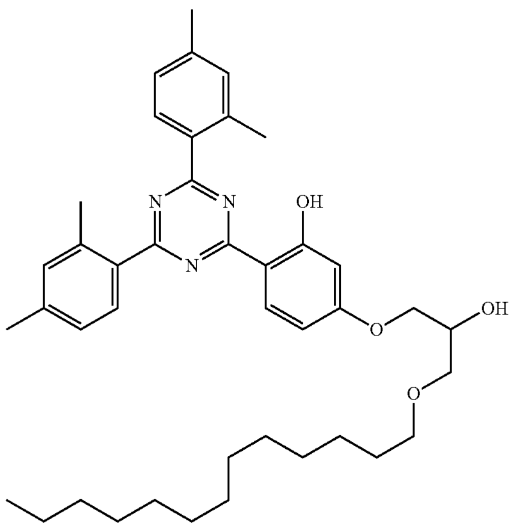 [SMILES: CCCCCCCCCCCCCOCC(O)COc1ccc(-c2nc(-c3ccc(C)cc3C)nc(-c3ccc(C)cc3C)n2)c(O)c1]
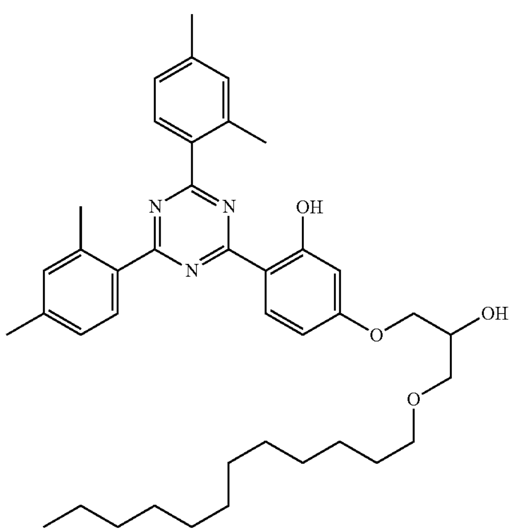 [SMILES: CCCCCCCCCCCCOCC(O)COc1ccc(-c2nc(-c3ccc(C)cc3C)nc(-c3ccc(C)cc3C)n2)c(O)c1]

TABLE C-continued
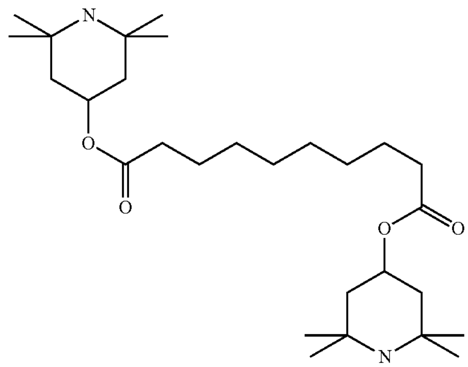
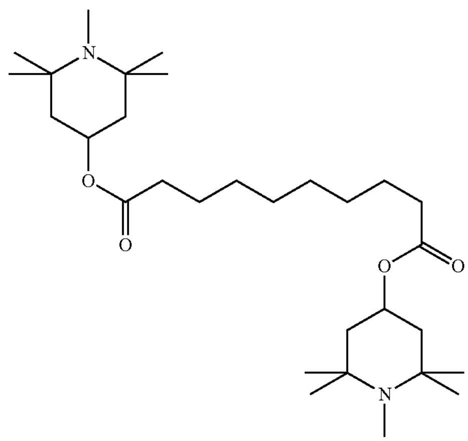
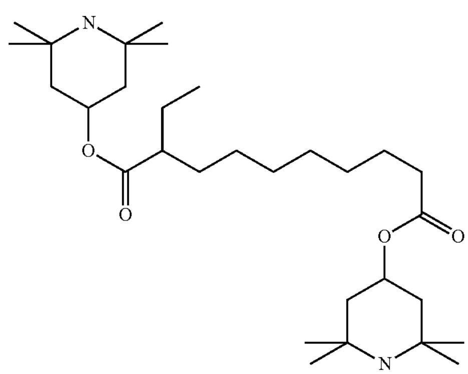
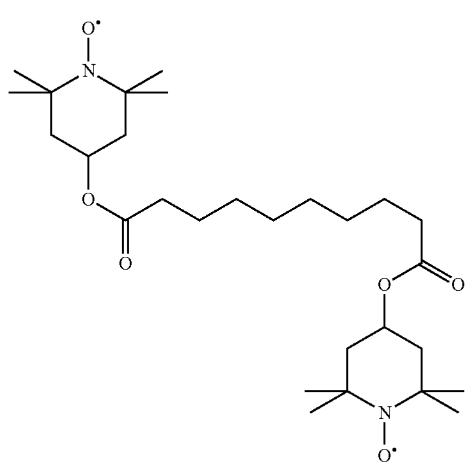

TABLE C-continued

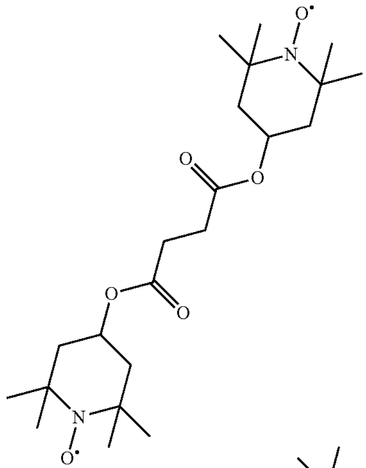

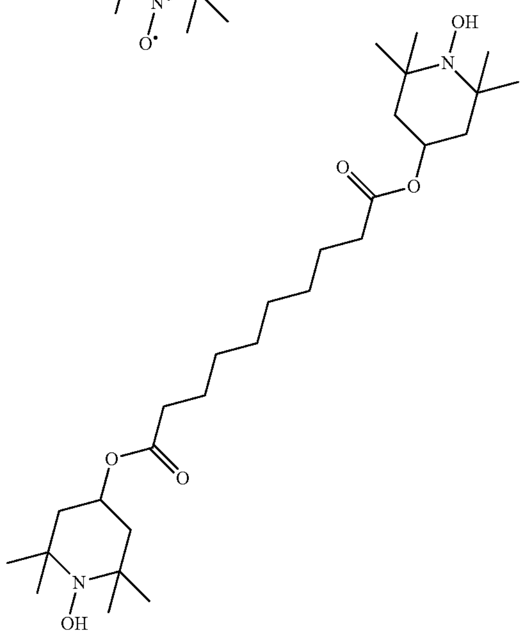

Table C shows possible stabilisers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight, and preferably relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Example 1

The nematic LC host mixture N1 is formulated as follows.

| | | | |
|---|---|---|---|
| PY-3-O2 | 13.50% | cl.p. | 74.6° C. |
| CY-3-O2 | 9.00% | Δn | 0.1082 |
| CCY-3-O1 | 8.00% | Δε | −3.2 |
| CCY-3-O2 | 3.00% | $\varepsilon_{\parallel}$ | 3.7 |
| CCY-4-O2 | 3.00% | $\gamma_1$ | 94 mPa s |
| CPY-2-O2 | 10.00% | | |
| CPY-3-O2 | 10.00% | | |
| CC-3-V | 36.50% | | |
| BCH-32 | 6.50% | | |
| PPGU-3-F | 0.50% | | |

Example 2

The nematic LC host mixture N2 is formulated as follows.

| | | | |
|---|---|---|---|
| CY-3-O2 | 17.50% | cl.p. | 76.0° C. |
| CCY-3-O2 | 10.00% | Δn | 0.1033 |
| CCY-4-O2 | 2.50% | Δε | −3.1 |
| CPY-2-O2 | 11.00% | $\varepsilon_{\parallel}$ | 3.5 |
| CPY-3-O2 | 11.00% | $\gamma_1$ | 113 mPa · s |
| CCH-34 | 10.00% | | |
| CCH-23 | 12.00% | | |
| PCH-301 | 11.00% | | |
| PCH-302 | 7.00% | | |
| BCH-32 | 8.00% | | |

Example 3

The nematic LC host mixture N3 is formulated as follows.

| | | | |
|---|---|---|---|
| CY-3-O2 | 10.00% | cl.p. | 76.5° C. |
| PY-3-O2 | 10.00% | Δn | 0.1027 |
| CCY-3-O1 | 7.00% | Δε | −3.2 |
| CCY-3-O2 | 10.00% | $\varepsilon_{\parallel}$ | 3.7 |
| CPY-2-O2 | 8.00% | $\gamma_1$ | 115 mPas |
| CPY-3-O2 | 10.00% | | |
| CCH-34 | 6.00% | | |
| CCH-23 | 20.00% | | |
| PCH-301 | 7.00% | | |
| PP-1-3 | 3.00% | | |
| CCP-3-1 | 9.00% | | |

Example 4

The nematic LC host mixture N4 is formulated as follows.

| | | | |
|---|---|---|---|
| CY-3-O2 | 15.00% | cl.p. | 75.5° C. |
| CCY-3-O3 | 8.50% | Δn | 0.1018 |
| CCY-4-O2 | 10.00% | Δε | −3.0 |
| CPY-2-O2 | 5.00% | $\varepsilon_{\parallel}$ | 3.4 |
| CPY-3-O2 | 10.00% | $\gamma_1$ | 112 mPa · s |
| CCH-34 | 10.00% | | |
| CCH-23 | 22.00% | | |
| PYP-2-3 | 11.50% | | |
| PCH-301 | 8.00% | | |

Use Examples

Mixture Preparation:

LC mixtures for polymer wall formation were prepared by mixing LC host, monomer and photoinitiator and then homogenizing the resulting mixture by heating above the clearing point. The structures of the monomer (including its formula and name in the composition table) are listed below. The mixture compositions are shown in Table 1.

M1a (IBOMA) I1a1

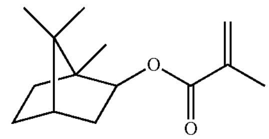

M1b I2a1

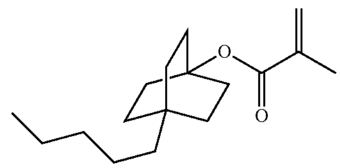

M1c I3a3

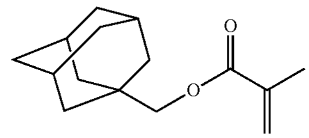

M2a (EHMA) II1a1

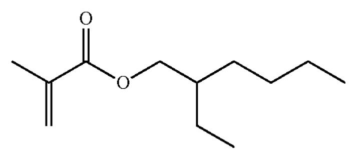

M2b (EHA) II1a2

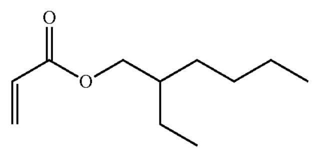

M2c II1a9

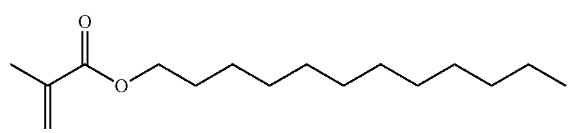

M2d II1a5

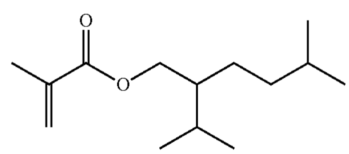

M2e II2a1

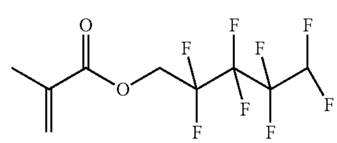

M3a M2

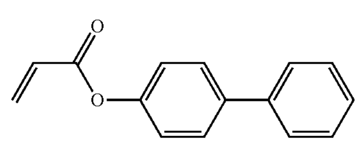

D1a IV1a1

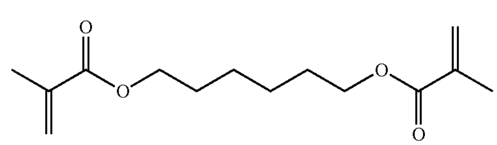

-continued

D1b IV1a5

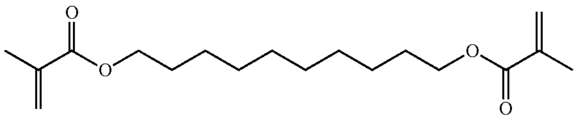

D1c IV4e

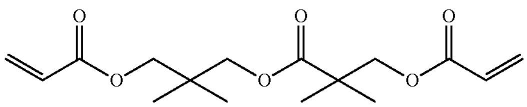

-continued

TT1b IV4a

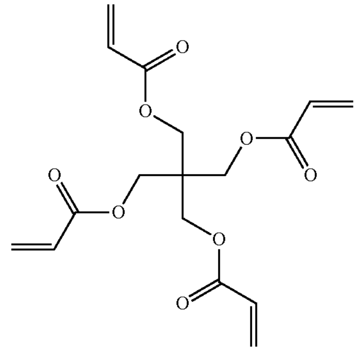

TABLE 1

| Mixture Compositions | | | | | | | | | |
|---|---|---|---|---|---|---|---|---|---|
| No. | Host | [Host] (%) | Monomer 1 | [Monomer 1] (%) | Monomer 2 | [Monomer 2] (%) | Monomer 3/4* | [Monomer 3/4*] (%) | IRG-651 [%] |
| 101 | N1 | 86.87 | M1c | 6.00 | M2c | 6.00 | D1c | 1.00 | 0.13 |
| 102 | N1 | 86.87 | M1c | 6.00 | M2c | 6.00 | D1a | 1.00 | 0.13 |
| 103 | N1 | 84.85 | M1a | 4.67 | M2b | 9.33 | TT1b | 1.00 | 0.15 |
| 104 | N1 | 84.85 | M1a | 4.67 | M2b | 9.33 | TT1a | 1.00 | 0.15 |
| 105 | N1 | 84.85 | M1a | 4.67 | M2b | 9.33 | D1a | 1.00 | 0.15 |
| 106 | N1 | 86.57 | M1c | 6.14 | M2c | 6.14 | D1a | 1.02 | 0.13 |
| 107 | N1 | 87.07 | M1c | 6.00 | M2c | 6.00 | TT1a | 0.50 | 0.13 |
| | | | | | | | D2a | 0.30* | |
| 108 | N1 | 86.87 | M1c | 6.00 | M2c | 6.00 | D1a | 1.00 | 0.13 |
| 109 | N1 | 86.87 | M1c | 6.00 | M2c | 6.00 | TT1a | 1.00 | 0.13 |
| 110 | N1 | 86.87 | M1c | 6.00 | M2c | 6.00 | TT1b | 1.00 | 0.13 |
| 111 | N1 | 87.37 | M1c | 6.00 | M2c | 6.00 | TT1a | 0.50 | 0.13 |
| 201 | N2 | 87.37 | M1c | 6.00 | M2c | 6.00 | TT1a | 0.50 | 0.13 |
| 202 | N2 | 86.87 | M1c | 6.00 | M2c | 6.00 | D1a | 1.00 | 0.13 |
| 301 | N3 | 87.37 | M1c | 6.00 | M2c | 6.00 | TT1a | 0.50 | 0.13 |
| 302 | N3 | 86.87 | M1c | 6.00 | M2c | 6.00 | D1a | 1.00 | 0.13 |
| 401 | N4 | 87.37 | M1c | 6.00 | M2c | 6.00 | TT1a | 0.50 | 0.13 |
| 402 | N4 | 86.87 | M1c | 6.00 | M2c | 6.00 | D1a | 1.00 | 0.13 |

-continued

D2a M2

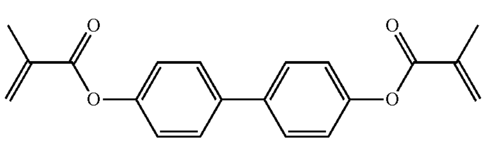

TT1a IV4c

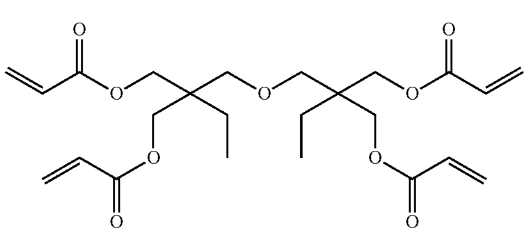

Monomers/Initiator:

The monomers ethyl hexyl methacrylate (EHMA, Aldrich, 290807) of formula IIa1, ethyl hexyl acrylate (EHA, Aldrich, 290815) of formula IIa2 and isobornyl methacrylate (IBOMA, Aldrich, 392111) of formula IIa1 were purified by column chromatography. The photoinitiator 2,2-dimethoxy-2-phenylacetophenone (IRG-651®, Aldrich, 196118) was used as received.

Test Cells:

The test cells comprise two glass substrates coated with ITO, which are kept apart by spacer particles or foils at a layer thickness of 3-4 microns and glued together by an adhesive (usually Norland, NEA 123). On top of the electrode layers polyimide alignment layers (Nissan SE-6514 or SE2414) are applied which are rubbed parallel or antiparallel.

Wall Formation:

The test cells are filled with the LC medium and placed on a black, non-reflecting surface. A photomask was placed on top of the test cells and the sample was subjected for 30 min to UV radiation (Hg/Xe arch lamp, LOT QuantumDesign Europe, LS0205, intensity at sample 4 mW/cm$^2$ measured at 365+/−10 nm FWHM). Radiation of the emission spectrum below 320 nm were removed by a dichroic mirror.

Characterization:

Samples were analyzed under a polarization microscope. The isotropic polymer walls could clearly be distinguished from areas containing birefringend LC. The width of the walls and inclusions of LC into the polymer walls, and defects in the pixel area caused by contamination of polymer, or misalignment of the LC caused by the wall formation process were observed.

Mechanical Stress Test:

Test cells were subjected to a mechanical stress by applying pressure to the top substrate by a 0.5 $mm^2$ tip with a force of 10 N for 10 s. Damages to the polymer wall structure were evaluated with the polarization microscope.

It was observed that the polymer wall structure did not show significant damages caused by mechanical stress.

Electron Micrographs:

The structure of the polymer walls and contamination of the pixel area by polymer was investigated by taking electron micrographs. The samples were prepared by either lifting off the top substrate for top-view images, or breaking the glass slides in half for viewing the cross section of the walls. The LC was removed by flushing the sample with cyclohexane, subsequently the substrates was dried in an air flow and sputter coated with a conductive layer (gold).

Electro-Optical Characterization:

The electro-optical properties of the liquid crystal host were characterized by applying an electrical potential between 0 and 10V in steps of 0.05V. The resulting response was recorded by measuring the transmission change of the sample in between crossed polarizers (DMS 301 equipped with integration sphere).

It was observed that the electrooptcial properties of the liquid crystal host were not significantly affected by the polymer wall structures.

The invention claimed is:

1. A liquid crystal (LC) medium comprising a polymerizable component A) which comprises one or more first polymerizable compounds comprising only one polymerizable group and a bi- or polycyclic hydrocarbon group which is non-aromatic, and one or more second polymerizable compounds comprising a polymerizable group and a straight-chain, branched or monocyclic hydrocarbon group which is non-aromatic, optionally a photoinitiator; and a liquid-crystalline component B) which comprises one or more compounds selected from formula CY and formula PY

CY

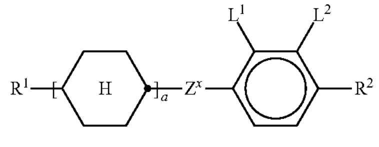

PY

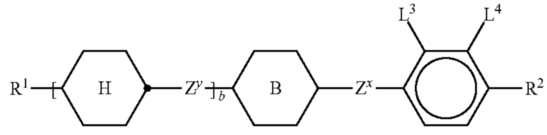

wherein a denotes 1 or 2, b denotes 0 or 1,

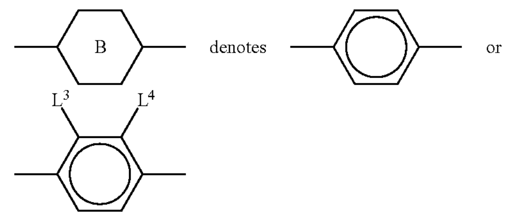

R¹ and R² each, independently of one another, denote alkyl having 1 to 12 C atoms, where, in addition, one or two non-adjacent $CH_2$ groups may each be replaced by —O—, —CH=CH—, —CO—, —OCO— or —COO— in such a way that O atoms are not linked directly to one another, $Z^x$ and $Z^y$ each, independently of one another, denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, and $L^{1-4}$ each, independently of one another, denote F, Cl, $OCF_3$, $CF_3$, $CH_3$, $CH_2F$, or $CHF_2$;

wherein the liquid-crystalline component B) has a negative dielectric anisotropy; and wherein the concentration of the first and second polymerizable compounds in the LC medium is from 15 to 25% by weight, or the concentration of the first and second polymerizable compounds in the LC medium is from 10 to 20% by weight.

2. The LC medium of claim 1, wherein component A) comprises one or more first polymerizable compounds selected from formula I $$P\text{-}Sp\text{-}G^1 \qquad \text{I}$$

wherein

P is a polymerizable group,

Sp is a spacer group or a single bond, $G^1$ is a bi-, tri- or tetracyclic hydrocarbon group having 6 to 20 ring atoms which is optionally substituted by one or more groups L, L is F, Cl, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl or heteroaryl having 5 to 20 ring atoms, or straight-chain or branched alkyl having 1 to 25, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, or —CN, $R^x$ is H, F, Cl, CN, or straight chain, branched or cyclic alkyl having 1 to 25 C atoms, wherein one or more non-adjacent $CH_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by F or Cl, $R^0$, $R^{00}$ are H or alkyl having 1 to 20 C atoms, and $Y^1$ is halogen.

3. The LC medium according to claim 2, wherein component A) comprises one or more first polymerizable compounds selected from the following formulae

I1

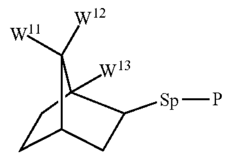

I2

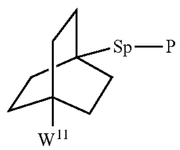

I3

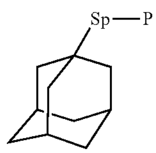

I4

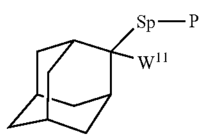

wherein

P and Sp have the meanings given in claim 2, $W^{11}$, $W^{12}$ and $W^{13}$ are independently of each other H, F or $C_1$-$C_{12}$-alkyl, and the cycloalkyl groups are optionally substituted with one or more groups L as defined in claim 2.

4. The LC medium according to claim 1, wherein component A) comprises one or more first polymerizable compounds selected from the following formulae I1a1

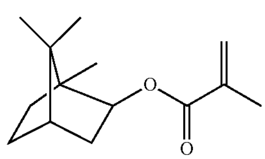

I1a2

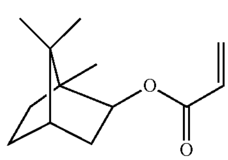

I2a1

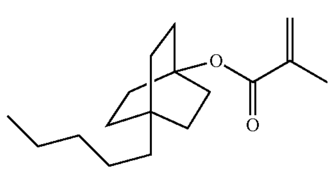

-continued

I2a2

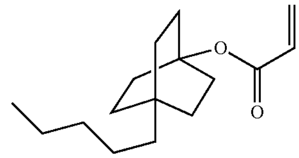

I3a1

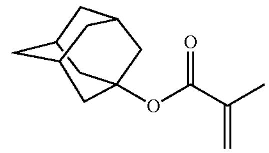

I3a2

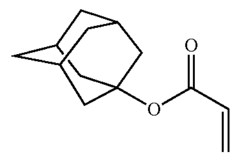

I3a3

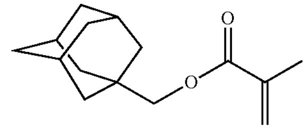

I3a4

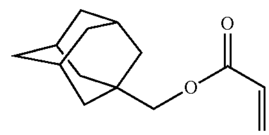

I3a5

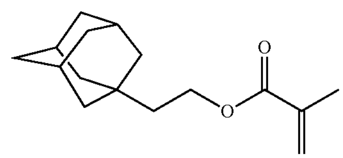

I3a6

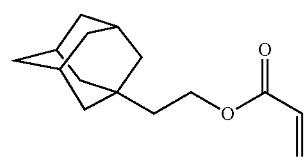

I3a7

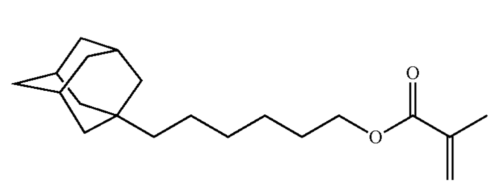

I3a8

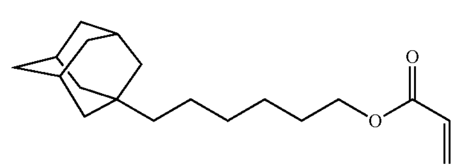

I4a1

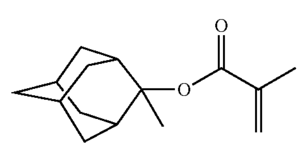

-continued

I4a2

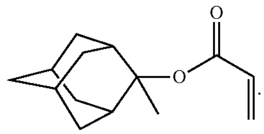

5. The LC medium according to claim 1, wherein component A) comprises one or more second polymerizable compounds selected from formula II P-Sp-$G^2$ II wherein P is a polymerizable group, Sp is a spacer group or a single bond, $G^2$ is a straight-chain, branched or monocyclic alkyl group with 1 to 20 C atoms that is optionally mono-, poly- or perfluorinated and is optionally substituted by one or more groups L and wherein one or more $CH_2$-groups are optionally replaced by —O—, —CO—, —O—CO— or —CO—O— such that O-atoms are not directly adjacent to one another, and L is F, Cl, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl or heteroaryl having 5 to 20 ring atoms, or straight-chain or branched alkyl having 1 to 25, in which, in addition, one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, or —CN.

6. The LC medium according to claim 1, wherein component A) comprises one or more second polymerizable compounds selected from the following formulae $$P—Sp—(CHW^{11})_{n2}—(CH_2)_{n1}—(CHW^{12})_{n3}—CH_3 \quad \text{II1}$$

$$P—Sp—(CH_2)_{n2}—(CF_2)_{n1}—CFW^{13}W^{14} \quad \text{II2}$$

II3

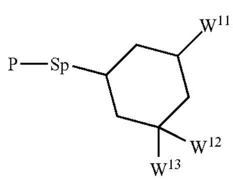

II4

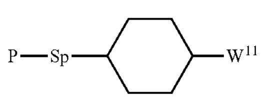

wherein the individual radicals, independently of each other and on each occurrence identically or differently, have the following meanings P is a polymerizable group, Sp is a spacer group or single bond, $W^{11}$, $W^{12}$ are each independently H, F or $C_1$-$C_{12}$-alkyl, $W^{13}$, $W^{14}$ are each independently H or F, n1 is an integer from 2 to 15, and n2, n3 are each independently 0 or an integer from 1 to 3.

7. The LC medium according to claim 1, wherein component A) comprises one or more second polymerizable compounds selected from the following formulae II1a1

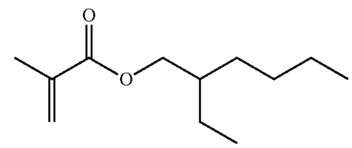

II1a2

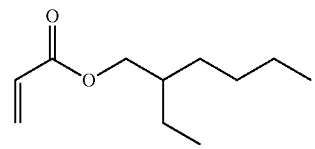

II1a3

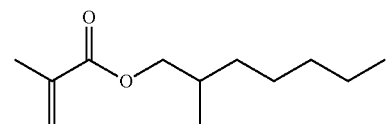

II1a4

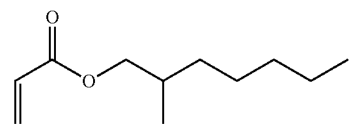

II1a5

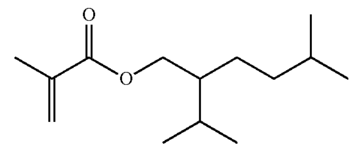

II1a6

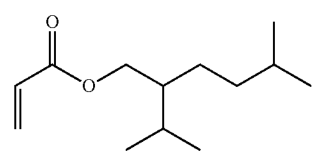

II1a7

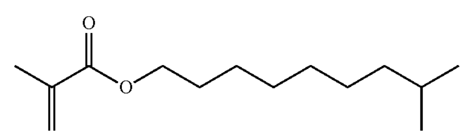

II1a8

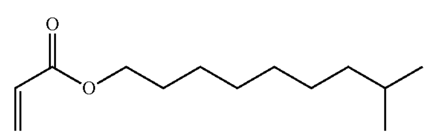

II1a9

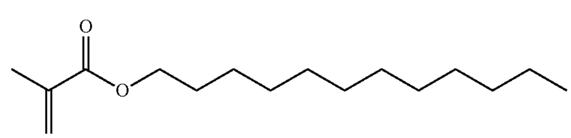

II1a10

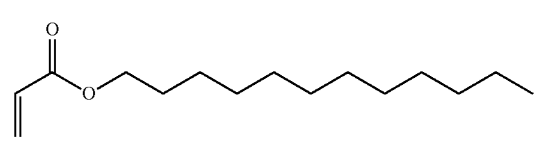

-continued
II1a11
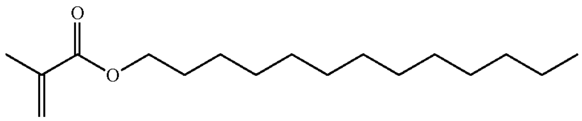
II1a12
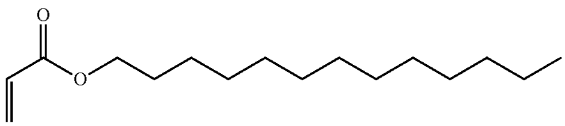
II1a13
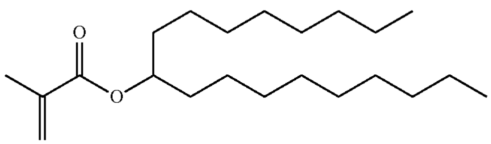
II1a14
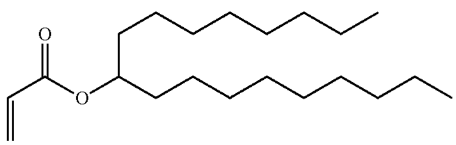
II2a1
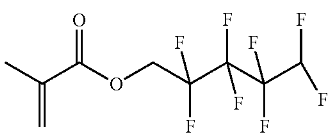
II2a2
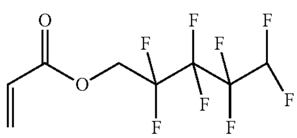
II3a1
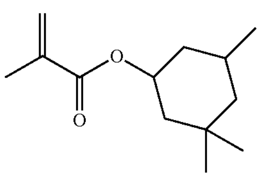
II3a2
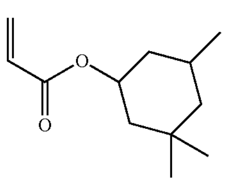
II4a1
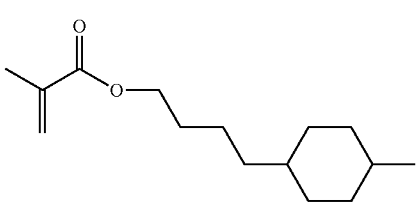
-continued
II4a2
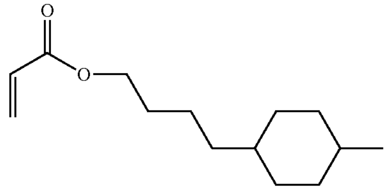
II4a3
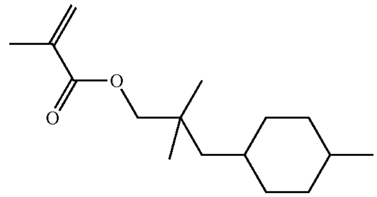
II4a4
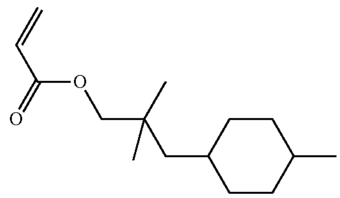
II5a1
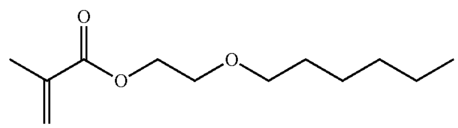
II5a2
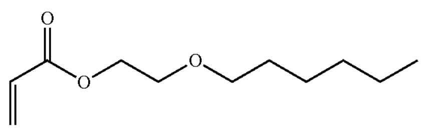
II5a3
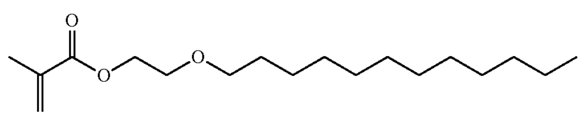
II5a4
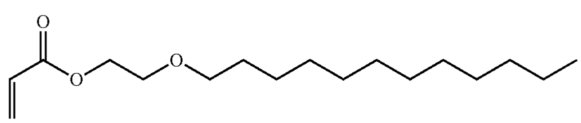
II5a5
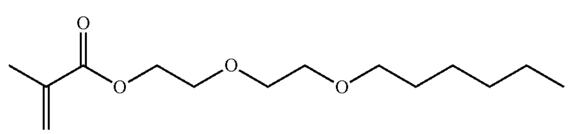
II5a6
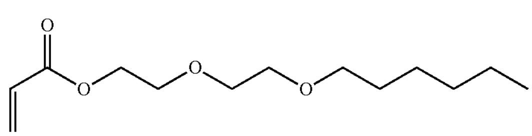
II5a7
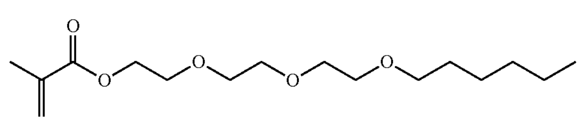

-continued

II5a8

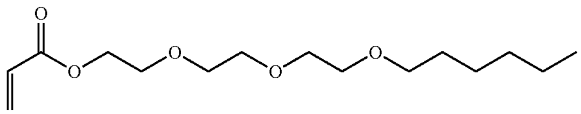

II5a9

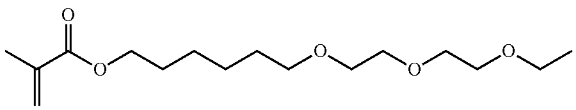

II5a10

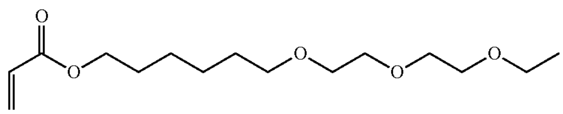

8. The LC medium according to claim 1, wherein component A) additionally comprises one or more second polymerizable compounds having two or more polymerizable groups and a straight-chain, branched or monocyclic hydrocarbon group.

9. The LC medium according to claim 1, wherein component A) additionally comprises one or more second polymerizable compounds selected from formula IV $$P^1\text{-}Sp^1\text{-}G^2\text{-}Sp^2\text{-}P^2 \qquad \text{IV}$$

wherein $P^1$, $P^2$ are each independently a polymerizable group, $Sp^1$, $Sp^2$ are each independently a spacer group or single bond, $G^2$ is a straight-chain, branched or monocyclic alkyl group with 1 to 20 C atoms that is optionally mono-, poly- or perfluorinated and is optionally substituted by one or more groups L, and wherein one or more $CH_2$-groups are each optionally replaced by —O—, —CO—, —O—CO— or —CO—O— such that O-atoms are not directly adjacent to one another, and L is F, Cl, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl or heteroaryl having 5 to 20 ring atoms, or straight-chain or branched alkyl having 1 to 25, in which, in addition, one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, or —CN.

10. The LC medium according to claim 1, wherein component A) additionally comprises one or more second polymerizable compounds selected from the following formulae $$P^1\text{—}Sp^1\text{—}(CHW^{11})_{n2}\text{—}(CH_2)_{n1}\text{—}(CHW^{12})_{n3}\text{—}Sp^2\text{—}P^2 \qquad \text{IV1}$$

IV2

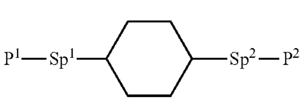

$$P^1\text{—}Sp^1\text{—}(CH_2)_{n2}\text{—}(CF_2)_{n1}\text{—}(CH_2)_{n3}\text{—}Sp^2\text{—}P^2 \qquad \text{IV3}$$

wherein $P^1$, $P^2$ are each independently a polymerizable group, $Sp^1$, $Sp^2$ are each independently a spacer group or a single bond, $W^{11}$, $W^{12}$ are each independently H, F or $C_1$-$C_{12}$-alkyl, $W^{13}$, $W^{14}$ are each independently H or F, n1 is an integer from 2 to 15, n2, n3 are each independently 0 or an integer from 1 to 3, and the cyclohexylene ring in formula IV2 is optionally substituted by one or more identical or different groups $W^{11}$.

11. The LC medium according to claim 1, wherein component A) additionally comprises one or more second polymerizable compounds selected from the following formulae IV1a1

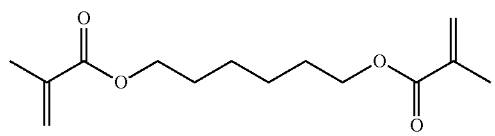

IV1a2

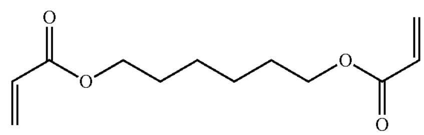

IV1a3

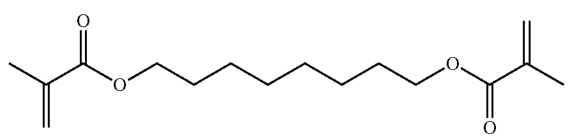

IV1a4

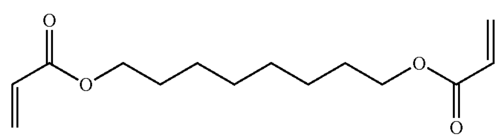

IV1a5

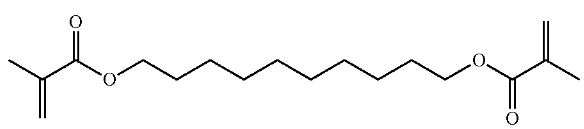

IV1a6

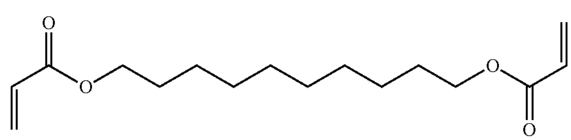

IV2a1

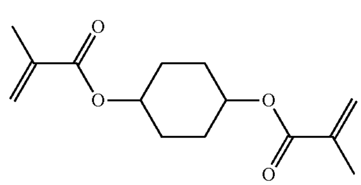

-continued

IV2a2

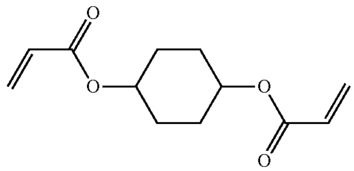

IV2b1

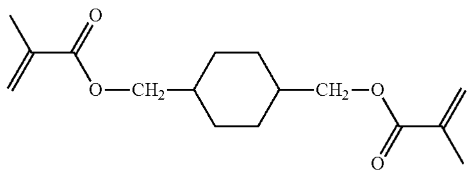

IV2b2

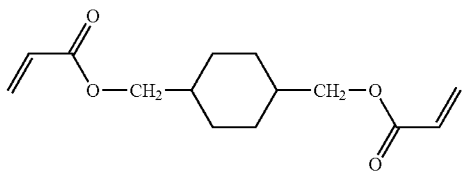

IV3a1

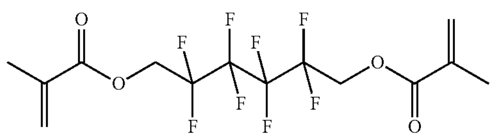

IV3a2

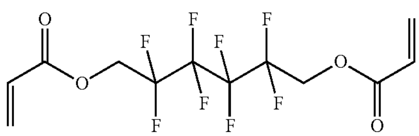

IV4a

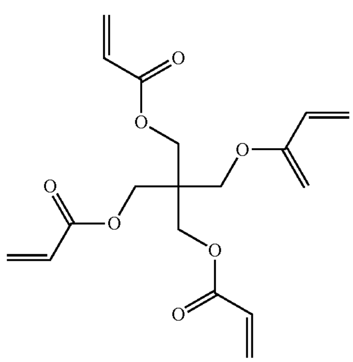

iV4b

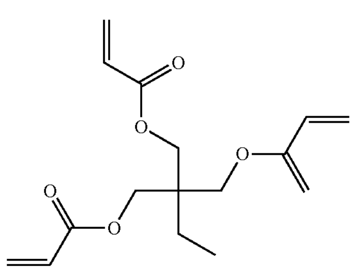

-continued

IV4c

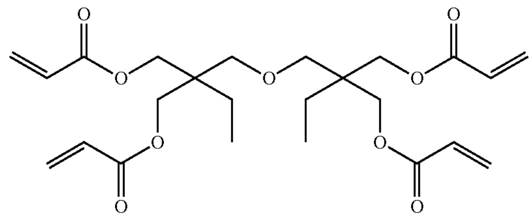

IV4d

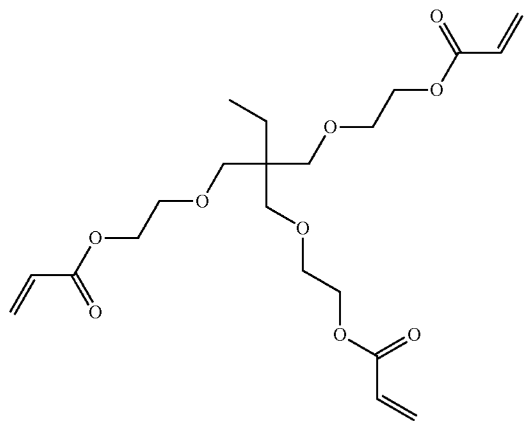

IV4e

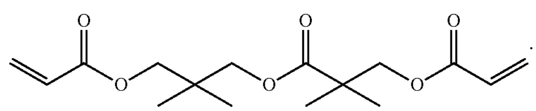

12. The LC medium according to claim 1, wherein the concentration of the first and second polymerizable compounds in the LC medium is from 1 to 30% by weight.

13. The LC medium according to claim 1, wherein the ratio of first polymerizable compounds relative to the second polymerizable compounds in the LC medium is from 10:1 to 1:10.

14. The LC medium according to claim 1, wherein component B) comprises one or more compounds of formula CY selected from compounds of the following formulae:

CY1

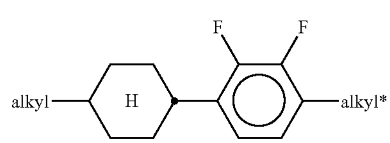

CY2

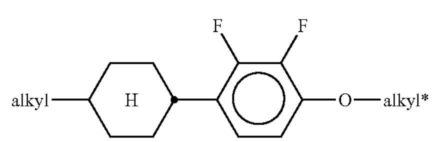

CY3

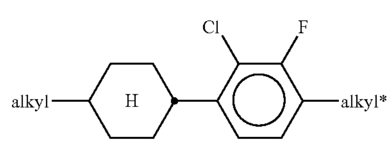

-continued
CY4
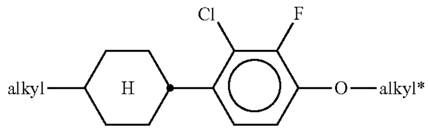
CY5
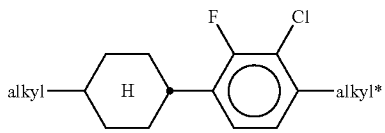
CY6
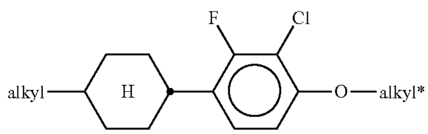
CY7
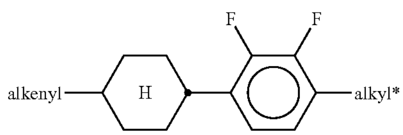
CY8
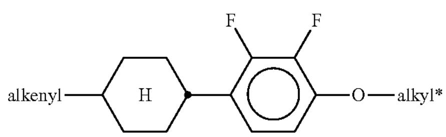
CY9
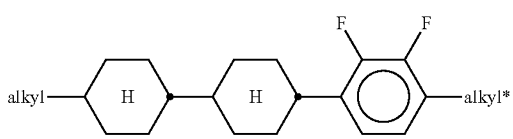
CY10
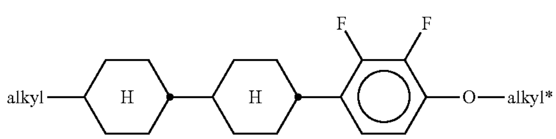
CY11
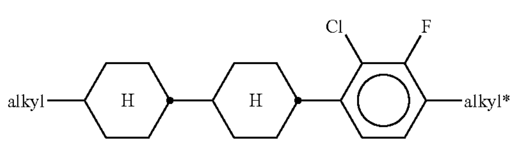
CY12
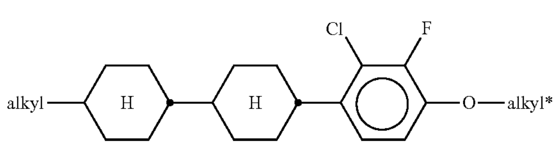
CY13
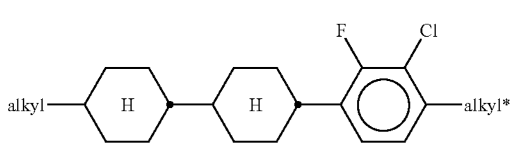
-continued
CY14
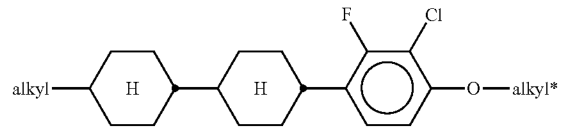
CY15
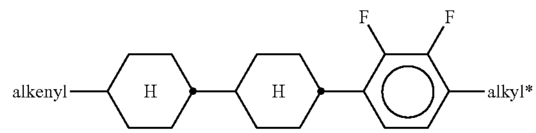
CY16
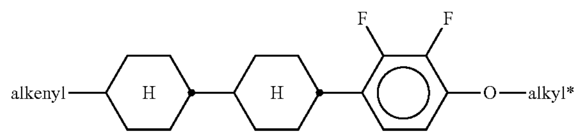
CY17
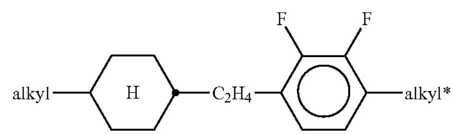
CY18
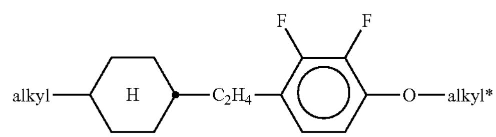
CY19
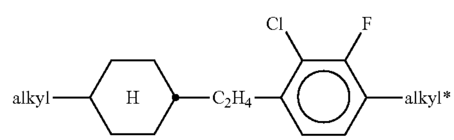
CY20
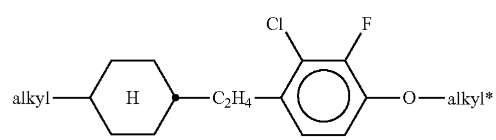
CY21
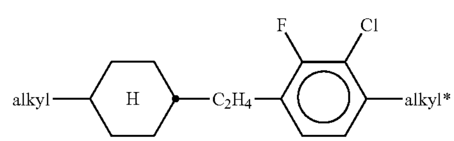
CY22
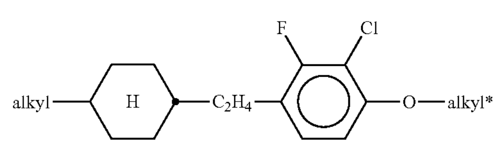
CY23
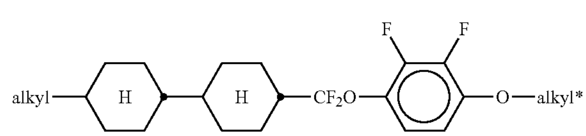

-continued

CY24

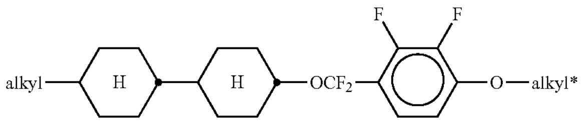

CY25

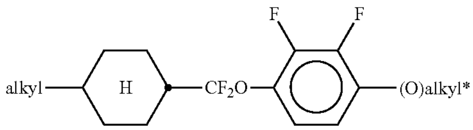

CY26

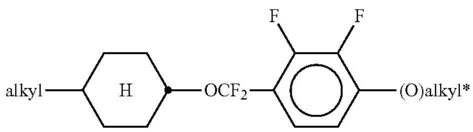

CY27

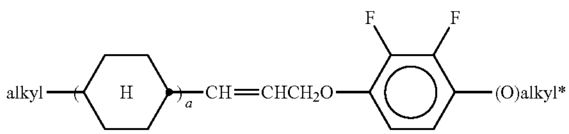

CY28

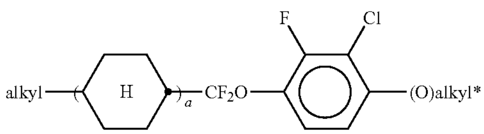

CY29

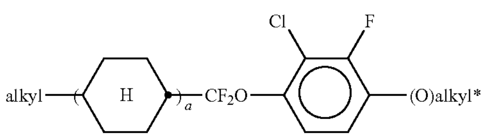

CY30

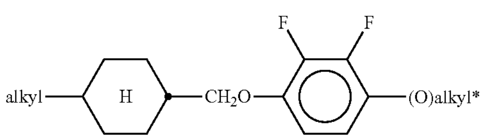

CY31

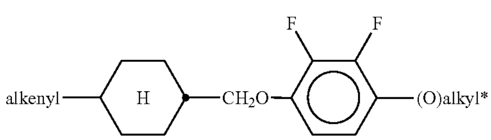

CY32

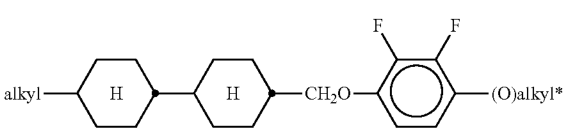

CY33

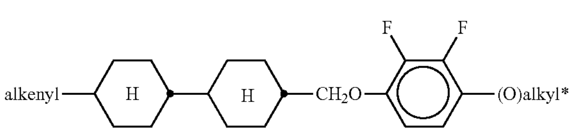

in which a denotes 1 or 2, alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond.

15. The LC medium according to claim 1, wherein component B) comprises one or more compounds of formula PY selected from compounds of the following formulae:

PY1

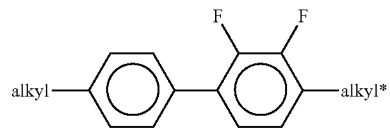

PY2

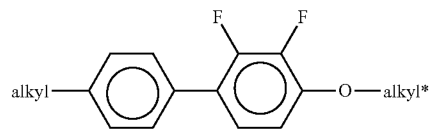

PY3

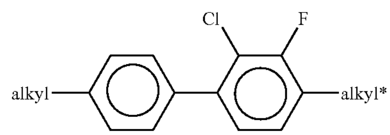

PY4

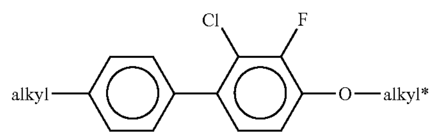

PY5

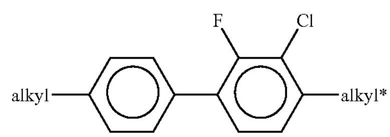

PY6

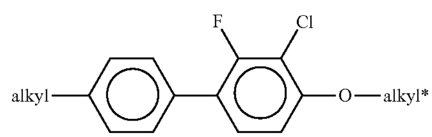

PY7

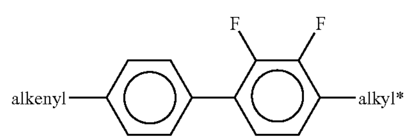

PY8

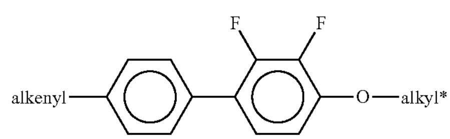

PY9

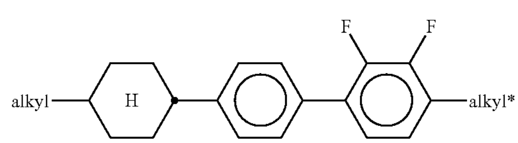

-continued

PY10

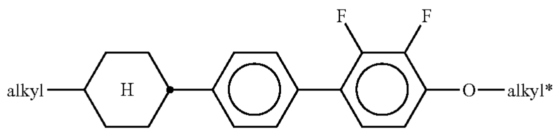

PY11

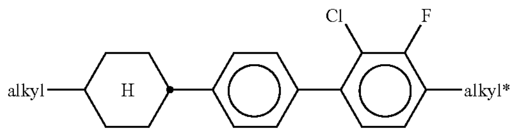

PY12

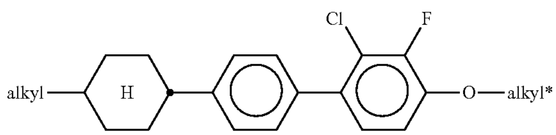

PY13

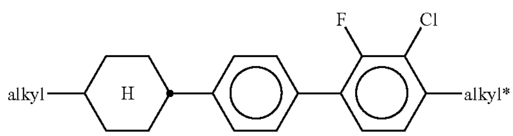

PY14

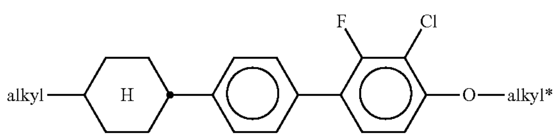

PY15

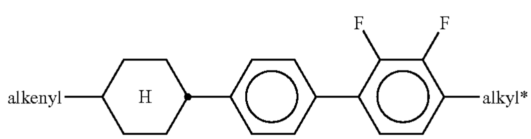

PY16

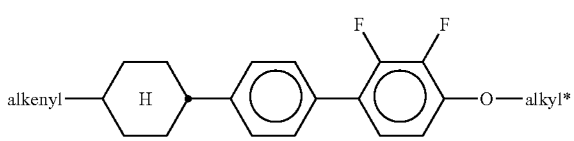

PY17

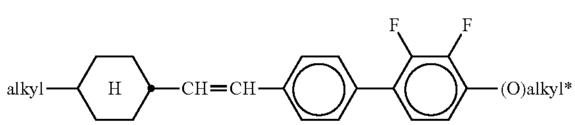

PY18

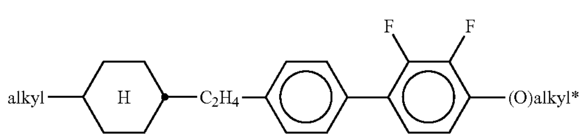

PY19

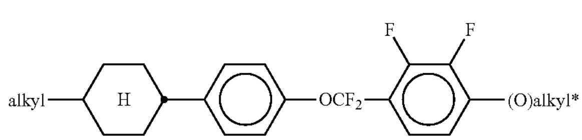

-continued

PY20

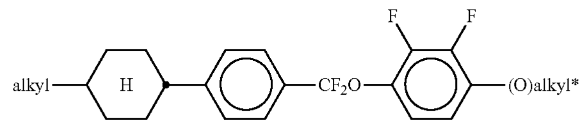

in which alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond.

16. The LC medium according to claim 1, wherein component B) further comprises one or more compounds selected from formulae AN and AY:

AN

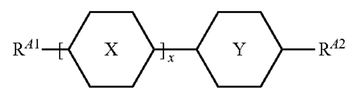

AY

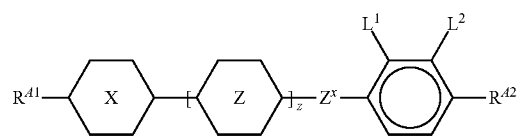

in which the individual radicals, on each occurrence identically or differently, and each, independently of one another, have the following meaning:

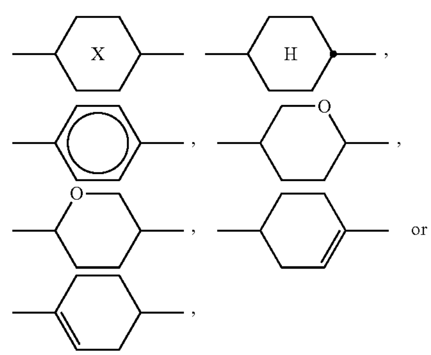

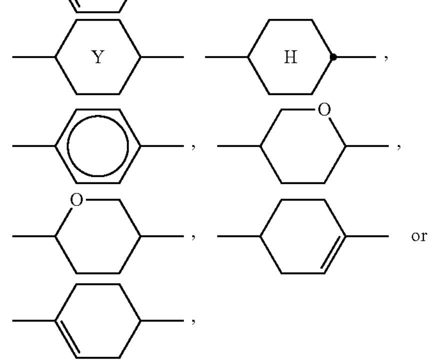

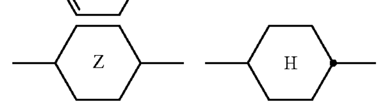

-continued

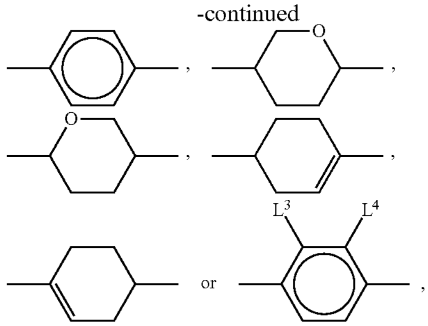

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may each be replaced by —O—, —CH═CH—, —CO—, —OCO— or —COO— in such a way that O atoms are not linked directly to one another, $Z^x$ —$CH_2CH_2$—, —CH═CH—, —$CF_2O$—, —$OCF_2$—, —$CH_2O$—, —$OCH_2$—, —CO—O—, —O— CO—, —$C_2F_4$—, —CF═CF—, —CH═CH—$CH_2O$—, or a single bond, $L^{1-4}$ H, F, Cl, $OCF_3$, $CF_3$, $CH_3$, $CH_2F$ or $CHF_2H$, x 1 or 2, and z 0 or 1.

17. The LC medium according to claim 1, wherein component B) comprises one or more compounds of formula T:

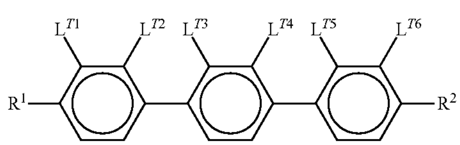

T in which the individual radicals, on each occurrence identically or differently, and each, independently of one another, have the following meaning:

$R^1$, $R^2$ alkyl, alkoxy, oxaalkyl or alkoxyalkyl having up to 9 C atoms or alkenyl or alkenyloxy having 2 to 9 C atoms, all of which are optionally fluorinated, $L^{T1}$-$L^{T6}$ H, F or Cl, with at least one of $L^{T1}$ to $L^{T6}$ being F or Cl.

18. The LC medium according to claim 1, wherein component B) comprises one or more compounds selected from formulae ZK and DK:

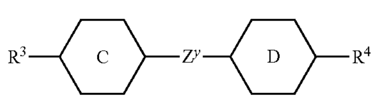

ZK

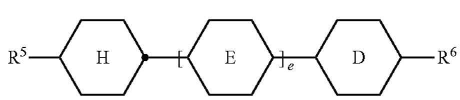

DK in which the individual radicals on each occurrence, identically or differently, have the following meanings:

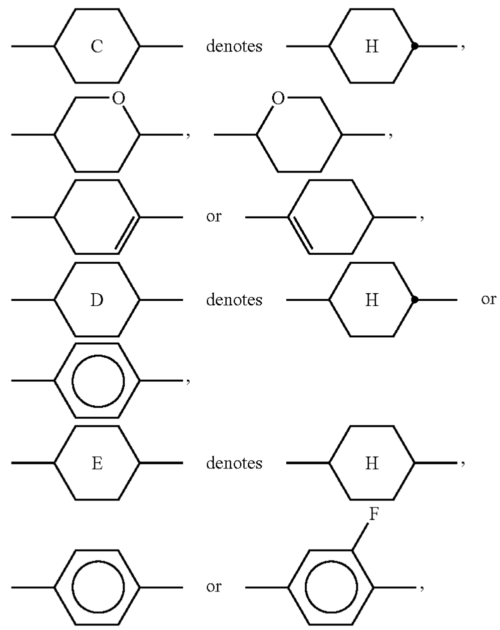

and $R^3$ and $R^4$ each, independently of one another, denote alkyl having 1 to 12 C atoms, in which, in addition, one or two non-adjacent $CH_2$ groups may each be replaced by —O—, —CH═CH—, —CO—, —O—CO— or —CO—O— in such a way that O atoms are not linked directly to one another, $Z^y$ denotes —$CH_2CH_2$—, —CH═CH—, —$CF_2O$—, —$OCF_2$—, —$CH_2O$—, —$OCH_2$—, —COO—, —OCO—, —$C_2F_4$—, —CF═CF— or a single bond, $R^5$ and $R^6$ each, independently of one another, denote alkyl having 1 to 12 C atoms, where, in addition, one or two non-adjacent $CH_2$ groups may each be replaced by —O—, —CH═CH—, —CO—, —OCO— or —COO— in such a way that O atoms are not linked directly to one another, and e denotes 1 or 2.

19. The LC medium according to claim 1, wherein the polymerizable compounds are polymerized.

20. An LC display comprising an LC medium according to claim 1.

21. The LC display of claim 20, which is a flexible display.

22. The LC display of claim 20, which is a TN, OCB, IPS or FFS display.

23. A process for the production of an LC display comprising:

providing an LC medium as defined in claim 1 into the display, and polymerizing the polymerizable compounds in defined regions of the display.

24. The process of claim 23, wherein the polymerizable compounds are photopolymerized by exposure to UV irradiation.

25. The process of claim 24, wherein the polymerizable compounds are photopolymerized by exposure to UV irradiation through a photomask.

26. A process of preparing an LC medium according to claim 1, comprising:

mixing one or more compounds of formula CY and/or formula PY, or component B), as defined in claim 1, with one or more first polymerizable compounds and one or more second polymerizable compounds, and optionally further LC compounds and/or additives.

27. The LC medium according to claim 2, wherein $G^1$ is a bridged or fused bi-, tri- or tetracyclic alkyl group.

28. The LC medium according to claim 2, wherein

P is $CH_2$═$CW^1$—CO—O—, $CH_2$═$CW^1$—CO—,

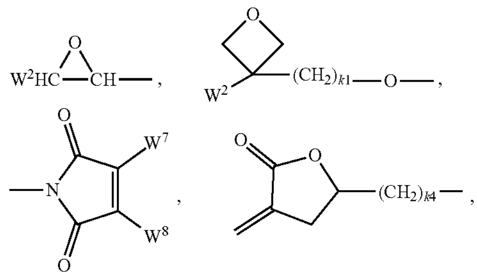

$CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, HO—$CW^2W^3$—, HS—$CW^2W^3$—, $HW^2$N—, HO—$CW^2W^3$—NH—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC—, OCN— or $W^4W^5W^6$Si—, $W^1$ is H, F, Cl, CN, $CF_3$, phenyl or alkyl having 1 to 5 C atoms, $W^2$ and $W^3$ each, independently of one another, denote H or alkyl having 1 to 5 C atoms, $W^4$, $W^5$ and $W^6$ each, independently of one another, denote Cl, oxaalkyl or oxacarbonylalkyl having up to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, and $k_4$ denotes an integer from 1 to 10.

29. The LC medium according to claim 2, wherein the concentration of the first and second polymerizable compounds in the LC medium is from 15 to 25% by weight.

30. The LC medium according to claim 2, wherein the ratio of first polymerizable compounds to second polymerizable compounds in the LC medium is from 10:1 to 1:10.

31. The LC display of claim 20, wherein said display comprises a first substrate and a second substrate, wherein said LC medium is disposed between the first and second substrates, and wherein the polymerizable compounds of polymerizable component A) are polymerized by exposing regions of the medium to radiation through a mask and the polymerized compounds form polymer walls within the LC medium in the irradiated regions.

32. The display according to claim 31, wherein said substrates are flexible.

33. The LC display of claim 20, wherein said display comprises:

a first substrate having a pixel electrode defining pixel areas, the pixel electrode being connected to a switching element disposed in each pixel area, and optionally a first alignment layer disposed on the pixel electrode, a second substrate having a common electrode layer, which may be disposed on the entire portion of the second substrate facing the first substrate, and optionally a second alignment layer, and wherein said LC medium is disposed between the first and second substrates, wherein the polymerizable compounds of polymerizable component A) are polymerized by exposing regions of the medium to radiation through a mask and the polymerized compounds form polymer walls within the LC medium in the irradiated regions.

34. The display according to claim 33, wherein said substrates are flexible.

35. The LC medium according to claim 1, wherein polymerizable component A) consists of polymerizable compounds, and liquid-crystalline component B) consists of mesogenic and/or liquid-crystalline compounds.

36. The LC medium according to claim 1, wherein the proportion of component B) in the LC medium is from 70 to 95% by weight and only contains low-molecular-weight compounds which are unpolymerizable.

37. The LC medium according to claim 1, wherein the concentration of the first and second polymerizable compounds in the LC medium is from 10 to 20% by weight.

38. The LC medium according to claim 1, wherein the first polymerizable compounds are selected from formulae IA and IC

IA

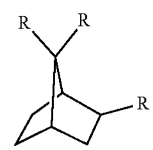

IC

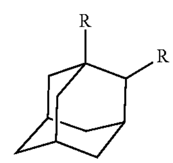

wherein in each formula one R group denotes P-Sp-, and each of the other R groups are independently H, F, Cl, CN, or straight chain, branched or cyclic alkyl having 1 to 25 C atoms, wherein one or more non-adjacent $CH_2$-groups are each optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl.

39. The LC medium according to claim 2, wherein:

component A) comprises one or more first polymerizable compounds selected from the following formulae

I1

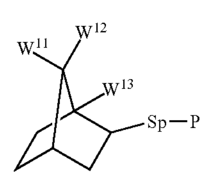

-continued

I2

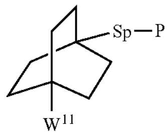

I3

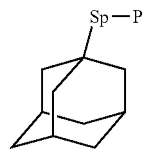

I4

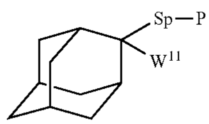

I1a1

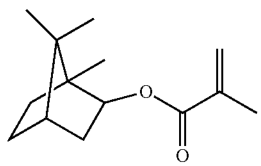

I1a2

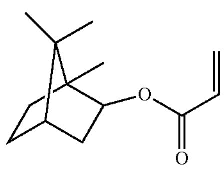

I2a1

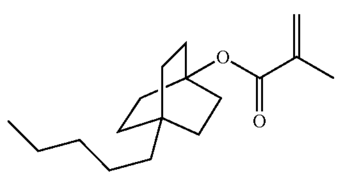

I2a2

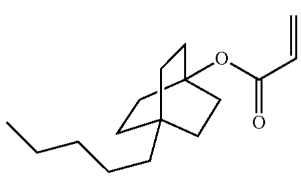

I3a1

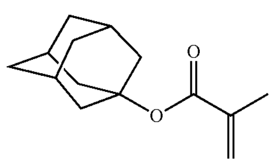

I3a2

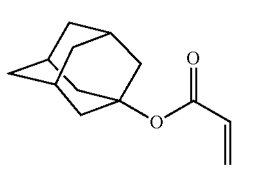

I3a3

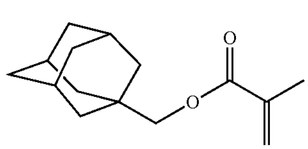

-continued

II3a4

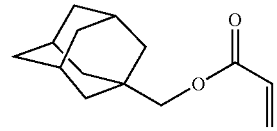

I3a5

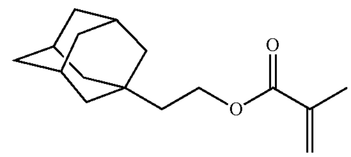

I3a6

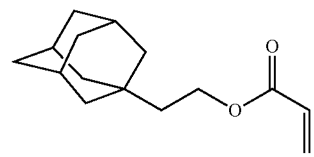

I3a7

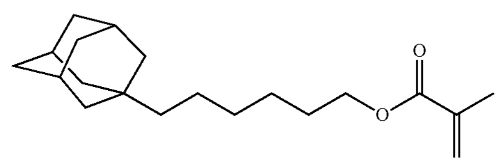

I3a8

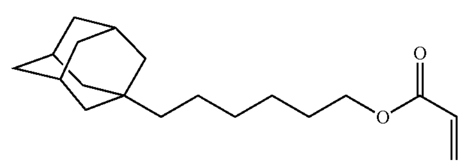

I4a1

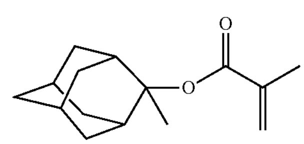

I4a2

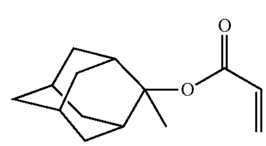

wherein in formulae I1 to I4

P and Sp have the meanings given in claim 2, $W^{11}$, $W^{12}$ and $W^{13}$ are independently of each other H, F or $C_1$-$C_{12}$-alkyl, and the cycloalkyl groups are optionally substituted with one or more groups L as defined in claim 2;

component A) comprises one or more second polymerizable compounds selected from the following formulae P-Sp-$G^2$ II P-Sp-$(CHW^{11})_{n2}$—$(CH_2)_{n1}$—$(CHW^{12})_{n3}$—$CH_3$ II1

P-Sp-$(CH_2)_{n2}$—$(CF_2)_{n1}$—$CFW^{13}W^{14}$ II2

II3

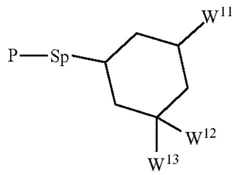

II4

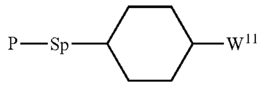

wherein

P is a polymerizable group,

Sp is a spacer group or a single bond, $G^2$ is a straight-chain, branched or monocyclic alkyl group with 1 to 20 C atoms that is optionally mono-, poly- or perfluorinated and is optionally substituted by one or more groups L and wherein one or more $CH_2$-groups are optionally replaced by —O—, —CO—, —O—CO— or —CO—O— such that O-atoms are not directly adjacent to one another, L is F, Cl, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl or heteroaryl having 5 to 20 ring atoms, or straight-chain or branched alkyl having 1 to 25, in which, in addition, one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, or —CN, $W^{11}$, $W^{12}$ are each independently H, F or $C_1$-$C_{12}$-alkyl, $W^{13}$, $W^{14}$ are each independently H or F, n1 is an integer from 2 to 15, and n2, n3 are each independently 0 or an integer from 1 to 3;

the concentration of the first and second polymerizable compounds in the LC medium is from 10 to 20% by weight; and the LC medium contains one or more compounds selected from the following formulae

CY2

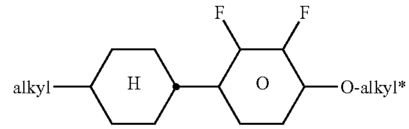

CY10

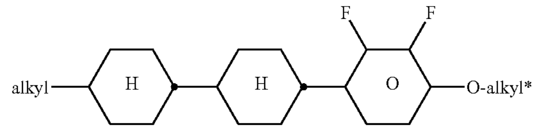

in which alkyl and alkyl* each, independently of one another, denote a straight-chain alkyl radical having 1-6 C atoms,

PY2

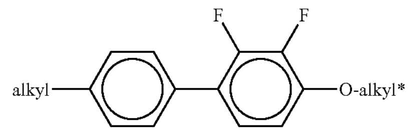

PY10

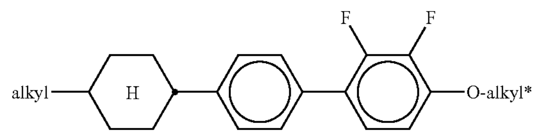

AN1

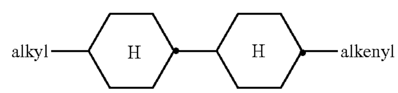

ZK1

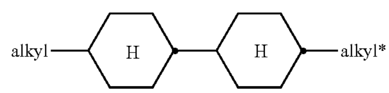

in which alkyl and alkyl* each, independently of one another, denote a straight-chain alkyl radical having 1-6 C atoms, and alkenyl denotes a straight-chain alkenyl radical having 2 7 C atoms.

* * * * *